US010389953B2

(12) United States Patent
Hoelter et al.

(10) Patent No.: US 10,389,953 B2
(45) Date of Patent: Aug. 20, 2019

(54) INFRARED IMAGING DEVICE HAVING A SHUTTER

(71) Applicant: FLIR Systems, Inc., Wilsonville, OR (US)

(72) Inventors: Theodore R. Hoelter, Goleta, CA (US); Joseph Kostrzewa, Buellton, CA (US); Pierre Boulanger, Goleta, CA (US); Barbara Sharp, Santa Barbara, CA (US); Eric A. Kurth, Santa Barbara, CA (US); Nicholas Högasten, Santa Barbara, CA (US); Katrin Strandemar, Rimbo (SE)

(73) Assignee: FLIR Systems, Inc., Wilsonville, OR (US)

( * ) Notice: Subject to any disclaimer, the term of this patent is extended or adjusted under 35 U.S.C. 154(b) by 245 days.

(21) Appl. No.: 14/747,865

(22) Filed: Jun. 23, 2015

(65) Prior Publication Data

US 2015/0319378 A1  Nov. 5, 2015

Related U.S. Application Data

(63) Continuation of application No. PCT/US2013/078551, filed on Dec. 31, 2013, and a
(Continued)

(51) Int. Cl.
*H04N 5/33* (2006.01)
*H04N 5/225* (2006.01)
(Continued)

(52) U.S. Cl.
CPC ............. *H04N 5/33* (2013.01); *H04N 5/2252* (2013.01); *H04N 5/2253* (2013.01);
(Continued)

(58) Field of Classification Search
CPC ....................................................... H04N 5/33
See application file for complete search history.

(56) References Cited

U.S. PATENT DOCUMENTS

| 2,764,055 A | 9/1956 | Clemens et al. |
| 5,128,796 A | 7/1992 | Barney et al. |
| (Continued) | | |

FOREIGN PATENT DOCUMENTS

| CA | 2764055 | 7/2012 |
| CN | 2874947 | 2/2007 |
| (Continued) | | |

OTHER PUBLICATIONS

DARPA, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.

*Primary Examiner* — Jonathan R Messmore
(74) *Attorney, Agent, or Firm* — Haynes and Boone, LLP

(57) ABSTRACT

A shutter assembly may be provided for an infrared imaging module to selectively block external infrared radiation from reaching infrared sensors of the infrared imaging module. For example, the shutter assembly may comprise a paddle situated external to an optical element (e.g., lens) and adapted to be selectively moved by an actuator to substantially block external infrared radiation from entering the optical element. The shutter assembly may be stacked relative to a housing of the infrared imaging module without excessively increasing the overall profile of the infrared imaging module. A substantially reflective low emissivity interior surface may be provided on the paddle to reflect infrared radiation originating from an infrared sensor assembly of the infrared imaging module back to the infrared sensor assembly.

24 Claims, 36 Drawing Sheets

Related U.S. Application Data continuation-in-part of application No. 13/966,052, filed on Aug. 13, 2013, now Pat. No. 9,473,681, application No. 14/747,865, which is a continuation-in-part of application No. 13/966,052, filed on Aug. 13, 2013, now Pat. No. 9,473,681, said application No. PCT/US2013/078551 is a continuation-in-part of application No. 14/101,245, filed on Dec. 9, 2013, now Pat. No. 9,706,139, application No. 14/747,865, which is a continuation-in-part of application No. 14/101,245, filed on Dec. 9, 2013, now Pat. No. 9,706,139, which is a continuation of application No. PCT/US2012/041744, filed on Jun. 8, 2012, said application No. PCT/US2013/078551 is a continuation-in-part of application No. 14/099,818, filed on Dec. 6, 2013, now Pat. No. 9,723,227, application No. 14/747,865, which is a continuation-in-part of application No. 14/099,818, filed on Dec. 6, 2013, now Pat. No. 9,723,227, which is a continuation of application No. PCT/US2012/041749, filed on Jun. 8, 2012, said application No. PCT/US2013/078551 is a continuation-in-part of application No. 14/101,258, filed on Dec. 9, 2013, now Pat. No. 9,723,228, application No. 14/747,865, which is a continuation-in-part of application No. 14/101,258, filed on Dec. 9, 2013, now Pat. No. 9,723,228, which is a continuation of application No. PCT/US2012/041739, filed on Jun. 8, 2012, said application No. PCT/US2013/078551 is a continuation-in-part of application No. 14/138,058, filed on Dec. 21, 2013, now Pat. No. 10,244,190, application No. 14/747,865, which is a continuation-in-part of application No. 14/138,058, filed on Dec. 21, 2013, now Pat. No. 10,244,190, said application No. PCT/US2013/078551 is a continuation-in-part of application No. 14/138,040, filed on Dec. 21, 2013, now Pat. No. 9,451,183, application No. 14/747,865, which is a continuation-in-part of application No. 14/138,040, filed on Dec. 21, 2013, now Pat. No. 9,451,183, said application No. PCT/US2013/078551 is a continuation-in-part of application No. 14/138,052, filed on Dec. 21, 2013, now Pat. No. 9,635,285, application No. 14/747,865, which is a continuation-in-part of application No. 14/138,052, filed on Dec. 21, 2013, now Pat. No. 9,635,285.

(60) Provisional application No. 61/747,789, filed on Dec. 31, 2012, provisional application No. 61/656,889, filed on Jun. 7, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011, provisional application No. 61/748,018, filed on Dec. 31, 2012, provisional application No. 61/792,582, filed on Mar. 15, 2013, provisional application No. 61/746,069, filed on Dec. 26, 2012, provisional application No. 61/793,952, filed on Mar. 15, 2013, provisional application No. 61/746,074, filed on Dec. 26, 2012.

(51) Int. Cl.
*H04N 5/353* (2011.01)
*H04N 17/00* (2006.01)
*H04N 101/00* (2006.01)

(52) U.S. Cl.
CPC ........ *H04N 5/2254* (2013.01); *H04N 5/2257* (2013.01); *H04N 5/3532* (2013.01); *H04N 17/002* (2013.01); *H04N 2101/00* (2013.01)

(56) References Cited

U.S. PATENT DOCUMENTS

| | | |
|---|---|---|
| 6,297,794 B1 | 10/2001 | Tsubouchi et al. |
| 6,330,371 B1 | 12/2001 | Chen et al. |
| 6,348,951 B1 | 2/2002 | Kim |
| 6,396,543 B1 | 5/2002 | Shin et al. |
| 6,424,843 B1 | 7/2002 | Reitmaa et al. |
| 6,633,231 B1 | 10/2003 | Okamoto et al. |
| 6,681,120 B1 | 1/2004 | Kim |
| 6,707,044 B2 | 3/2004 | Lannestedt et al. |
| 6,759,949 B2 | 7/2004 | Miyahara |
| 6,883,054 B2 | 4/2005 | Yamaguchi et al. |
| 6,911,652 B2 | 6/2005 | Walkenstein |
| 7,050,107 B1 | 5/2006 | Frank et al. |
| D524,785 S | 7/2006 | Huang |
| 7,084,857 B2 | 8/2006 | Lieberman et al. |
| 7,208,733 B2 | 4/2007 | Mian et al. |
| 7,263,379 B1 | 8/2007 | Parkulo et al. |
| 7,284,921 B2 | 10/2007 | Lapstun et al. |
| 7,296,747 B2 | 11/2007 | Rohs |
| 7,305,368 B2 | 12/2007 | Lieberman et al. |
| 7,321,783 B2 | 1/2008 | Kim |
| 7,333,832 B2 | 2/2008 | Tsai et al. |
| 7,377,835 B2 | 5/2008 | Parkulo et al. |
| 7,420,663 B2 | 9/2008 | Wang et al. |
| 7,453,064 B2 | 11/2008 | Lee |
| 7,470,902 B1 | 12/2008 | Kraemer et al. |
| 7,477,309 B2 | 1/2009 | Cuccias |
| 7,567,818 B2 | 7/2009 | Pylkko |
| 7,572,077 B2 | 8/2009 | Lapstun et al. |
| 7,575,077 B2 | 8/2009 | Priepke et al. |
| 7,595,904 B2 | 9/2009 | Lapstun et al. |
| 7,616,877 B2 | 11/2009 | Zarnowski et al. |
| 7,627,364 B2 | 12/2009 | Sato |
| 7,697,962 B2 | 4/2010 | Cradick et al. |
| 7,723,686 B2 | 5/2010 | Hannebauer |
| 7,725,141 B2 | 5/2010 | Su |
| 7,728,281 B2 | 6/2010 | Chen |
| 7,735,974 B2 | 6/2010 | Silverbrook et al. |
| 7,747,454 B2 | 6/2010 | Bartfeld et al. |
| 7,760,919 B2 | 7/2010 | Namgoong |
| 7,761,114 B2 | 7/2010 | Silverbrook et al. |
| 7,773,870 B2 | 8/2010 | Naruse |
| 7,801,733 B2 | 9/2010 | Lee et al. |
| 7,810,733 B2 | 10/2010 | Silverbrook et al. |
| 7,872,574 B2 | 1/2011 | Betts et al. |
| 7,900,842 B2 | 3/2011 | Silverbrook et al. |
| 7,903,152 B2 | 3/2011 | Kim |
| 7,947,222 B2 | 5/2011 | Bae et al. |
| 7,960,700 B2 | 6/2011 | Craig et al. |
| 8,049,163 B1 | 11/2011 | Granneman et al. |
| 8,153,980 B1 | 4/2012 | Brady et al. |
| 8,274,050 B2 * | 9/2012 | Grimberg ............... G01J 5/522 250/336.1 |
| 8,275,413 B1 | 9/2012 | Fraden et al. |
| 8,305,577 B2 | 11/2012 | Kivioja et al. |
| 8,345,226 B2 | 1/2013 | Zhang |
| 8,373,757 B1 * | 2/2013 | Nguyen ................ H04N 5/33 250/252.1 |
| 8,537,343 B2 | 9/2013 | Zhang |
| 8,781,420 B2 | 7/2014 | Schlub et al. |
| 8,825,112 B1 | 9/2014 | Fraden et al. |
| 2002/0006337 A1 | 1/2002 | Kimura et al. |
| 2002/0058352 A1 | 5/2002 | Jacksen et al. |
| 2002/0122036 A1 | 9/2002 | Sasaki |
| 2002/0135571 A1 | 9/2002 | Klocek et al. |
| 2002/0140542 A1 | 10/2002 | Prokoski et al. |
| 2002/0149600 A1 | 10/2002 | Van Splunter et al. |
| 2003/0007193 A1 | 1/2003 | Sato et al. |
| 2003/0112871 A1 | 6/2003 | Demos |
| 2003/0122957 A1 | 7/2003 | Emme |

(56) References Cited

U.S. PATENT DOCUMENTS

| | | |
|---|---|---|
| 2003/0223623 A1 | 12/2003 | Gutta et al. |
| 2004/0047518 A1 | 3/2004 | Tiana |
| 2004/0101298 A1 | 5/2004 | Mandelbaum et al. |
| 2004/0127156 A1 | 7/2004 | Park |
| 2004/0128070 A1 | 7/2004 | Schmidt et al. |
| 2004/0151229 A1* | 8/2004 | Ruettiger ............ B60H 1/0075 374/121 |
| 2004/0157612 A1 | 8/2004 | Kim |
| 2004/0165788 A1 | 8/2004 | Perez et al. |
| 2004/0169860 A1 | 9/2004 | Jung et al. |
| 2004/0207036 A1 | 10/2004 | Ikeda |
| 2004/0211907 A1 | 10/2004 | Wellman et al. |
| 2004/0256561 A1 | 12/2004 | Beuhler et al. |
| 2005/0030314 A1 | 2/2005 | Dawson |
| 2005/0067852 A1 | 3/2005 | Jeong |
| 2005/0089241 A1 | 4/2005 | Kawanishi et al. |
| 2005/0068333 A1 | 5/2005 | Nakahashi et al. |
| 2005/0093890 A1 | 5/2005 | Baudisch |
| 2005/0110803 A1 | 5/2005 | Sugimura |
| 2005/0138569 A1 | 6/2005 | Baxter et al. |
| 2005/0169655 A1 | 8/2005 | Koyama et al. |
| 2005/0184993 A1 | 8/2005 | Ludwin et al. |
| 2005/0213813 A1 | 9/2005 | Lin et al. |
| 2005/0213853 A1 | 9/2005 | Maier et al. |
| 2005/0219249 A1 | 10/2005 | Xie et al. |
| 2005/0248912 A1 | 11/2005 | Kang et al. |
| 2005/0265688 A1 | 12/2005 | Kobayashi |
| 2005/0270784 A1 | 12/2005 | Hahn et al. |
| 2005/0277447 A1 | 12/2005 | Buil et al. |
| 2006/0039686 A1 | 2/2006 | Soh et al. |
| 2006/0040478 A1* | 2/2006 | Merkl .................. G01N 21/278 438/510 |
| 2006/0060984 A1 | 3/2006 | Wakabayashi et al. |
| 2006/0077246 A1 | 4/2006 | Kawakami et al. |
| 2006/0081777 A1* | 4/2006 | Bevan .................. G01J 5/0003 250/330 |
| 2006/0097172 A1 | 5/2006 | Park |
| 2006/0120712 A1 | 6/2006 | Kim |
| 2006/0132642 A1 | 6/2006 | Hosaka et al. |
| 2006/0140501 A1 | 6/2006 | Tadas |
| 2006/0147191 A1 | 7/2006 | Kim |
| 2006/0154559 A1 | 7/2006 | Yoshida |
| 2006/0210249 A1 | 9/2006 | Seto |
| 2006/0234744 A1 | 10/2006 | Sung et al. |
| 2006/0240867 A1 | 10/2006 | Wang et al. |
| 2006/0279758 A1 | 12/2006 | Myoki |
| 2006/0285907 A1 | 12/2006 | Kang et al. |
| 2007/0004449 A1 | 1/2007 | Sham |
| 2007/0019077 A1 | 1/2007 | Park |
| 2007/0019099 A1 | 1/2007 | Lieberman et al. |
| 2007/0019103 A1 | 1/2007 | Lieberman et al. |
| 2007/0033309 A1 | 2/2007 | Kuwabara et al. |
| 2007/0034800 A1 | 2/2007 | Huang |
| 2007/0052616 A1 | 3/2007 | Yoon |
| 2007/0057764 A1 | 3/2007 | Sato et al. |
| 2007/0103479 A1 | 5/2007 | Kim et al. |
| 2007/0120879 A1 | 5/2007 | Kanade et al. |
| 2007/0132858 A1 | 6/2007 | Chiba et al. |
| 2007/0139739 A1 | 6/2007 | Kim et al. |
| 2007/0159524 A1 | 7/2007 | Kim et al. |
| 2007/0189583 A1 | 8/2007 | Shimada et al. |
| 2007/0211965 A1 | 9/2007 | Helbing et al. |
| 2007/0222798 A1 | 9/2007 | Kuno |
| 2007/0248284 A1 | 10/2007 | Bernsen et al. |
| 2007/0274541 A1 | 11/2007 | Uetake et al. |
| 2007/0285439 A1 | 12/2007 | King et al. |
| 2007/0286517 A1 | 12/2007 | Paik et al. |
| 2007/0299226 A1 | 12/2007 | Park et al. |
| 2008/0038579 A1 | 2/2008 | Schuisky et al. |
| 2008/0056612 A1 | 3/2008 | Park et al. |
| 2008/0079834 A1 | 4/2008 | Chung et al. |
| 2008/0112012 A1 | 5/2008 | Yokoyama et al. |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0170082 A1 | 7/2008 | Kim |
| 2008/0218474 A1 | 9/2008 | Ahn et al. |
| 2008/0248833 A1 | 10/2008 | Silverbrook et al. |
| 2008/0259181 A1 | 10/2008 | Yamashita et al. |
| 2008/0266079 A1 | 10/2008 | Lontka |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0052883 A1 | 2/2009 | Lee et al. |
| 2009/0093687 A1* | 4/2009 | Telfort ................. A61B 5/0002 600/300 |
| 2009/0129700 A1 | 5/2009 | Rother et al. |
| 2009/0131104 A1 | 5/2009 | Yoon |
| 2009/0148019 A1 | 6/2009 | Hamada et al. |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0278048 A1 | 11/2009 | Choe et al. |
| 2009/0297062 A1 | 12/2009 | Molne et al. |
| 2009/0303363 A1 | 12/2009 | Blessinger |
| 2010/0020229 A1 | 1/2010 | Hershey et al. |
| 2010/0021657 A1* | 1/2010 | Lochtman ............... H05K 3/046 427/597 |
| 2010/0066866 A1 | 3/2010 | Lim |
| 2010/0090965 A1 | 4/2010 | Birkler |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0144387 A1 | 6/2010 | Chou |
| 2010/0163730 A1 | 7/2010 | Schmidt et al. |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0309315 A1* | 12/2010 | Hogasten ................. H04N 5/33 348/164 |
| 2010/0314543 A1 | 12/2010 | Lee et al. |
| 2011/0043486 A1 | 2/2011 | Hagiwara et al. |
| 2011/0063446 A1 | 3/2011 | McMordie et al. |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2011/0221599 A1* | 9/2011 | Hogasten .......... H01L 27/14609 340/632 |
| 2012/0007987 A1 | 1/2012 | Gaber |
| 2012/0083314 A1 | 4/2012 | Ng et al. |
| 2012/0184252 A1 | 7/2012 | Hirsch |
| 2012/0212806 A1* | 8/2012 | Shibata ............... H04N 5/23212 359/356 |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2012/0312976 A1* | 12/2012 | Boulanger ............... H04N 5/33 250/252.1 |
| 2012/0320086 A1 | 12/2012 | Kasama et al. |
| 2013/0204570 A1 | 8/2013 | Mendelson et al. |
| 2013/0320220 A1 | 12/2013 | Donowsky |
| 2014/0002668 A1* | 1/2014 | Nguyen ................. G01J 5/0205 348/164 |

FOREIGN PATENT DOCUMENTS

| | | |
|---|---|---|
| CN | 2899321 | 5/2007 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |

(56) References Cited

FOREIGN PATENT DOCUMENTS

| | | |
|---|---|---|
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| EP | 0398725 | 11/1990 |
| EP | 0837600 | 4/1998 |
| EP | 1 983 485 | 10/2008 |
| EP | 2 136 554 | 12/2009 |
| EP | 2477391 | 7/2012 |
| JP | 1997275518 | 4/1999 |
| JP | 2004 004465 | 1/2004 |
| JP | 2004048571 | 2/2004 |
| JP | 2004 241491 | 8/2004 |
| JP | 2006098098 | 4/2006 |
| JP | 2006105655 | 4/2006 |
| JP | 2007006475 | 1/2007 |
| JP | 2007 267035 | 10/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 20060054877 | 5/2006 |
| KR | 20060071220 | 6/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |

(56) References Cited

FOREIGN PATENT DOCUMENTS

| | | |
|---|---|---|
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 20110006437 | 1/2011 |
| KR | 20110011264 | 2/2011 |
| KR | 2011024290 | 3/2011 |
| KR | 20110019994 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 00/23814 | 4/2000 |
| WO | WO 03/093963 | 11/2003 |
| WO | WO 2004/027459 | 4/2004 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2009/122114 | 10/2009 |
| WO | WO 2010/005152 | 1/2010 |
| WO | WO 2010/033142 | 3/2010 |
| WO | WO 2005/015143 | 2/2015 |

\* cited by examiner

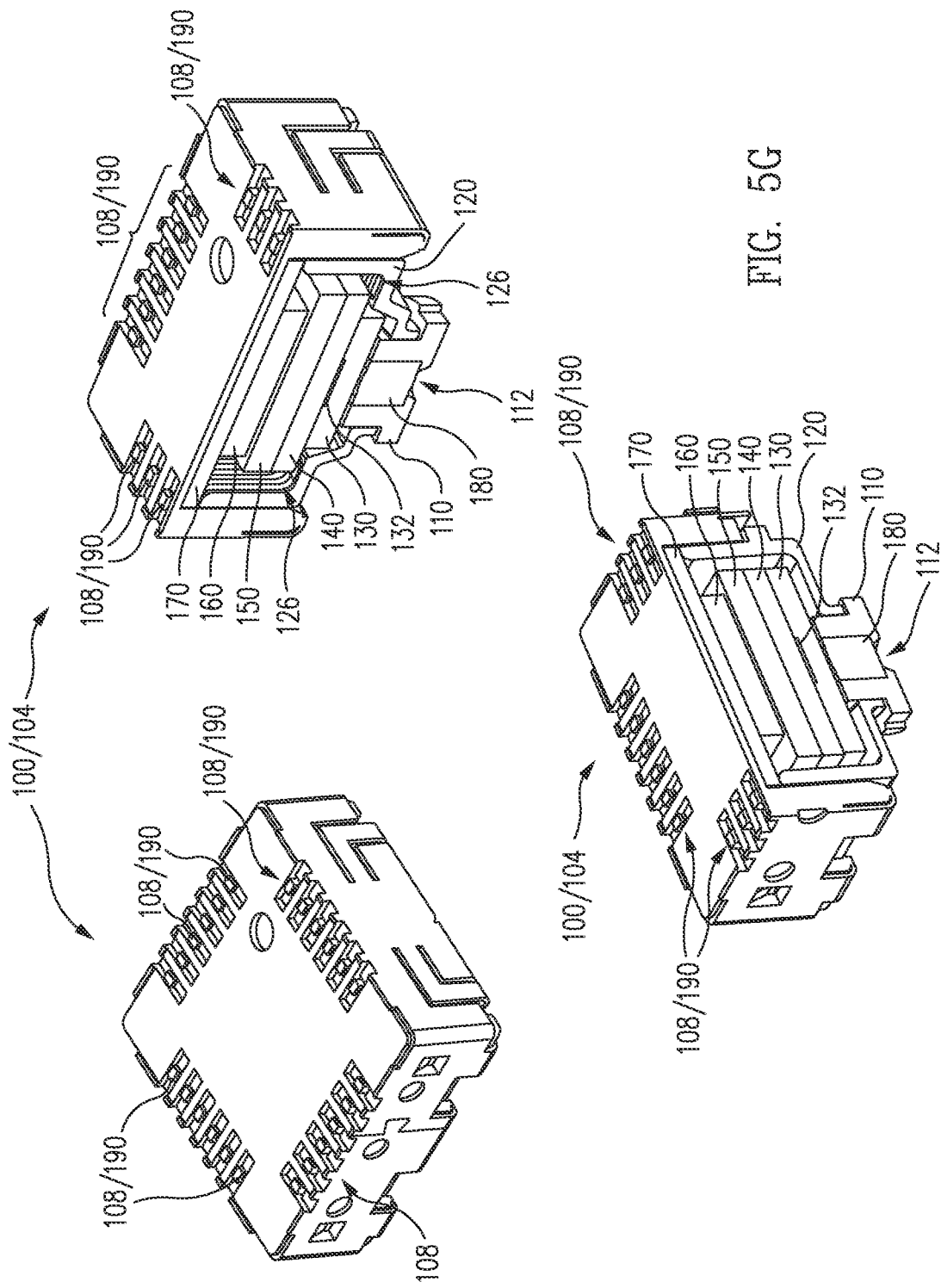

INFRARED IMAGING DEVICE HAVING A SHUTTER

CROSS-REFERENCE TO RELATED APPLICATIONS

This application is a continuation of International Patent Application No. PCT/US2013/078551 filed Dec. 31, 2013 and entitled "INFRARED IMAGING DEVICE HAVING A SHUTTER" which is hereby incorporated by reference in its entirety.

International Patent Application No. PCT/US2013/078551 claims the benefit of U.S. Provisional Patent Application No. 61/747,789 filed Dec. 31, 2012 and entitled "INFRARED IMAGING DEVICE HAVING A SHUTTER" which is hereby incorporated by reference in its entirety.

International Patent Application No. PCT/US2013/078551 is a continuation-in-part of U.S. patent application Ser. No. 13/966,052 filed Aug. 13, 2013 and entitled "INFRARED CAMERA SYSTEM HOUSING WITH METALIZED SURFACE" which is hereby incorporated by reference in its entirety.

This application is a continuation-in-part of U.S. patent application Ser. No. 13/966,052 filed Aug. 13, 2013 and entitled "INFRARED CAMERA SYSTEM HOUSING WITH METALIZED SURFACE" which is hereby incorporated by reference in its entirety.

International Patent Application No. PCT/US2013/078551 is a continuation-in-part of U.S. patent application Ser. No. 14/101,245 filed Dec. 9, 2013 and entitled "LOW POWER AND SMALL FORM FACTOR INFRARED IMAGING" which is hereby incorporated by reference in its entirety.

This application is a continuation-in-part of U.S. patent application Ser. No. 14/101,245 filed Dec. 9, 2013 and entitled "LOW POWER AND SMALL FORM FACTOR INFRARED IMAGING" which is hereby incorporated by reference in its entirety.

U.S. patent application Ser. No. 14/101,245 is a continuation of International Patent Application No. PCT/US2012/041744 filed Jun. 8, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/656,889 filed Jun. 7, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041744 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041744 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041744 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

International Patent Application No. PCT/US2013/078551 is a continuation-in-part of U.S. patent application Ser. No. 14/099,818 filed Dec. 6, 2013 and entitled "NON-UNIFORMITY CORRECTION TECHNIQUES FOR INFRARED IMAGING DEVICES" which is hereby incorporated by reference in its entirety.

This application is a continuation-in-part of U.S. patent application Ser. No. 14/099,818 filed Dec. 6, 2013 and entitled "NON-UNIFORMITY CORRECTION TECHNIQUES FOR INFRARED IMAGING DEVICES" which is hereby incorporated by reference in its entirety.

U.S. patent application Ser. No. 14/099,818 is a continuation of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041749 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041749 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

International Patent Application No. PCT/US2013/078551 is a continuation-in-part of U.S. patent application Ser. No. 14/101,258 filed Dec. 9, 2013 and entitled "INFRARED CAMERA SYSTEM ARCHITECTURES" which is hereby incorporated by reference in its entirety.

This application is a continuation-in-part of U.S. patent application Ser. No. 14/101,258 filed Dec. 9, 2013 and entitled "INFRARED CAMERA SYSTEM ARCHITECTURES" which is hereby incorporated by reference in its entirety.

U.S. patent application Ser. No. 14/101,258 is a continuation of International Patent Application No. PCT/US2012/041739 filed Jun. 8, 2012 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041739 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

International Patent Application No. PCT/US2013/078551 is a continuation-in-part of U.S. patent application Ser. No. 14/138,058 filed Dec. 21, 2013 and entitled "COMPACT MULTI-SPECTRUM IMAGING WITH FUSION" which is hereby incorporated by reference in its entirety.

This application is a continuation-in-part of U.S. patent application Ser. No. 14/138,058 filed Dec. 21, 2013 and entitled "COMPACT MULTI-SPECTRUM IMAGING WITH FUSION" which is hereby incorporated by reference in its entirety.

U.S. patent application Ser. No. 14/138,058 claims the benefit of U.S. Provisional Patent Application No. 61/748,018 filed Dec. 31, 2012 and entitled "COMPACT MULTI-SPECTRUM IMAGING WITH FUSION" which is hereby incorporated by reference in its entirety.

International Patent Application No. PCT/US2013/078551 is a continuation-in-part of U.S. patent application Ser. No. 14/138,040 filed Dec. 21, 2013 and entitled "TIME SPACED INFRARED IMAGE ENHANCEMENT" which is hereby incorporated by reference in its entirety.

This application is a continuation-in-part of U.S. patent application Ser. No. 14/138,040 filed Dec. 21, 2013 and entitled "TIME SPACED INFRARED IMAGE ENHANCEMENT" which is hereby incorporated by reference in its entirety.

U.S. patent application Ser. No. 14/138,040 claims the benefit of U.S. Provisional Patent Application No. 61/792,582 filed Mar. 15, 2013 and entitled "TIME SPACED INFRARED IMAGE ENHANCEMENT" which is hereby incorporated by reference in its entirety.

U.S. patent application Ser. No. 14/138,040 also claims the benefit of U.S. Provisional Patent Application No. 61/746,069 filed Dec. 26, 2012 and entitled "TIME SPACED INFRARED IMAGE ENHANCEMENT" which is hereby incorporated by reference in its entirety.

International Patent Application No. PCT/US2013/078551 is a continuation-in-part of U.S. patent application Ser. No. 14/138,052 filed Dec. 21, 2013 and entitled "INFRARED IMAGING ENHANCEMENT WITH FUSION" which is hereby incorporated by reference in its entirety.

This application is a continuation-in-part of U.S. patent application Ser. No. 14/138,052 filed Dec. 21, 2013 and entitled "INFRARED IMAGING ENHANCEMENT WITH FUSION" which is hereby incorporated by reference in its entirety.

U.S. patent application Ser. No. 14/138,052 claims the benefit of U.S. Provisional Patent Application No. 61/793,952 filed Mar. 15, 2013 and entitled "INFRARED IMAGING ENHANCEMENT WITH FUSION" which is hereby incorporated by reference in its entirety.

U.S. patent application Ser. No. 14/138,052 also claims the benefit of U.S. Provisional Patent Application No. 61/746,074 filed Dec. 26, 2012 and entitled "INFRARED IMAGING ENHANCEMENT WITH FUSION" which is hereby incorporated by reference in its entirety.

TECHNICAL FIELD

One or more embodiments of the invention relate generally to infrared imaging devices and more particularly, for example, to infrared imaging devices having a shutter.

BACKGROUND

Some infrared imaging devices may be equipped with a shutter that may be used for calibration and other purposes. Conventional shutters for infrared imaging devices are often situated in an optical path between an optical element (e.g., a lens) and infrared sensors of the infrared imaging devices. However, such an arrangement of the shutter also blocks out-of-field (e.g., emitted by a housing and/or a lens barrel enclosing the optical element) infrared radiation, and thus does not allow compensating for such out-of-field infrared radiation to achieve a more accurate calibration. It may also be difficult to achieve an accurate calibration using conventional infrared imaging device shutters, since conventional infrared imaging devices do not allow for an accurate measurement of the shutter temperature.

Furthermore, conventional shutters for infrared imaging devices typically add a large bulk and require external cabling, thereby dramatically increasing the total space requirements of the devices. The increased space requirements may be problematic especially for small form factor infrared imaging devices designed to be integrated into small electronic devices such as mobile phones.

SUMMARY

A shutter assembly may be provided for an infrared imaging module to selectively block external infrared radiation from reaching infrared sensors of the infrared imaging module. For example, in accordance with one or more embodiments, the shutter assembly may comprise a paddle situated external to an optical element (e.g., lens) and adapted to be selectively moved by an actuator to substantially block external infrared radiation from entering the optical element. Such an arrangement of the paddle may permit a more accurate calibration to be obtained when the shutter assembly is utilized for calibration purposes. In some embodiments, the shutter assembly may be stacked relative to a housing of the infrared imaging module without excessively increasing the overall profile of the infrared imaging module. In some embodiments, a temperature sensor may be provided on the paddle, on a shutter assembly body, or within the housing to permit an accurate measurement of a temperature associated with the paddle for calibration and other purposes. In addition, one or more conductive traces may be formed on interior and/or exterior surfaces of the housing to facilitate passing of electrical signals to and/or from components of the shutter assembly, according to some embodiments.

In one embodiment, a system includes an infrared imaging module comprising: an infrared sensor assembly having infrared sensors and adapted to capture image frames; and a shutter assembly comprising: a paddle adapted to selectively block external infrared radiation from reaching the infrared sensors, and an actuator adapted to selectively move the paddle in response to a control signal to block external infrared radiation from reaching the infrared sensors.

In another embodiment, a method includes selectively moving a paddle to block external infrared radiation from reaching infrared sensors of an infrared sensor assembly; capturing, using the infrared sensor assembly, image frames of infrared radiation emitted from the paddle; wherein the paddle is selectively moved by an actuator in response to a control signal; wherein the paddle and the actuator are part of a shutter assembly; and wherein the shutter assembly and the infrared sensor assembly are part of an infrared imaging module.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 5F-P illustrate additional views of infrared imaging modules implemented with several form factors in accordance with various embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
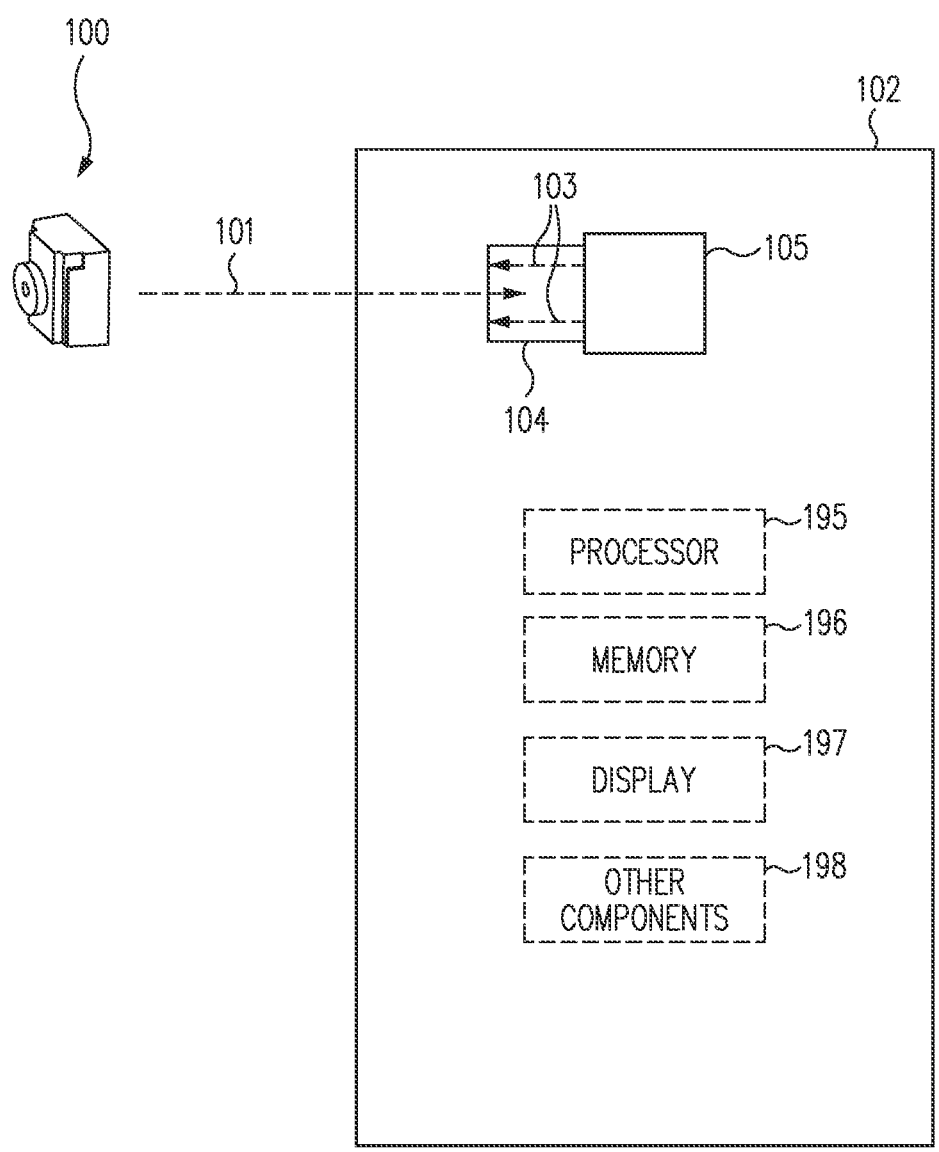
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques along with other novel infrared camera packaging techniques as discussed herein.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated without requiring significant additional measures to compensate for such self heating.

Figure 2:
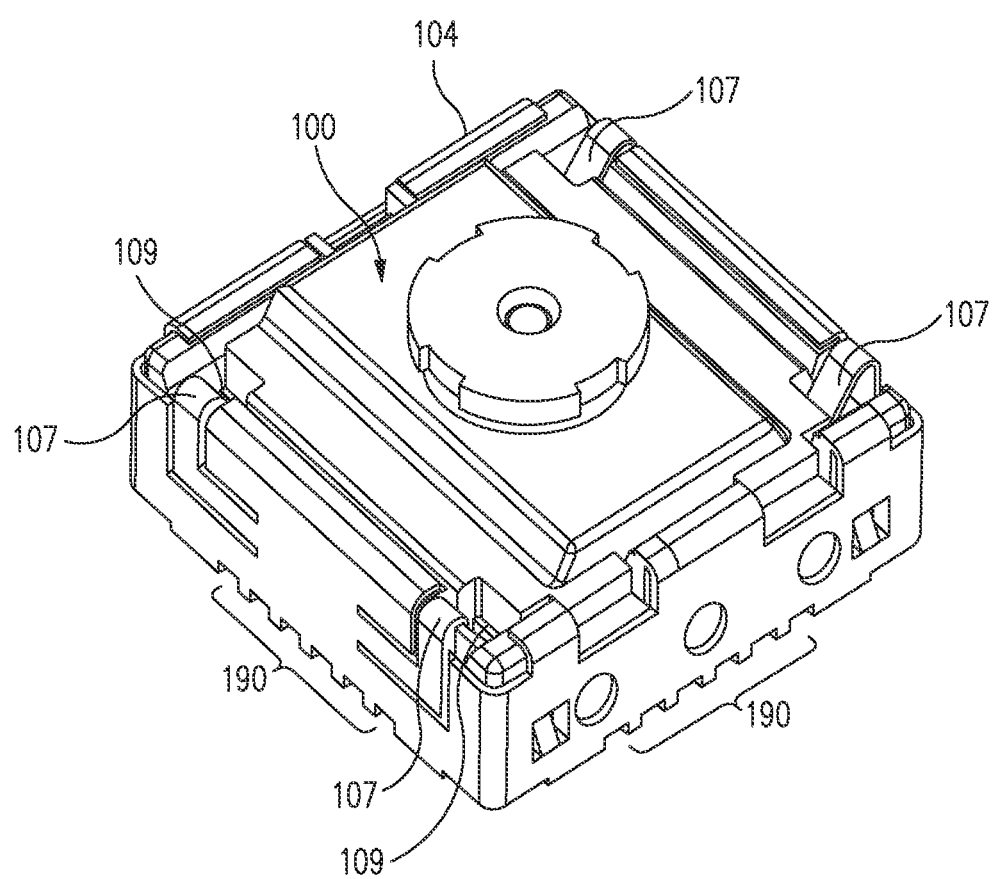
FIG. 2 illustrates an assembled infrared imaging module in accordance with an embodiment of the disclosure.

As shown in FIG. 1, host device 102 may include a socket 104, a shutter 105, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., a visible light camera or other components).

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
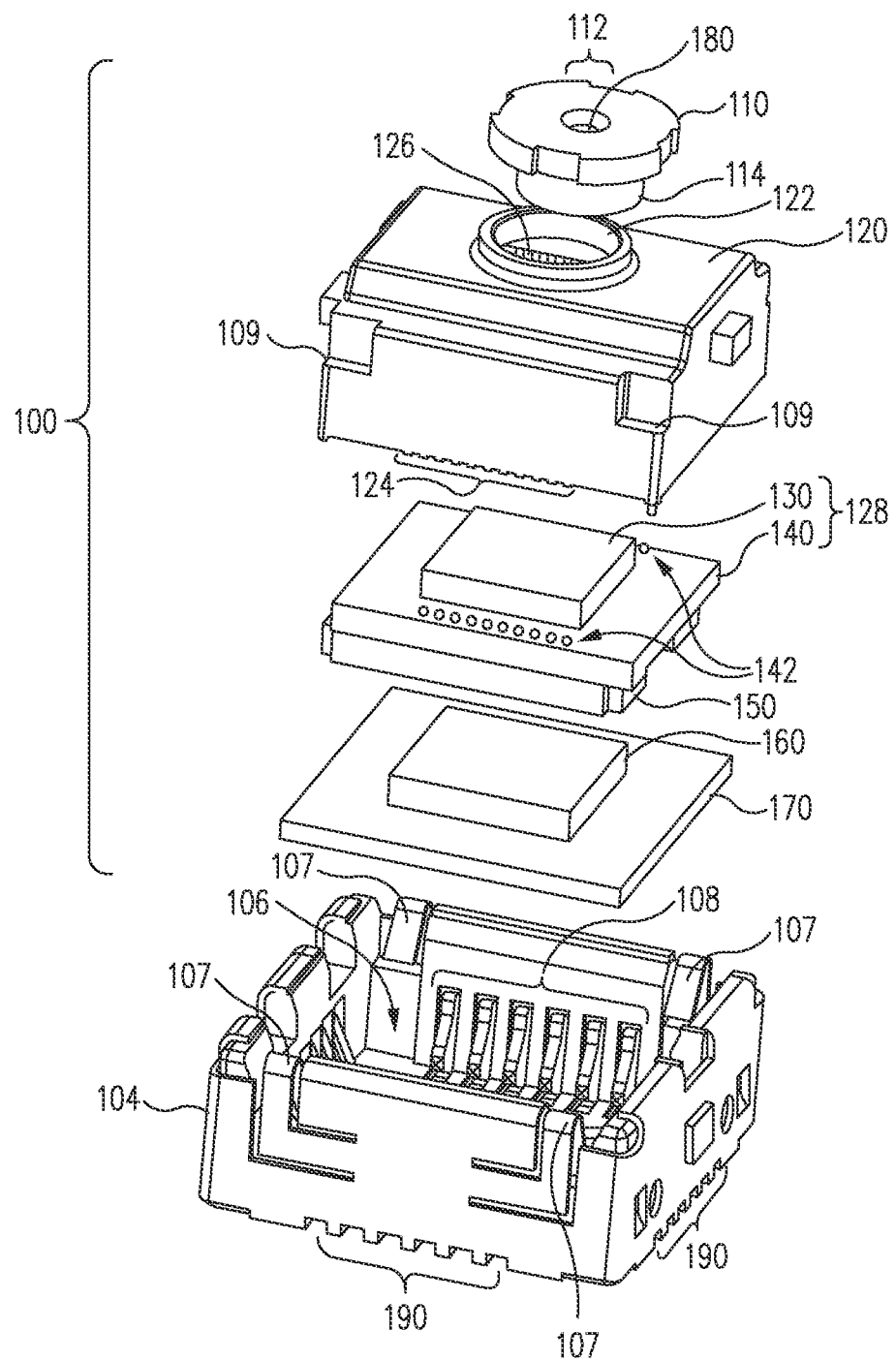
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 which is partially visible in FIG. 3 through an aperture 112 in lens barrel 110. Lens barrel 100 may include a substantially cylindrical extension 114 which may be used to interface lens barrel 100 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130 (e.g., shown in FIGS. 5A-K, 5M-P, and 8). For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages. In various embodiments, infrared sensor assembly 128 may be implemented with infrared sensors 132 and any other components as desired.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Figure 5A:
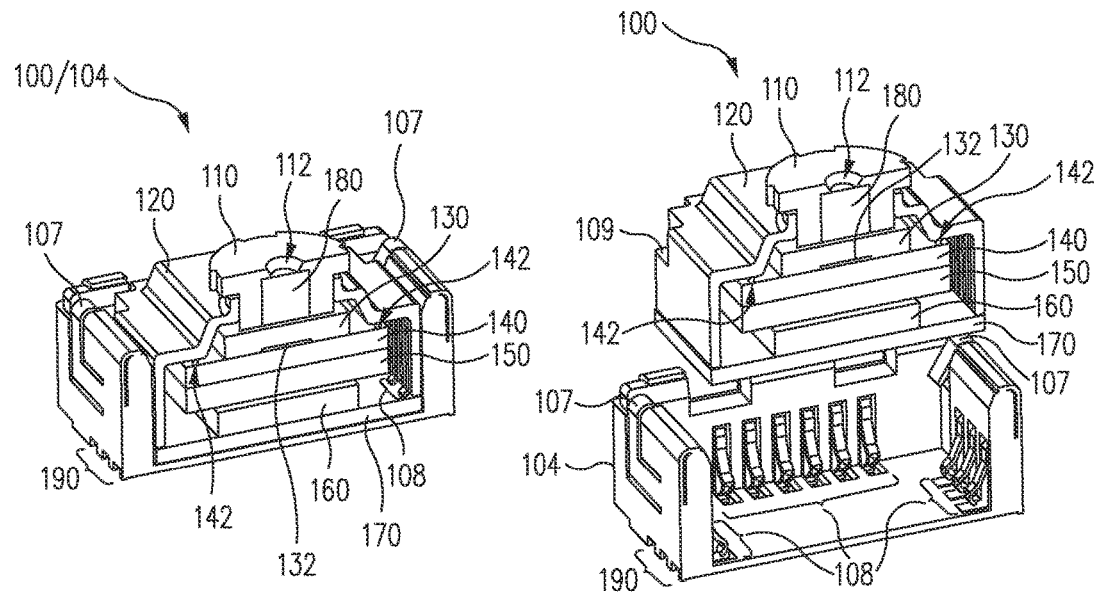
FIGS. 5A-E illustrate cross-sectional views of infrared imaging modules implemented with several form factors in accordance with various embodiments of the disclosure.
Figure 5B:
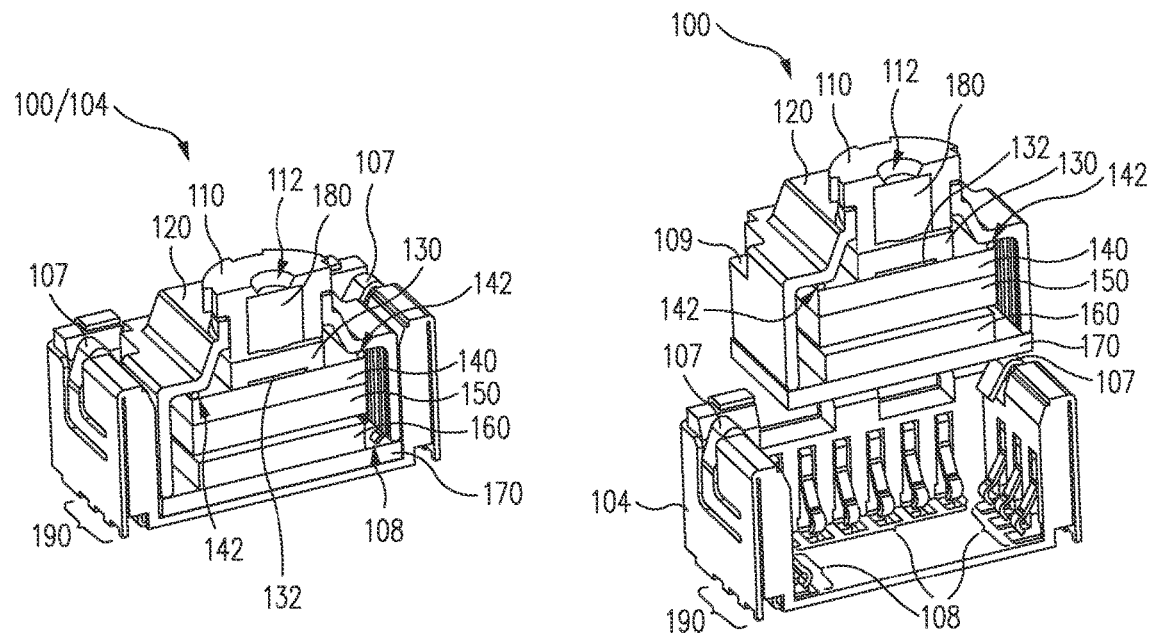
Figure 5C:
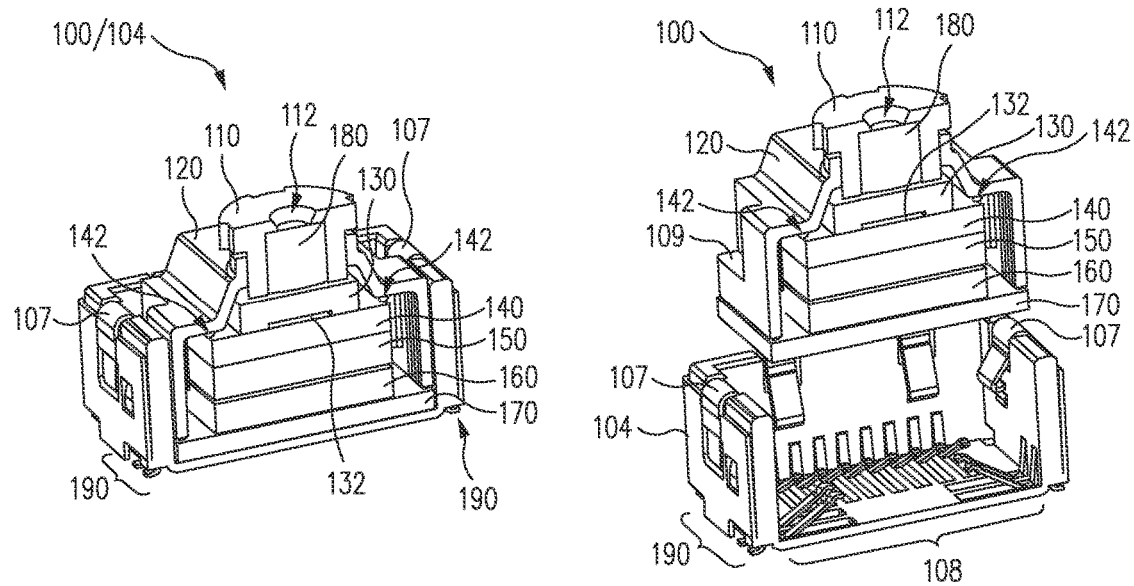

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIGS. 5A, 5B, and 5C. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, conductive traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 as shown in FIGS. 5A-C and FIGS. 5F-I). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. For example, as shown in FIGS. 2-3, 5A-F, 5H, 5J, 5L-M, and 5O-P, socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, as shown in FIGS. 3 and 5A-P, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190 as shown in FIGS. 2-3 and 5A-P. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, in FIGS. 5A-C, 5F-I, and 5L (further described herein), infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Figure 4:
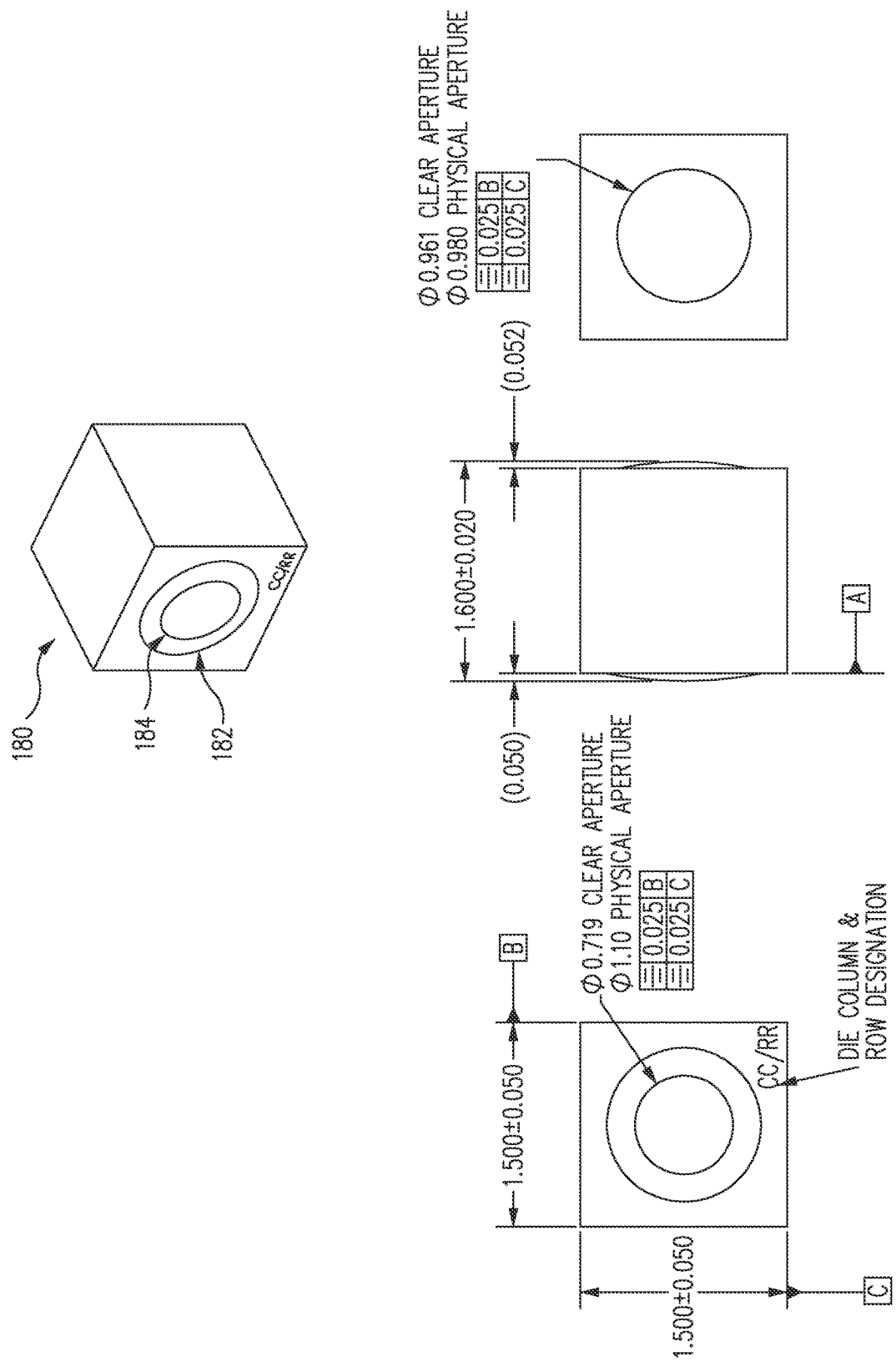
FIG. 4 illustrates an example implementation of an optical element that may be implemented in an infrared imaging module in accordance with an embodiment of the disclosure.

FIG. 4 illustrates an example implementation of optical element 180 that may be implemented in infrared imaging module 100 in accordance with an embodiment of the disclosure. In one embodiment, optical element 180 may be implemented as a silicon etched wafer level single element optic in accordance with various dimensions shown in FIG. 4.

As also shown in FIG. 4, optical element 180 may be implemented substantially as a cube, but with two slightly convex faces on faces providing apertures. For example, optical element 180 may include a physical aperture 182 and a smaller clear aperture 184. Optical element 180 allows through the desired infrared wavelengths to infrared sensor assembly 128.

In one embodiment, optical element 180 may be a single etched wafer level optical element made of silicon with the following specifications: image plane of 0.54 mm by 0.54 mm (e.g., when implemented for an infrared sensor assembly 128 having a 32 by 32 array of infrared sensors 132 with 17 μm pixel pitch); horizontal field of view (FoV) of approximately 55.7 degrees; F/# approximately equal to 0.91; modulated transfer function (MTF) of approximately 0.46 at 29 cy/mm; an anti-reflective coating with less than approximately two percent loss per surface; and focused at infinity.

In some embodiments, optical element 180 may be integrated as part of a wafer level package that includes infrared sensor assembly 128. For example, optical element 180 may be implemented as part of cap 130, stacked on various components of infrared sensor assembly 128 (e.g., with appropriate spacers provided therebetween), or otherwise integrated with various components of infrared sensor assembly 128.

In some embodiments, host device 102 may include other components 198 such as a non-thermal camera (e.g., a visible light camera or other type of non-thermal imager). The non-thermal camera may be a small form factor imaging module or imaging device, and may, in some embodiments, be implemented in a manner similar to the various embodiments of infrared imaging module 100 disclosed herein, with one or more sensors and/or sensor arrays responsive to radiation in non-thermal spectrums (e.g., radiation in visible light wavelengths, ultraviolet wavelengths, and/or other non-thermal wavelengths). For example, in some embodiments, the non-thermal camera may be implemented with a charge-coupled device (CCD) sensor, an electron multiplying CCD (EMCCD) sensor, a complementary metal-oxide-semiconductor (CMOS) sensor, a scientific CMOS (sCMOS) sensor, or other filters and/or sensors.

In some embodiments, the non-thermal camera may be co-located with infrared imaging module 100 and oriented such that a field-of-view (FOV) of the non-thermal camera at least partially overlaps a FOV of infrared imaging module 100. In one example, infrared imaging module 100 and a non-thermal camera may be implemented as a dual sensor module sharing a common substrate according to various techniques described in U.S. Provisional Patent Application No. 61/748,018 filed Dec. 31, 2012, which is incorporated herein by reference.

For embodiments having such a non-thermal light camera, various components (e.g., processor 195, processing module 160, and/or other processing component) may be configured to superimpose, fuse, blend, or otherwise combine infrared images (e.g., including thermal images) captured by infrared imaging module 100 and non-thermal images (e.g., including visible light images) captured by a non-thermal camera, whether captured at substantially the same time or different times (e.g., time-spaced over hours, days, daytime versus nighttime, and/or otherwise).

In some embodiments, thermal and non-thermal images may be processed to generate combined images (e.g., one or more processes performed on such images in some embodiments). For example, scene-based NUC processing may be performed (as further described herein), true color processing may be performed, and/or high contrast processing may be performed.

Regarding true color processing, thermal images may be blended with non-thermal images by, for example, blending a radiometric component of a thermal image with a corresponding component of a non-thermal image according to a blending parameter, which may be adjustable by a user and/or machine in some embodiments. For example, luminance or chrominance components of the thermal and non-thermal images may be combined according to the blending parameter. In one embodiment, such blending techniques may be referred to as true color infrared imagery. For example, in daytime imaging, a blended image may comprise a non-thermal color image, which includes a luminance component and a chrominance component, with its luminance value replaced and/or blended with the luminance value from a thermal image. The use of the luminance data from the thermal image causes the intensity of the true non-thermal color image to brighten or dim based on the temperature of the object. As such, these blending techniques provide thermal imaging for daytime or visible light images.

Regarding high contrast processing, high spatial frequency content may be obtained from one or more of the thermal and non-thermal images (e.g., by performing high pass filtering, difference imaging, and/or other techniques). A combined image may include a radiometric component of a thermal image and a blended component including infrared (e.g., thermal) characteristics of a scene blended with the high spatial frequency content, according to a blending parameter, which may be adjustable by a user and/or machine in some embodiments. In some embodiments, high spatial frequency content from non-thermal images may be blended with thermal images by superimposing the high spatial frequency content onto the thermal images, where the high spatial frequency content replaces or overwrites those portions of the thermal images corresponding to where the high spatial frequency content exists. For example, the high spatial frequency content may include edges of objects depicted in images of a scene, but may not exist within the interior of such objects. In such embodiments, blended image data may simply include the high spatial frequency content, which may subsequently be encoded into one or more components of combined images.

For example, a radiometric component of thermal image may be a chrominance component of the thermal image, and the high spatial frequency content may be derived from the luminance and/or chrominance components of a non-thermal image. In this embodiment, a combined image may include the radiometric component (e.g., the chrominance component of the thermal image) encoded into a chrominance component of the combined image and the high spatial frequency content directly encoded (e.g., as blended image data but with no thermal image contribution) into a luminance component of the combined image. By doing so, a radiometric calibration of the radiometric component of the thermal image may be retained. In similar embodiments, blended image data may include the high spatial frequency content added to a luminance component of the thermal images, and the resulting blended data encoded into a luminance component of resulting combined images.

For example, any of the techniques disclosed in the following applications may be used in various embodiments: U.S. patent application Ser. No. 12/477,828 filed Jun. 3, 2009; U.S. patent application Ser. No. 12/766,739 filed Apr. 23, 2010; U.S. patent application Ser. No. 13/105,765 filed May 11, 2011; U.S. patent application Ser. No. 13/437,645 filed Apr. 2, 2012; U.S. Provisional Patent Application No. 61/473,207 filed Apr. 8, 2011; U.S. Provisional Patent Application No. 61/746,069 filed Dec. 26, 2012; U.S. Provisional Patent Application No. 61/746,074 filed Dec. 26, 2012; U.S. Provisional Patent Application No. 61/748,018 filed Dec. 31, 2012; U.S. Provisional Patent Application No. 61/792,582 filed Mar. 15, 2013; U.S. Provisional Patent Application No. 61/793,952 filed Mar. 15, 2013; International Patent Application No. PCT/EP2011/056432 filed Apr. 21, 2011; U.S. patent application Ser. No. 13/966,052 filed Aug. 13, 2013; U.S. Provisional Patent Application No. 61/747,789 filed Dec. 31, 2012; U.S. Provisional Patent Application No. 61/683,124 filed Aug. 14, 2012; U.S. patent application Ser. No. 14/099,818 filed Dec. 6, 2013; U.S. patent application Ser. No. 14/101,245 filed Dec. 9, 2013; U.S. patent application Ser. No. 14/101,258 filed Dec. 9, 2013; U.S. patent application Ser. No. 14/138,040 filed Dec. 21, 2013; U.S. patent application Ser. No. 14/138,052 filed Dec. 21, 2013; and U.S. patent application Ser. No. 14/138,058 filed Dec. 21, 2013, all of such applications are incorporated herein by reference in their entirety. Any of the techniques described herein, or described in other applications or patents referenced herein, may be applied to any of the various thermal devices, non-thermal devices, and uses described herein.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a non-uniformity correction (NUC) process or other calibration processes) for infrared imaging module 100 as would be understood by one skilled in the art.

In various embodiments, shutter 105 may be made from various materials such as, for example, polymers, glass, or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art. Alternatively, in another embodiment, a shutter (e.g., shutter 105 or other type of external or internal shutter) need not be provided, but rather a NUC process or other type of calibration may be performed using shutterless techniques.

FIGS. 5A-E illustrate cross-sectional views of infrared imaging modules 100 implemented with several form factors in accordance with various embodiments of the disclosure. In particular, each of FIGS. 5A-E shows a cross-sectional view of an infrared imaging module 100 while installed in a corresponding socket 104, and another cross-sectional view of the same infrared imaging module 100 but separated from its corresponding socket 104.

It will be appreciated that FIGS. 5A-E show a variety of physical implementations of various components identified in FIGS. 1-4. For example, FIG. 5A shows a physical implementation of infrared imaging module 100 and socket 104 corresponding to the embodiments illustrated in FIGS. 2-3, while FIGS. 5B-E show other examples of physical implementations.

It will also be appreciated that, in FIGS. 5A-C, electrical connections 126 may be provided in housing 120 as discussed to infrared sensor assembly 128 and circuit board 170. In contrast, in FIGS. 5D-E, wire bonds 143 and 145 may be used to connect infrared sensor assembly 128 to processing module 160. In one embodiment, wire bonds 143 and 145 may pass through base 150. In another embodiment, wire bonds 143 and 145 may connect to circuitry in base 150 without passing through base 150. In yet another embodiment, wire bonds 143 and 145 may connect to electrical connections 147 to provide electrical connections between various portions of infrared imaging module 100 to socket 104 and/or host device 102.

In some embodiments, sockets 104 shown in FIGS. 5A-E may be implemented as mobile telephone camera sockets available from, for example, Molex® Incorporated of Lisle, Ill. in accordance with various part numbers identified in Table 1 below. Table 1 further identifies various example aspects of sockets 104 shown in FIGS. 5A-E.

TABLE 1

Figure 5D:
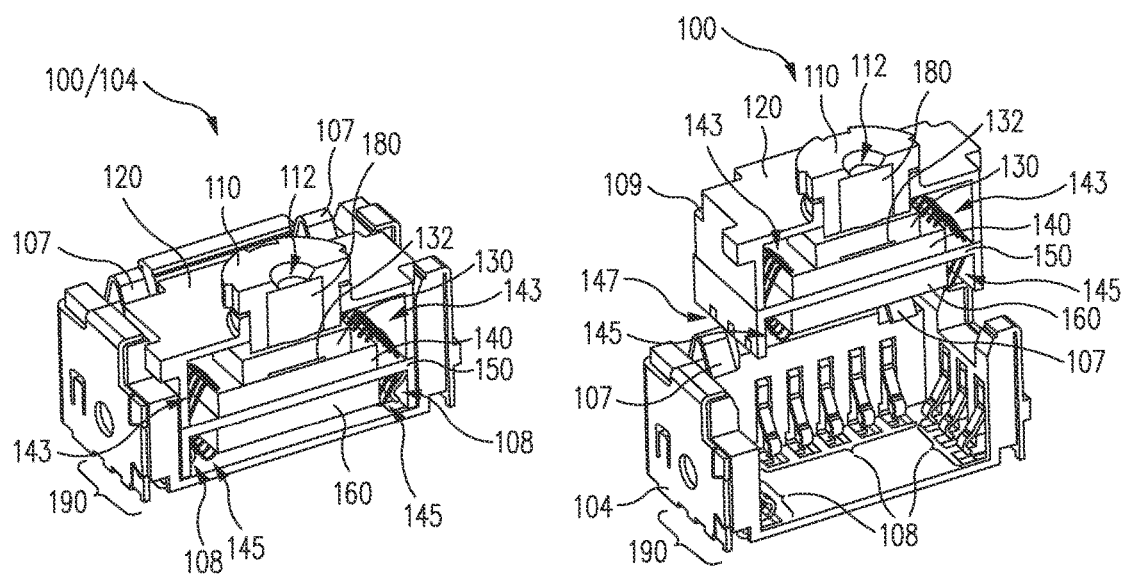

| | Internal Socket Size L x W (mm) | Socket Type | Part Number | Frame | Board | Overall Package Dimensions L x W x H (mm) | Camera Sub Assembly Dimensions L x W x H (mm) | Sensor Size (mm) | Window Size (mm) | Frame Thickness (mm) |
|---|---|---|---|---|---|---|---|---|---|---|
| FIG. 5A | 8.50 x 8.50 | Side Contact | SD-47337-001 | LDS-MID | PCB | 10.60 x 10.60 x 5.90 | 8.50 x 8.50 x 5.65 | 6.5 x 7.5 | 4.0 x 4.0 | 0.300 |
| FIG. 5B | 6.50 x 6.50 | Side Contact | SD-47586-001 | LDS-MID | PCB | 8.60 x 8.60 x 5.90 | 6.50 x 6.50 x 5.65 | 5.0 x 5.5 | 3.0 x 3.0 | 0.100-0.250 |
| FIG. 5C | 6.50 x 6.50 | Bottom Contact | SD-78499-001 | LDS-MID | PCB | 8.00 x 8.00 x 5.80 | 6.50 x 6.50 x 5.55 | 4.8 x 5.7 | 3.0 x 3.0 | 0.100-0.250 |
| FIG. 5D | 6.50 x 6.50 | Side | SD-47586-001 | LCP | Ceramic | 8.60 x | 6.50 x | 4.4 x 5.3 | 3.0 x 3.0 | 0.250 |

TABLE 1-continued

Figure 5E:
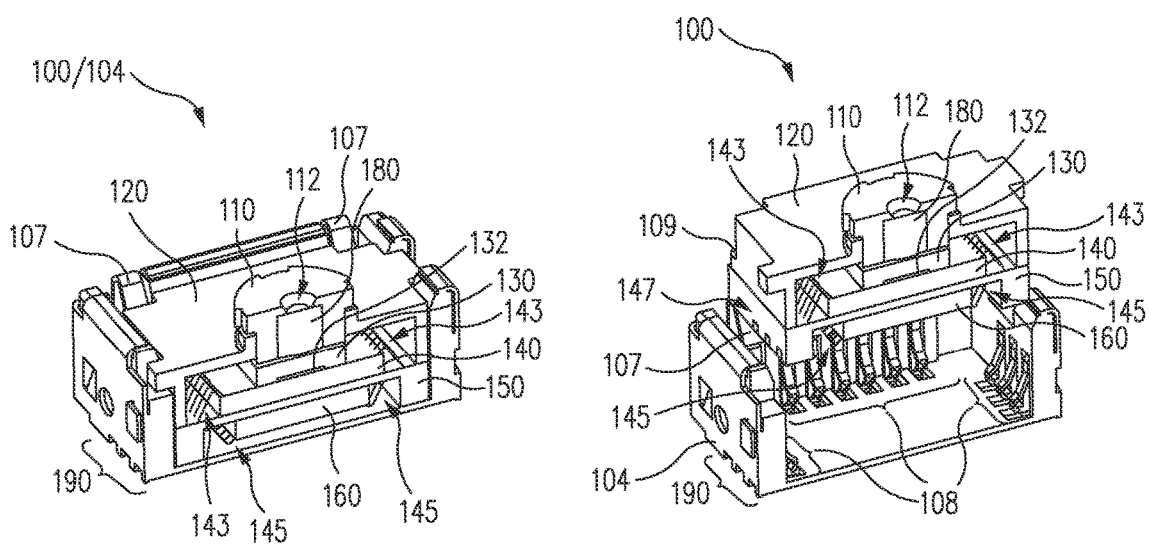

|  | Internal Socket Size L × W (mm) | Socket Type | Part Number | Frame | Board | Overall Package Dimensions L × W × H (mm) | Camera Sub Assembly Dimensions L × W × H (mm) | Sensor Size (mm) | Window Size (mm) | Frame Thickness (mm) |
|---|---|---|---|---|---|---|---|---|---|---|
| FIG. 5E | 8.50 × 8.50 | Contact Side Contact | SD-47337-001 | LCP | Ceramic | 8.60 × 5.00 10.60 × 10.60 × 5.00 | 6.50 × 4.75 8.50 × 8.50 × 4.75 | 5.5 × 5.5 | 4.0 × 4.0 | 0.400 |

Figure 5F:
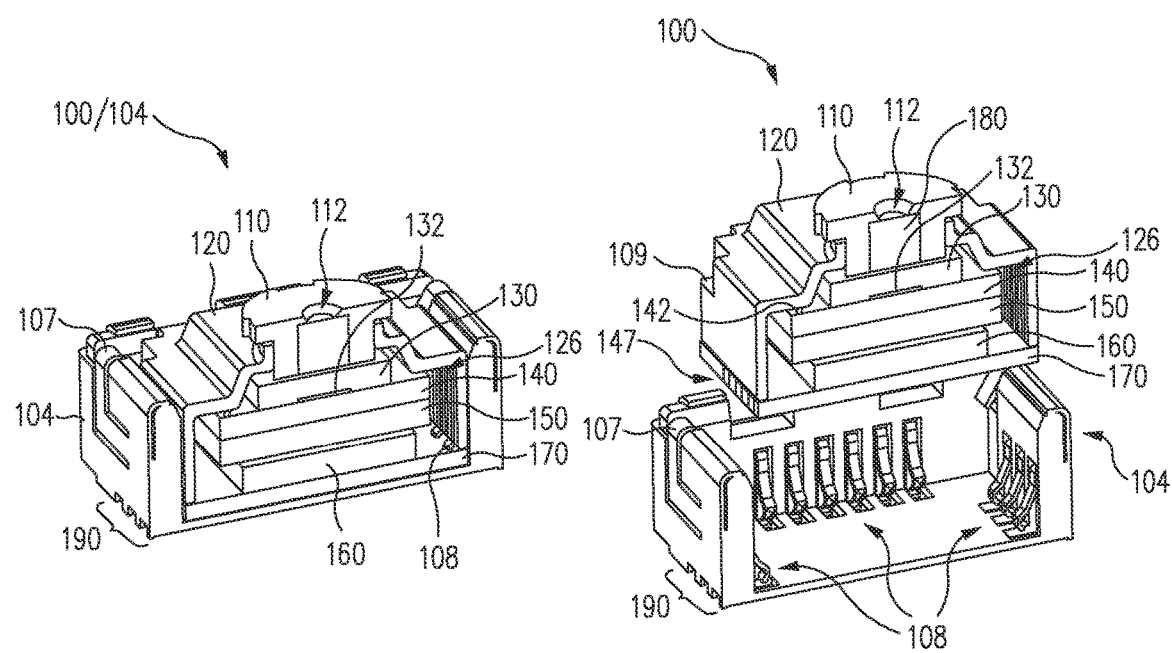
Figure 5H:
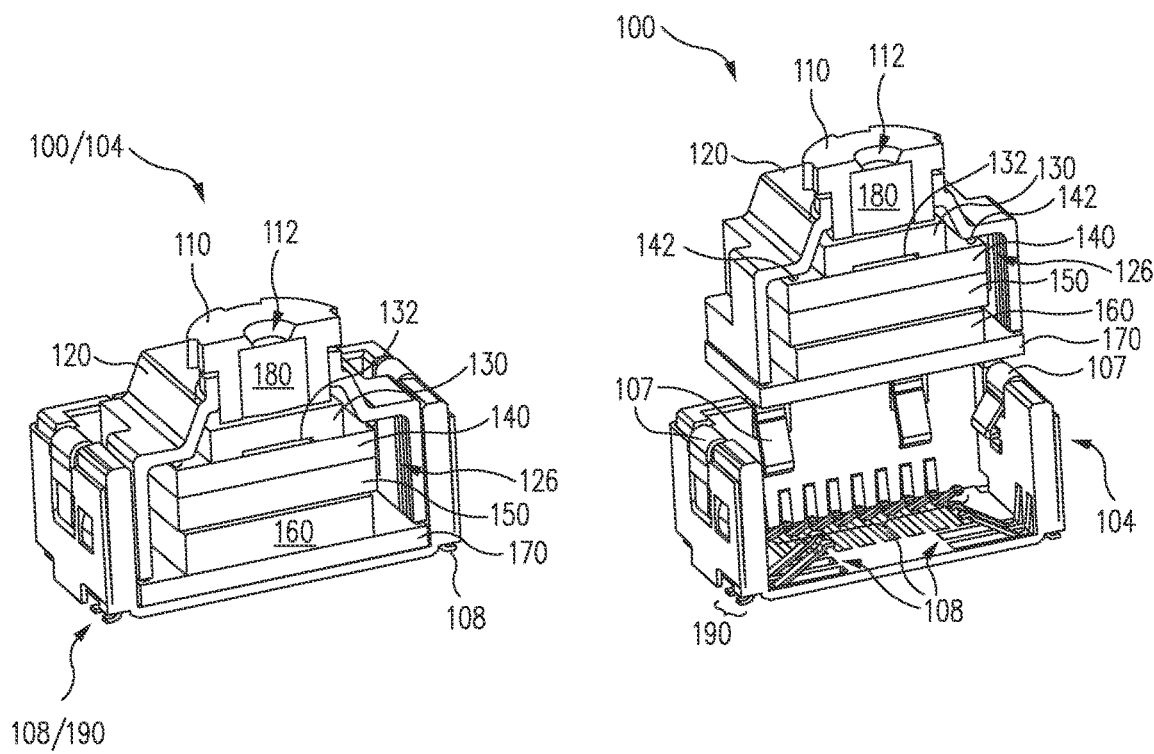
Figure 5I:
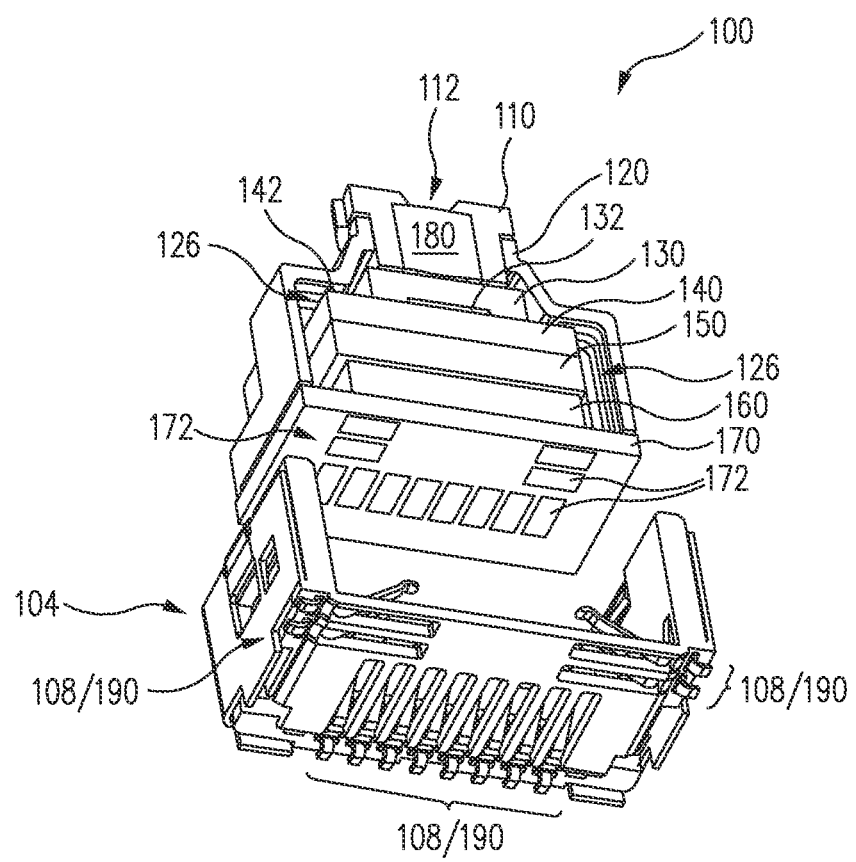
Figure 5J:
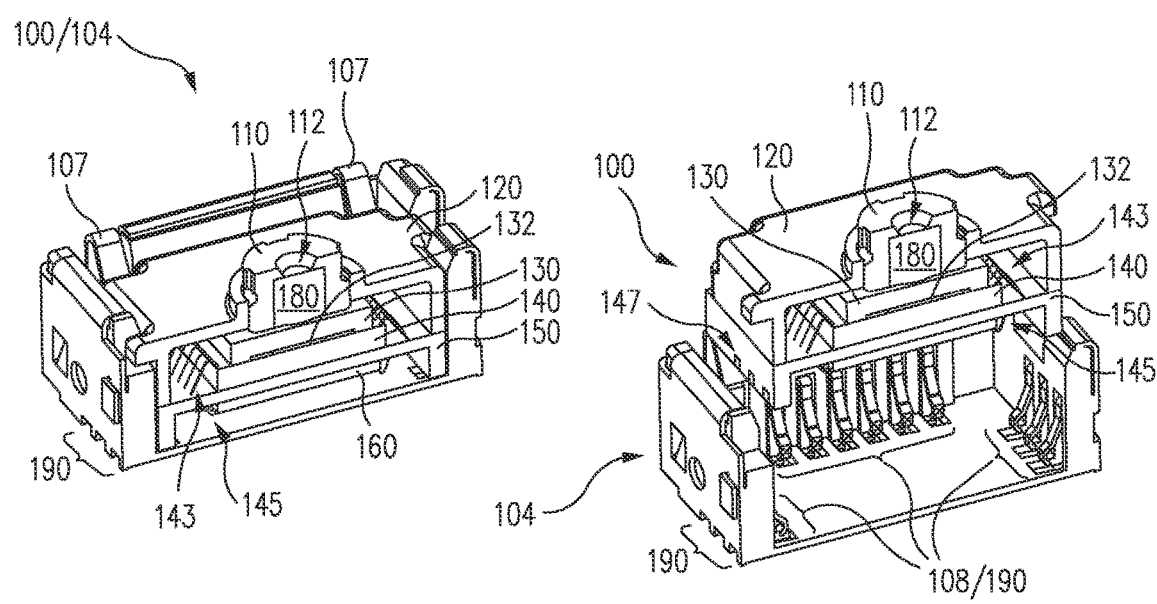
Figure 5K:
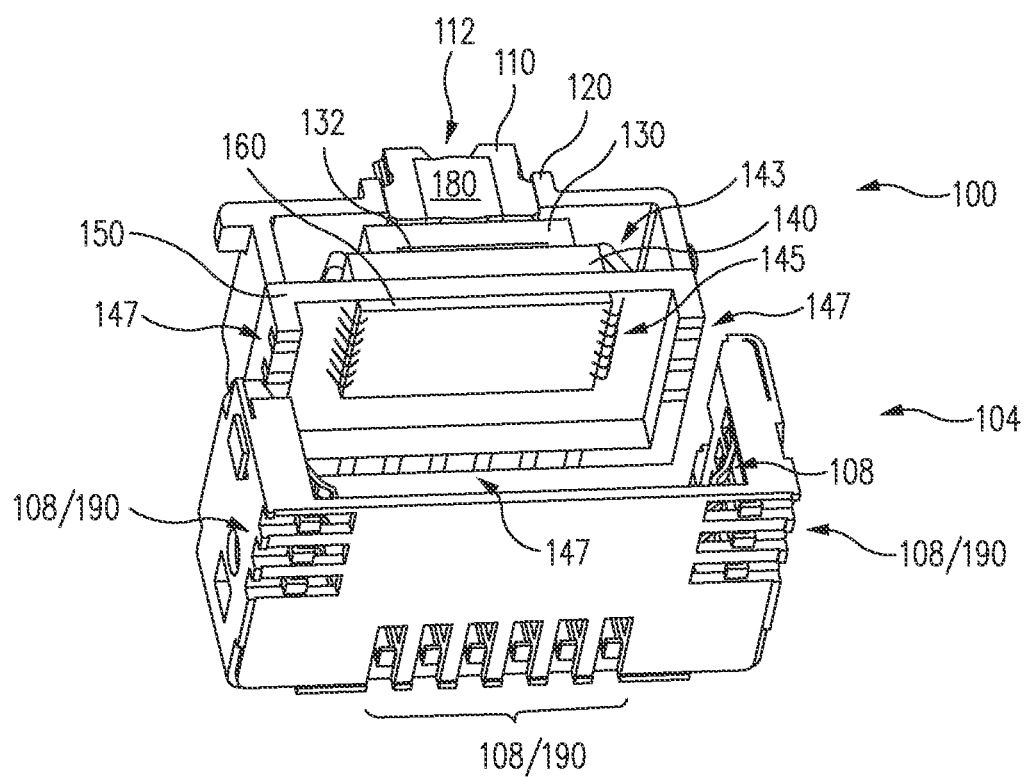
Figure 5L:
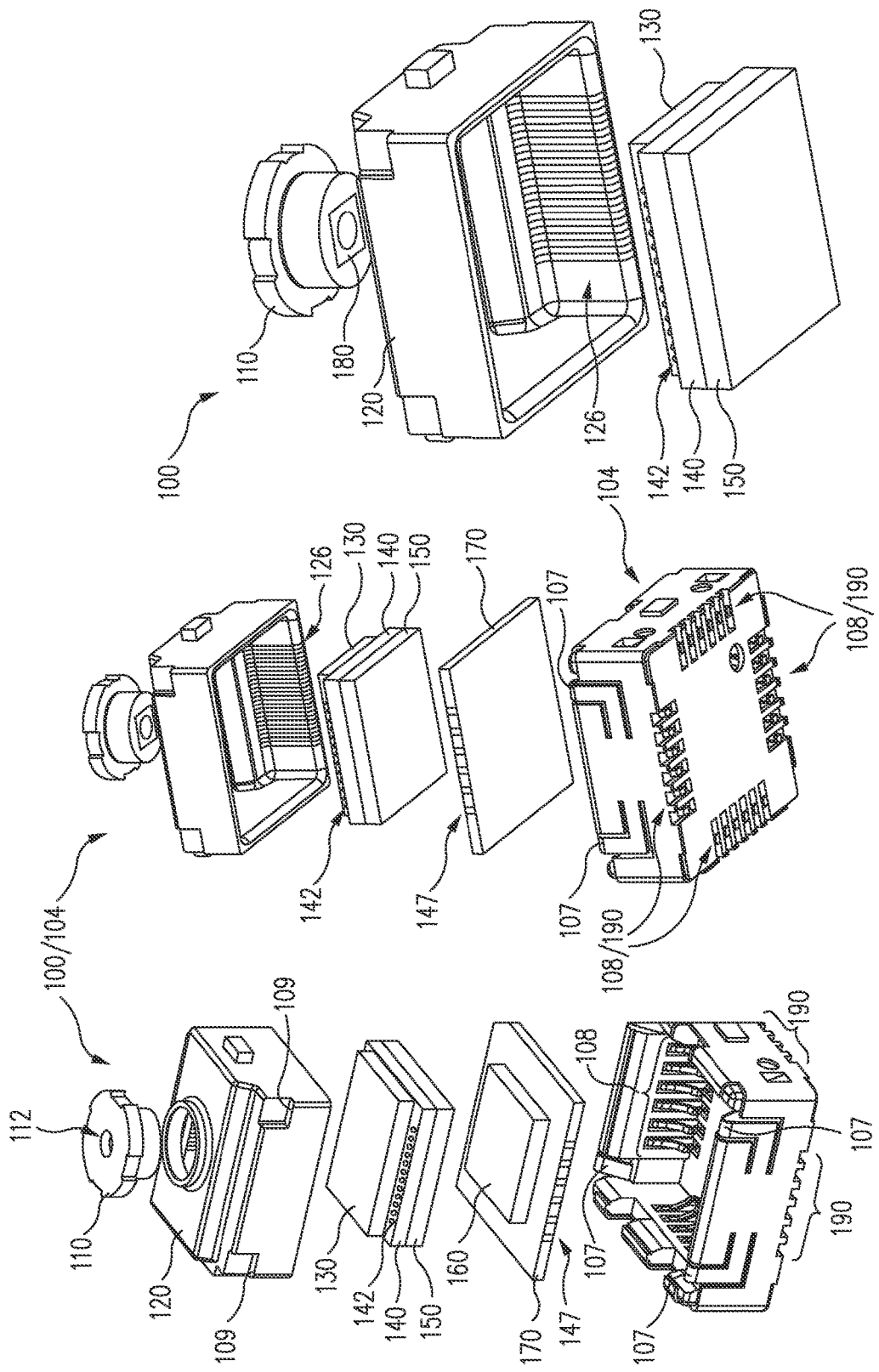
Figure 5M:
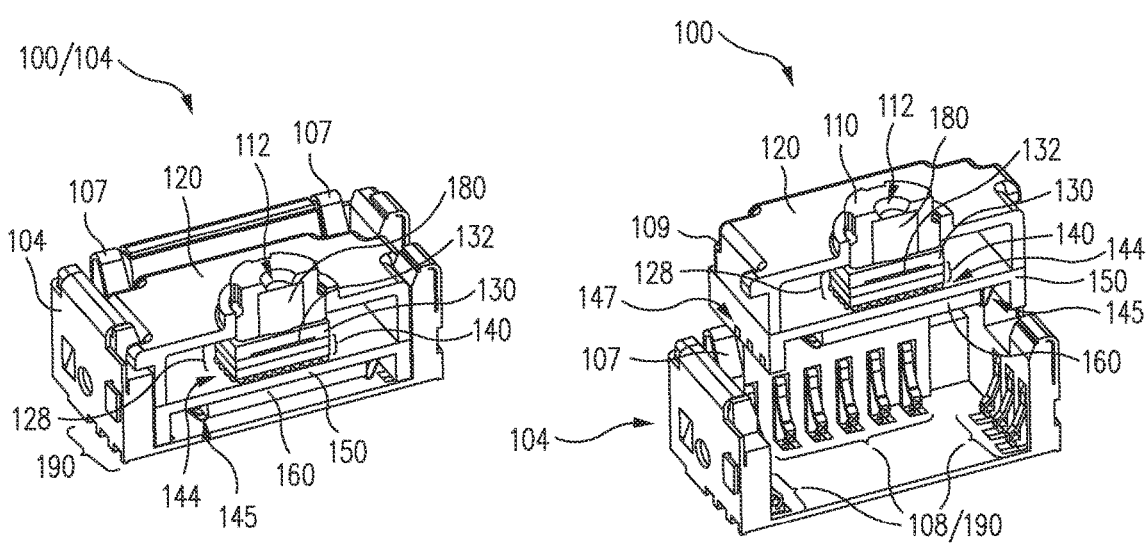
Figure 5N:
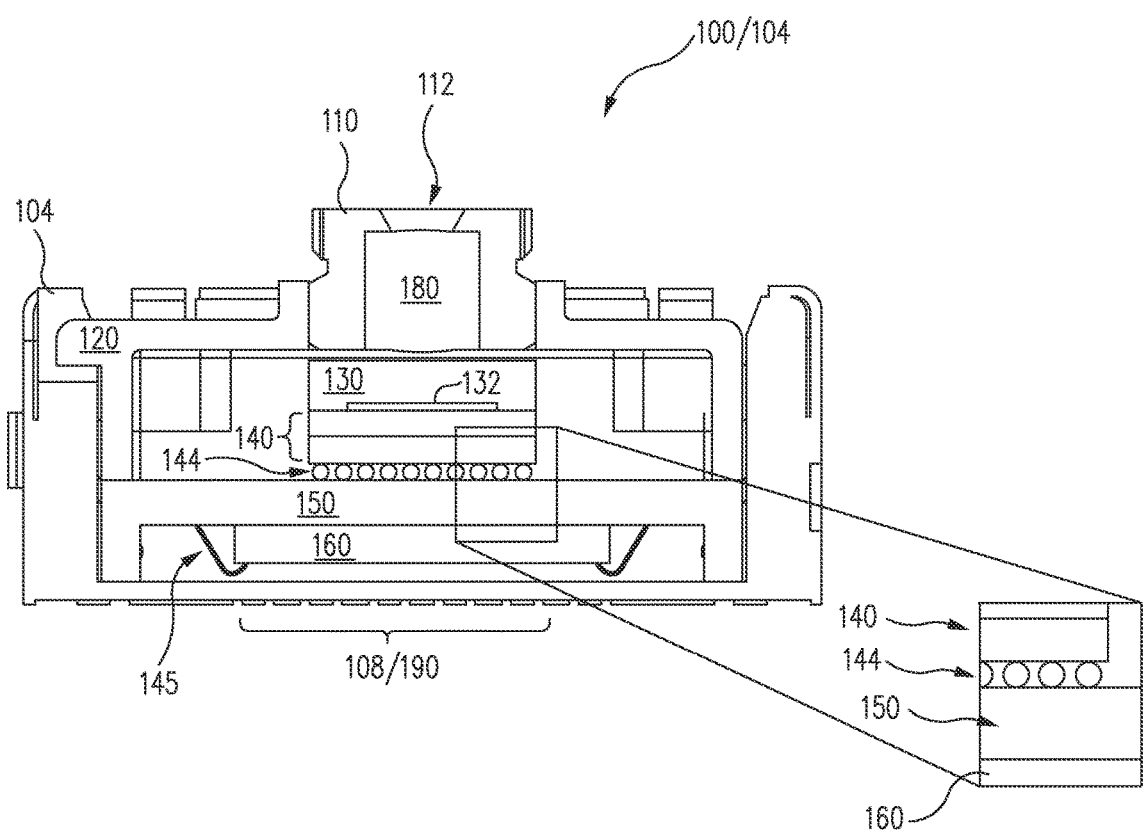
Figure 50:
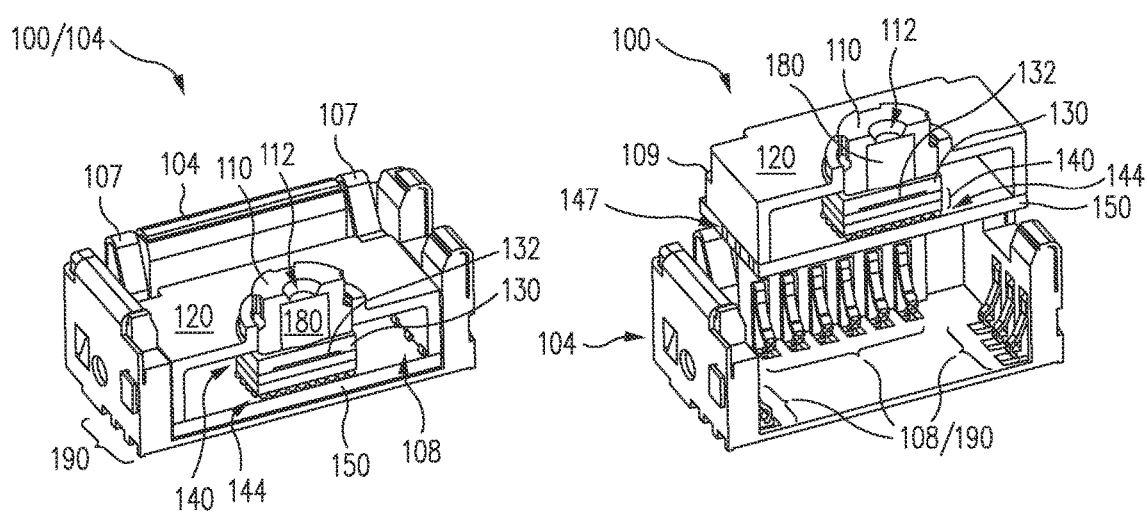
Figure 5P:
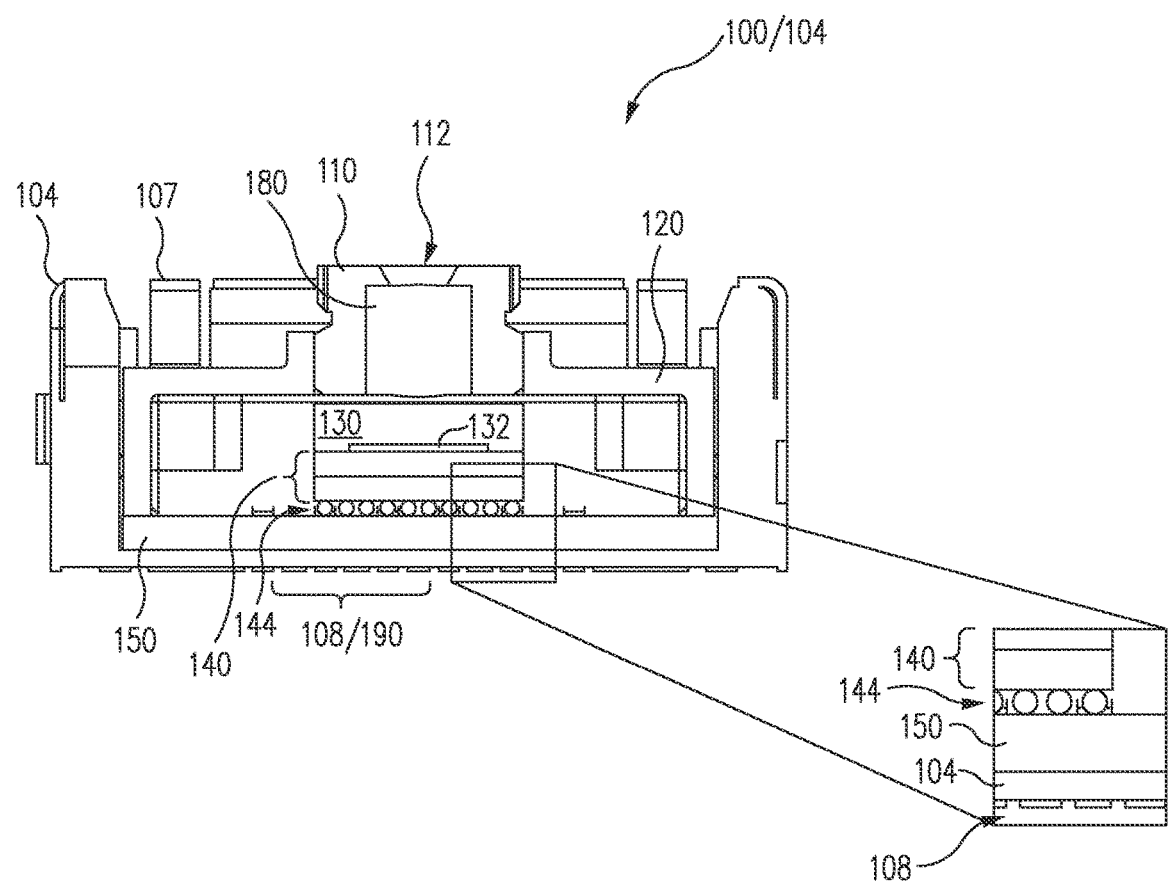

FIGS. 5F-P illustrate additional views of infrared imaging module 100 implemented with several form factors in accordance with various embodiments of the disclosure. For example, FIG. 5F illustrates an embodiment of infrared imaging module 100 similar to FIG. 5A. In FIG. 5F, electrical connections 126 are shown on an inside surface of housing 120. In addition, electrical connections 108 are depicted in a contrasting color for further clarity. Also, electrical connections 147 are shown on side surfaces of circuit board 170 which may connect to electrical connections 108.

FIG. 5G illustrates an embodiment of infrared imaging module 100 similar to FIG. 5A with electrical connections 108 depicted in a contrasting color for further clarity on a bottom surface of socket 104 which may be used to interface with appropriate connections of host device 102.

FIG. 5H illustrates an embodiment of infrared imaging module 100 similar to FIG. 5C. In FIG. 5H, electrical connections 126 are shown on an inside surface of housing 120. In addition, electrical connections 108 are depicted in a contrasting color for further clarity.

FIG. 5I illustrates an embodiment of infrared imaging module 100 that provides another view of the embodiment shown in FIG. 5H. In FIG. 5I, contacts 172 are shown on a bottom surface of circuit board 170 which may contact electrical connections 108 when infrared imaging module 100 is inserted into socket 104. Accordingly, it will be appreciated that the various components of infrared imaging module 100 may be electrically connected to host device 102 through contacts 172 and electrical connections 108.

FIG. 5J illustrates an embodiment of infrared imaging module 100 similar to FIG. 5D and with socket 104 similar to that illustrated in FIG. 5E. In FIG. 5J, electrical connections 108 are depicted in a contrasting color for further clarity. Also, electrical connections 147 are shown on side surfaces of circuit board 170 which may connect to electrical connections 108.

FIG. 5K illustrates an embodiment of infrared imaging module 100 that provides another view of the embodiment shown in FIG. 5J. In FIG. 5K, electrical connections 147 are further shown on bottom surfaces of circuit board 170 which may connect with appropriate electrical connections 108.

FIG. 5L illustrates several embodiments of infrared imaging module 100 in exploded views. For example, in FIG. 5L, electrical connections 126 are shown on an inside surface of housing 120. Also, electrical connections 147 are shown on side surfaces of circuit board 170 which may connect to electrical connections 108. In addition, electrical connections 108 are depicted in a contrasting color for further clarity inside socket and also on a bottom surface of socket 104 which may be used to interface with infrared imaging module 100 and host device 102.

FIG. 5M illustrates an embodiment of infrared imaging module 100 implemented with various components of infrared sensor assembly 128 (e.g., cap 130 and substrate 140) having a substantially uniform width. In one embodiment, such an implementation may permit the various components of infrared sensor assembly 128 to be singulated together during manufacture. In FIG. 5M, substrate 140 may be implemented with a split (e.g., multi-layer) implementation with the ROIC provided on one or both layers and connected to other circuitry of substrate 140 through the layers (e.g., through appropriate silicon vias or other connections). As also shown in FIG. 5M, substrate 140 may be connected to base 150 through solder balls 144 (e.g., to implement flip chip mounting), and processing module 160 may be connected to base 150 through wire bonds 145. FIG. 5N illustrates an embodiment of infrared imaging module 100 that provides another view of the embodiment shown in FIG. 5M.

FIG. 5O illustrates an embodiment of infrared imaging module 100 with infrared sensor assembly 128 implemented in a similar fashion as FIGS. 5M-N, In FIG. 5O, processing module 160 may be integrated as part of substrate 140.

FIG. 5P illustrates an embodiment of infrared imaging module 100 that provides another view of the embodiment shown in FIG. 5O. FIG. 5P further illustrates electrical connections 108 on a bottom surface of socket 104.

Additional implementations of infrared imaging modules 100 are also contemplated. For example, FIGS. 6-8 illustrate infrared imaging modules 100 implemented with several topologies in accordance with various embodiments of the disclosure.

Figure 6:
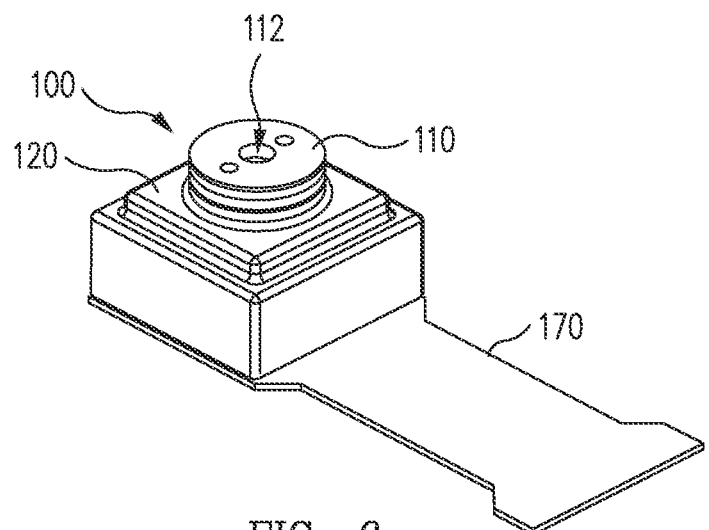
FIGS. 6-8 illustrate infrared imaging modules implemented with several topologies in accordance with various embodiments of the disclosure.

For example, FIG. 6 illustrates infrared imaging module 100 after encapsulation. FIG. 7 illustrates infrared imaging module 100 with processing module 160 mounted on circuit board 170 and external to housing 120 to provide a lower overall profile for imaging module 100.

Figure 7:
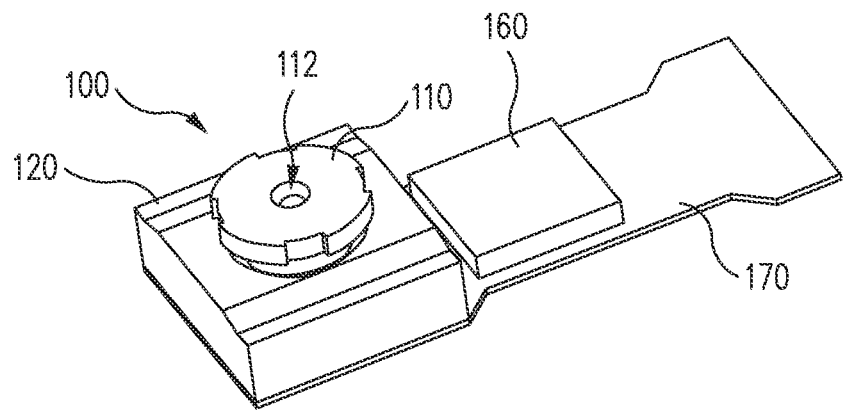
Figure 8:
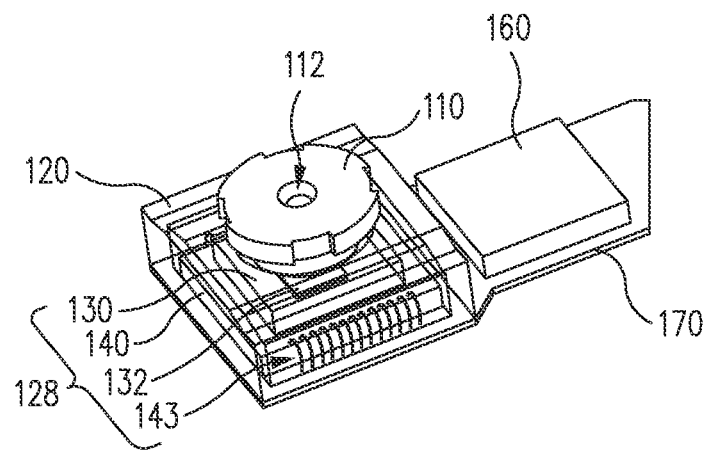

FIG. 8 illustrates infrared imaging module 100 of FIG. 7 with housing 120 shown transparent for purposes of illustrating examples of cap 130, an array of infrared sensors 132, and wire bonds 143. As shown in FIG. 8, various components of infrared sensor assembly 128 may be connected to circuit board 170 through wire bonds 143.

In accordance with additional embodiments of the disclosure, housing 120 may be implemented with a substantially non-metal cover configured to substantially or completely enclose various components of infrared imaging module 100. One or more metal layers may be disposed on various interior and/or exterior surfaces of the cover (e.g., a plurality, a majority, substantially all, or all of such surfaces). Such implementations may be used to reduce the effects of various environmental conditions which may otherwise adversely affect the performance of infrared imaging module 100. In addition, one or more conductive traces (e.g., electrical connections) may be built into housing 120 and/or on surfaces of housing 120 to facilitate the passing of signals from components of the infrared imaging device such as infrared sensor assembly 128, a temperature measurement component, and/or other components. These and other features and advantages will be further described herein.

Figure 9A:
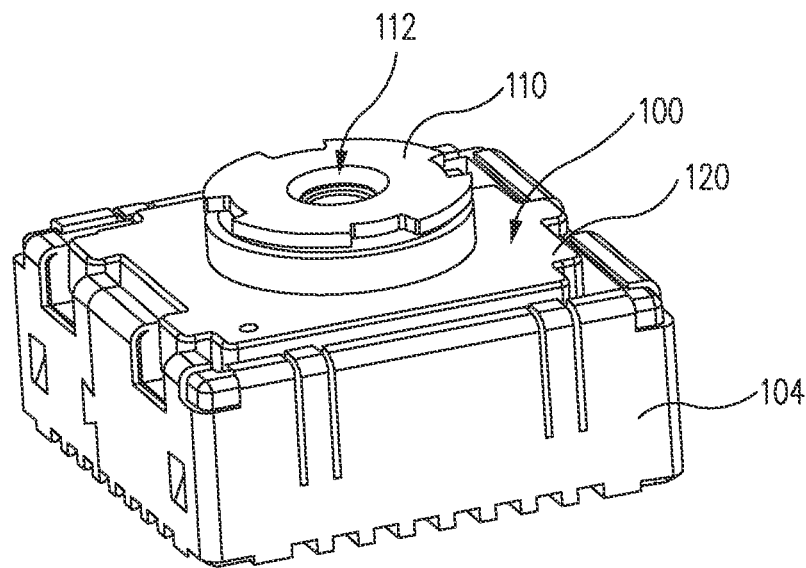
FIGS. 9A-B illustrate an infrared imaging module installed in a socket in accordance with various embodiments of the disclosure.
Figure 9B:
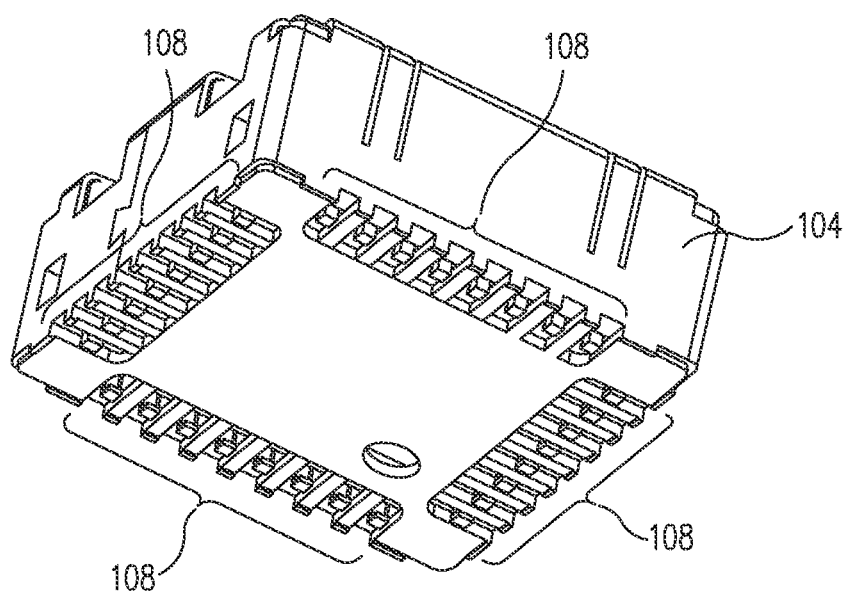

FIGS. 9A and 9B illustrate top perspective and bottom perspective views, respectively, of infrared imaging module 100 installed in socket 104 in accordance with various embodiments of the disclosure. As previously described and further shown in FIG. 9A, infrared imaging module 100 may include housing 120 and lens barrel 110 having aperture 112. As also previously described and further shown in FIG. 9B, socket 104 may include electrical connections 108 which may contact corresponding electrical connections of infrared imaging module 100.

Figure 10A:
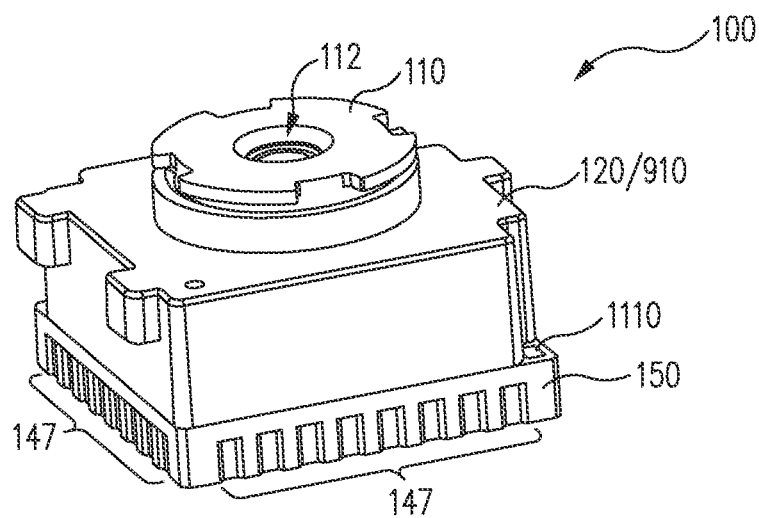
FIG. 10A illustrates the infrared imaging module of FIG. 9A removed from the socket in accordance with an embodiment of the disclosure.

FIG. 10A illustrates infrared imaging module 100 removed from socket 104 in accordance with an embodiment of the disclosure. As previously described and further shown in FIG. 10A, infrared imaging module 100 may include base 150 with electrical connections 147 to connect various portions of infrared imaging module 100 to socket 104 and/or host device 102.

Figure 10B:
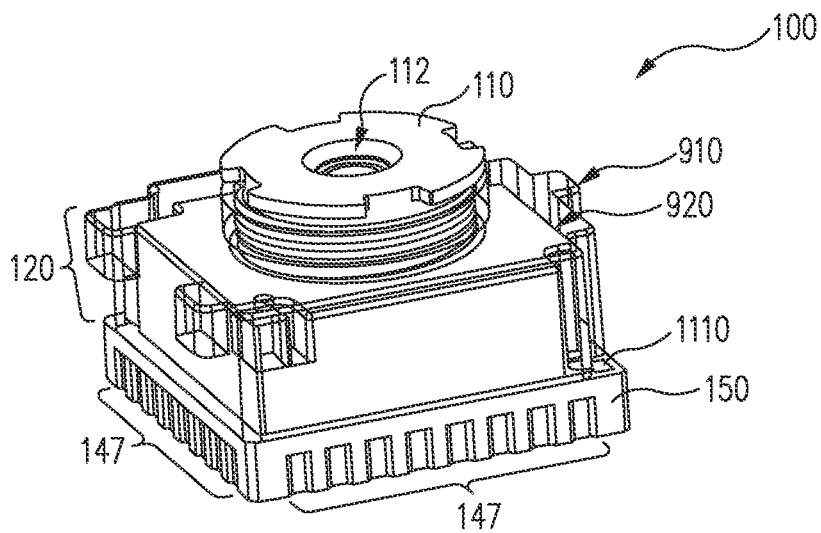
FIG. 10B illustrates the infrared imaging module of FIG. 9A with a cover of a housing shown in semi-transparent form to reveal a metal layer of the housing in accordance with an embodiment of the disclosure.

In FIG. 10A, housing 120 is shown having a substantially non-metal cover 910 with exposed exterior surfaces. In this illustrated embodiment, exterior surfaces of housing 120 are not covered by metal layers. FIG. 10B illustrates infrared imaging module 100 with cover 910 of housing 120 shown in semi-transparent form to reveal a metal layer 920 (e.g., a metalized surface) of housing 120 in accordance with an embodiment of the disclosure. In this illustrated embodiment, metal layer 920 is disposed on substantially all interior surfaces of cover 910.

Figure 10C:
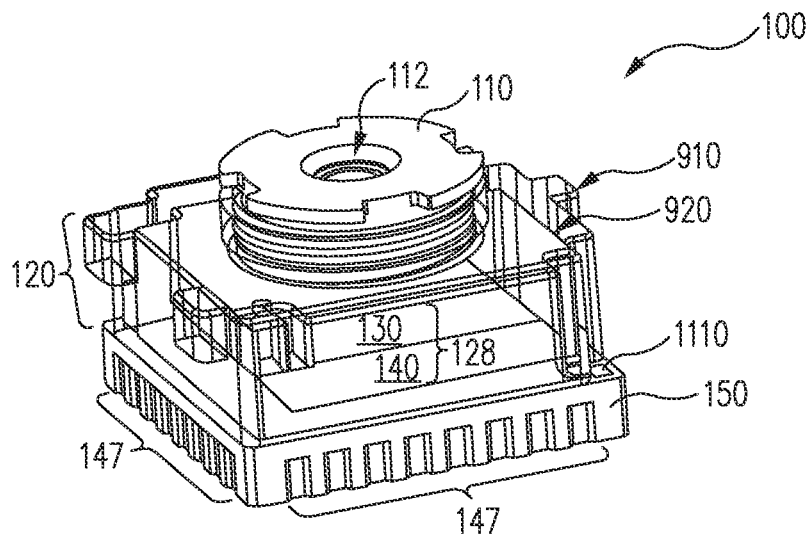
FIG. 10C illustrates the infrared imaging module of FIG. 9A with the cover and the metal layer both shown in semi-transparent form to reveal several components enclosed by the housing in accordance with an embodiment of the disclosure.

FIG. 10C illustrates infrared imaging module 100 with cover 910 and metal layer 920 both shown in semi-transparent form to reveal several components enclosed by housing 120 in accordance with an embodiment of the disclosure. In this regard, when infrared imaging module 100 is assembled, housing 120 may substantially enclose various components. For example, as shown in FIG. 10C, housing 120 may substantially enclose infrared sensor assembly 128 which may be implemented, for example, with a focal plane array in a vacuum package assembly sealed by cap 130 and substrate 140.

Although housing 120 is illustrated as having a generally square or rectangular shape in FIGS. 9A, 10A-C, and 12A-E (further described herein), any desired shape may be used to at least partially or completely enclose one or more desired components of infrared imaging module 100. In addition, although housing 120 is illustrated as mounted on base 150 in FIGS. 10A-C, other mounting configurations are also contemplated. Any desired set of components may be substantially or completely enclosed by housing 120 in various embodiments to seal such components from external environments.

Figure 11A:
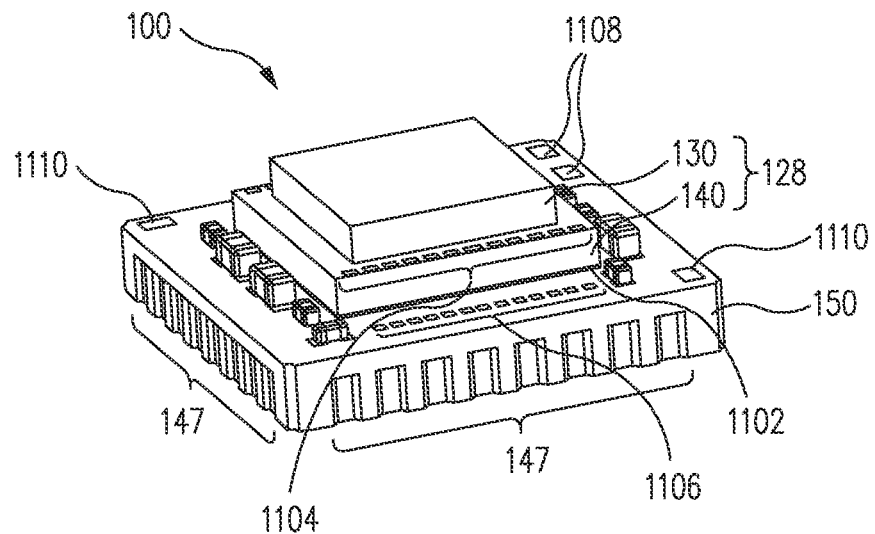
FIGS. 11A-B illustrate the infrared imaging module of FIG. 9A with the housing removed in accordance with various embodiments of the disclosure.
Figure 11B:
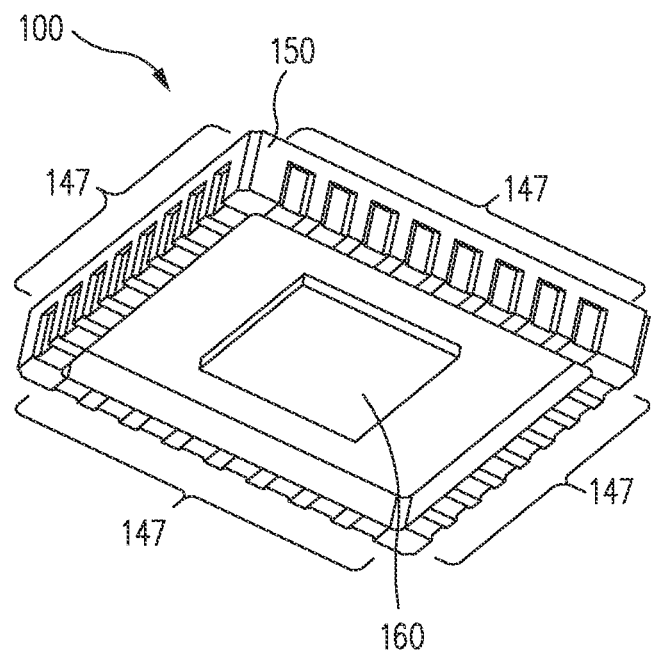

FIGS. 11A-B illustrate infrared imaging module 100 with housing 120 removed in accordance with various embodiments of the disclosure. For example, in FIG. 11A, cap 130 and substrate 140 of infrared sensor assembly 128 are shown mounted on base 150 with a thermal spreader 1102 (e.g., copper or graphite in some embodiments) therebetween. Also in FIG. 11A, wire bond contacts 1104 and 1106 are shown on substrate 140 and base 150, respectively, to receive wire bonds 143 (not shown in FIG. 11A).

In FIG. 11B, processing module 160 is illustrated as being mounted on an underside of base 150. For example, in some embodiments, processing module 160 may be connected to substrate 140 through wire bonds 143 and 145 (not shown in FIG. 11B) as previously described.

FIGS. 12A-E illustrate several views of housing 120 in accordance with various embodiments of the disclosure. As discussed, housing 120 may include a cover 910 and one or more metal layers. Cover 910 may be a substantially non-metal cover implemented with material having relatively low thermal conductivity and relatively high emissivity (e.g., emissivity in a range of approximately 0.8 to approximately 0.95 in some embodiments). For example, cover 910 may be comprised substantially of plastic and/or other appropriate material. One or more metal layers 920 may be disposed on various interior and/or exterior (e.g., inside and/or outside) surfaces of cover 910 (e.g., a plurality, a majority, substantially all, or all of such surfaces). For example, in one embodiment, metal layer 920 may be disposed on various interior surfaces of cover 910 facing infrared sensor assembly 128 in the manner shown in FIGS. 12A-D. In another embodiment, metal layer 920 may be disposed on various exterior surfaces of cover 910 that face external components or external environments. In another embodiment, combinations of interior and exterior metal layers 920 may be used. For example, in FIG. 12E, two metal layers 920 are shown on interior and exterior surfaces, denoted 920A and 920B, respectively. In some embodiments, cover 910 may undergo a metalization process in which various metal layers are deposited and/or otherwise provided on cover 910.

As shown in FIGS. 12A-E and 13, housing 120 may include various conductive traces 930 that are electrically isolated from metal layer 920. In various embodiments, conductive traces 930 may be provided on one or more interior surfaces, one or more exterior surfaces, and/or in walls of cover 910. In various embodiments, conductive traces 930 may be used to provide electrical connections between various components within an interior cavity 912 enclosed by housing 120 (e.g., the space occupied by infrared sensor assembly 128 and/or other components) and/or from various components within cavity 912 to an exterior of housing 120. In one embodiment, insulating material (e.g., having low electrical conductivity) may be provided in areas 940 between conductive traces 930 and metal layer 920. In another embodiment, conductive traces 930 may be substantially surrounded by insulating material. In yet another embodiment, voids (e.g., empty spaces) may be introduced between conductive traces 930 and metal layer 920 such that the substantially non-conductive cover 910 is exposed and effectively insulates conductive traces 930 from metal layer 920.

In various embodiments, metal layer 920 may be implemented with material having relatively high thermal conductivity, relatively low emissivity (e.g., emissivity in a range of approximately 0.02 to approximately 0.11 in some embodiments), and having a tendency to maintain these properties despite exposure to a variety of environmental conditions over several years.

In some embodiments, metal layer 920 may be implemented as one or more layers disposed on cover 910 (e.g., disposed directly on cover 910 and/or on top of one or more intermediate layers and/or structures). In some embodiments, metal layer 920 may be implemented by a plurality of sublayers of different metals, each of which may have beneficial characteristics to permit the multi-layered implementation to achieve improved performance over a single layer implementation using a single type of metal.

For example, a copper sublayer may be provided at low cost which exhibits high thermal conductivity and affixes well to plastic. Such a copper sublayer may oxidize rapidly to a high emissivity and thus may be coated in some embodiments. As another example, a nickel sublayer may be provided which maintains low emissivity even after oxidation. As another example, a gold sublayer may be expensive to deposit in thick layers and may not affix well to plastic, but exhibits low emissivity and generally resists oxidization. Thus, by implementing metal layer 920 as multiple sublayers, metal layer 920 may exhibit various advantages associated with different types of metals, while also compensating for various performance tradeoffs associated with particular types of metals.

Figure 12A:
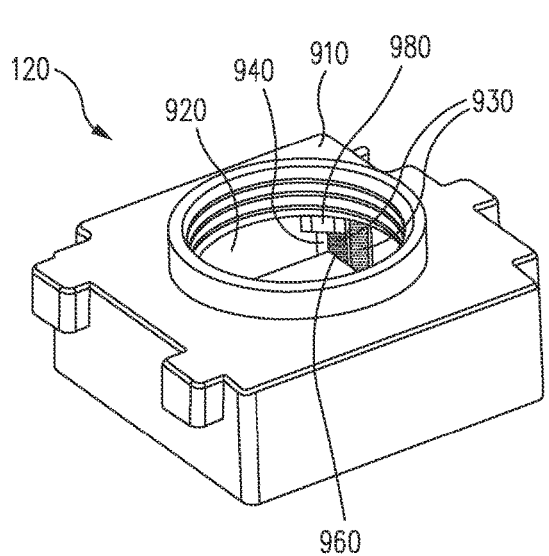
FIGS. 12A-D illustrate several views of the housing of the infrared imaging module of FIG. 9A having an interior metal layer in accordance with various embodiments of the disclosure.
Figure 12B:
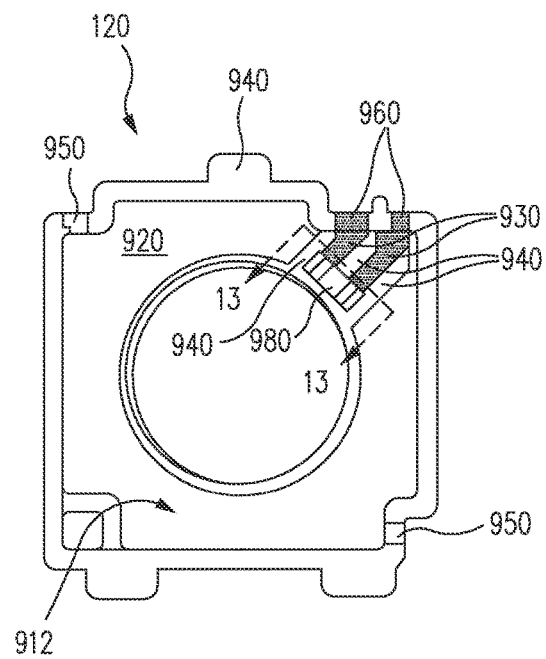
Figure 13:
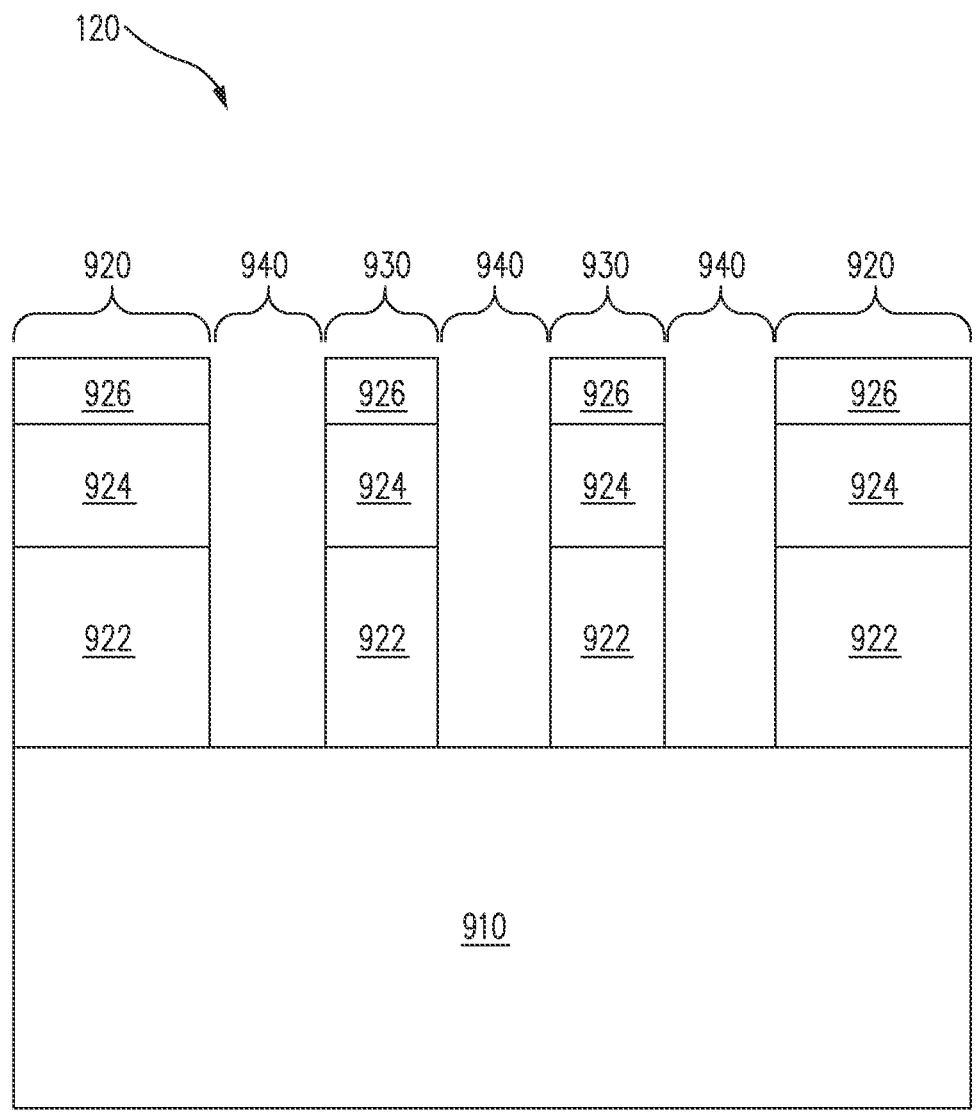
FIG. 13 illustrates a cross section of housing 120 taken at line 13-13 of FIG. 12B in accordance with an embodiment of the disclosure.

In this regard, FIG. 13 illustrates a cross section of housing 120 taken at line 13-13 of FIG. 12B in accordance with an embodiment of the disclosure. In FIG. 13, metal layer 920 is implemented as a plurality of sublayers on cover 910. In this illustrated embodiment, metal layer 920 may include: a copper sublayer 922 (e.g., a base sublayer) disposed on cover 910 having a thickness of approximately 10 µm; a nickel sublayer 924 (e.g., an intermediate sublayer) having a thickness of approximately 6 µm (e.g., or thicker to improve the performance of metal layer 920 in providing electromagnetic interference shielding further described herein); and/or a gold sublayer 926 (e.g., a top sublayer) having a thickness in a range of approximately 0.1 µm to approximately 3 µm.

Figure 12C:
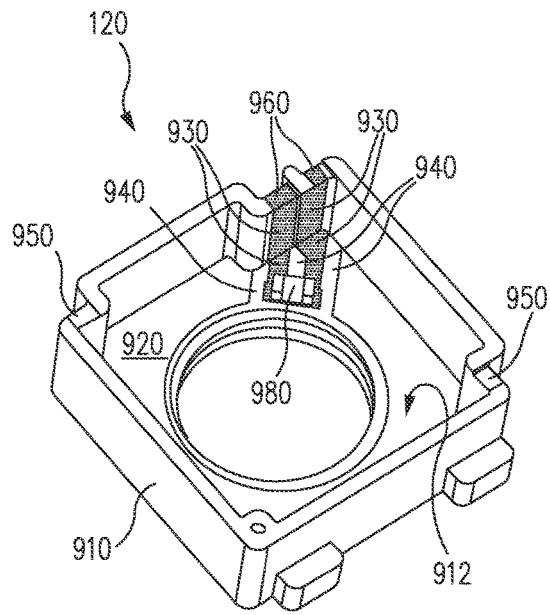
Figure 12D:
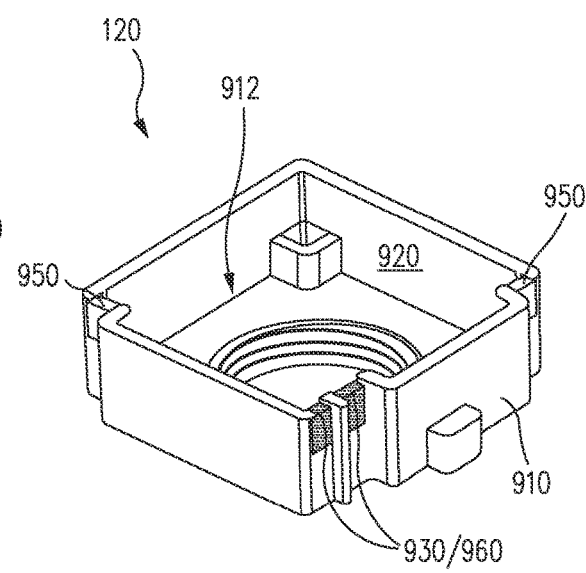
Figure 12E:
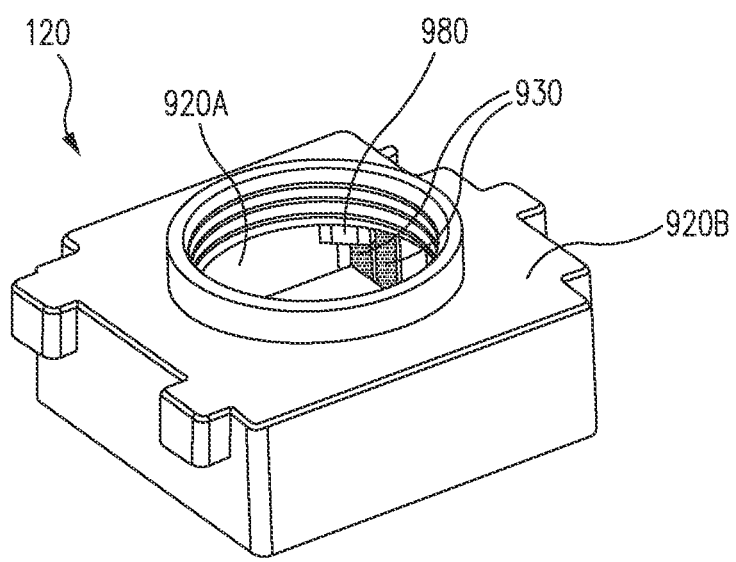
FIG. 12E illustrates a housing having interior and exterior metal layers in accordance with an embodiment of the disclosure.

As shown in FIGS. 12B-D, metal layer 920 may be implemented to extend at areas 950 over a lip of cover 910 and onto an outer surface of cover 910. Areas 950 may be used, for example, to electrically connect metal layer 920 to one or more electrical connections 1110 (see FIGS. 10A-C and 11A).

Similarly, as shown in FIGS. 12A-D, conductive traces 930 may be implemented to extend at areas 960 over a lip of cover 910 and onto an outer surface of cover. Areas 960 may be used, for example, to electrically connect one or more conductive traces 930 to one or more electrical connections 1108 (see FIG. 11A).

Electrical connections 1108 and 1110 may be used for various purposes including, for example, grounding, production assembly evaluation, operation (e.g., to transmit and/or receive electrical signals between various components), and/or other purposes as appropriate. In some embodiments, conductive epoxy or solder may be provided to secure and electrically connect areas 950 and/or 960 to one or more electrical connections 1110 and/or 1108, respectively.

In some embodiments, housing 120 may be manufactured in a manner that permits conductive traces 930 and/or other components to be included in or on housing 120. For example, conductive traces 930 may be manufactured as part of metal layer 920. In this regard, conductive traces 930 may be efficiently provided with metal layer 920 during a metalization operation, and then electrically isolated from the remainder of metal layer 920 by appropriate insulating material or voids. Moreover, by providing conductive traces 930 as part of a metalization process for metal layer 920, the overall cost of housing 120 may be reduced over conventional approaches using discrete wires/cables to provide electrical connections.

For example, in the embodiment illustrated in FIG. 13, conductive traces 930 have be formed as part of a metallization process for metal layer 920 using the same sublayers 922, 924, and 926. Voids in areas 940 may be formed, for example, by masking cover 910 during formation of metal layer 920, etching area 940 after formation, and/or other appropriate techniques.

In some embodiments, housing 120 may be a molded interconnect device (MID) manufactured in accordance with appropriate injection molding techniques. In this regard, housing 120 may be implemented with electrical connections (e.g., electrical connections 126 described herein or others as appropriate).

In some embodiments, various components may be partially or fully embedded (e.g., implanted, formed, or otherwise provided) in housing 120, or mounted on appropriate interior or exterior surfaces of housing 120 using such manufacturing techniques. For example, as shown in FIGS. 12A-C and 12E, a temperature measurement component 980 (e.g., a thermistor, temperature diode, and/or other appropriate component) may be provided. Temperature measurement component 980 may also be electrically connected to one or more conductive traces 930 and/or electrical connections 126. As a result, temperature measurement component 980 may provide signals used to accurately measure temperatures associated with housing 120. Such temperatures may include, for example, temperatures of housing 120 itself, temperatures of cavity 912, temperatures of components disposed in cavity 912, and/or other related temperatures.

For example, signals from temperature measurement component 980 may be carried by conductive traces 930 and/or electrical connections 126 from the walls of housing 120 or cavity 912 to appropriate components external to housing 120 and/or appropriate components of infrared imaging module 100 for processing. Such temperature measurements may be used to more accurately determine radiation contributions from out-of-field sources, improve the thermographic accuracy of the infrared sensor assembly 128, and perform various non-uniformity correction processes such as supplemental flat field corrections and/or to correct for out-of-field radiation.

By providing metal layer 920 on interior and/or exterior surfaces of cover 910, various problems associated with conventional infrared imaging systems may be substantially reduced. For example, conventional systems may experience reduced thermographic accuracy and may exhibit low spatial frequency non-uniformity resulting from undesired external radiation, such as out-of-field radiation that is received from a location outside a field of view of a target scene desired to be imaged, and/or received from various components of such systems.

These undesired external radiation effects may be substantially reduced in infrared imaging module 100 by the low emissivity of metal layer 920. In particular, the low emissivity of metal layer 920 may reduce the effects of out-of-field radiation received by infrared sensor assembly 128 by reducing the power emitted by housing 120 toward infrared sensor assembly 128.

In this regard, the power emitted by a surface may be expressed as $W(\lambda,T)*e$, where $\lambda$ is the wavelength of infrared radiation, $T$ is the temperature of the surface, and $e$ is the emissivity of the surface. Thus, the emitted power may be considered a linear function of the emissivity.

Metal such as gold has an emissivity of approximately 0.02, nickel has an emissivity in a range of approximately 0.05 to approximately 0.11, and aluminum has an emissivity in a range of approximately 0.05 to approximately 0.09, all of which may be substantially less than that of cover 910 (e.g., having an emissivity in a range of approximately 0.8 to approximately 0.95 in the case of plastic or similar material). Accordingly, considering the emissivities discussed above, power emitted from metal layer 920 may be approximately one tenth of that emitted from cover 910.

Thus, with metal layer 920 present, less out-of-field radiation (e.g., power) is received by infrared sensor assembly 128 in response to temperature changes in cover 910

(e.g., an approximately 90% reduction in some embodiments). The reduced power emitted by metal layer 920 in comparison to cover 910 results in corresponding smaller output changes experienced by infrared sensor assembly 128 in response to such radiation (e.g., fewer effects of out-of-field radiation will be represented in image frames captured by infrared sensor assembly 128). As a result, infrared sensor assembly 128 may be operated with greater thermographic accuracy, as there is less need to compensate for out-of-field radiation when performing temperature measurements of objects in a target scene. In addition, the reduced amount of radiation emitted by metal layer 920 in comparison to cover 910 may result in infrared sensor assembly 128 exhibiting less low spatial frequency non-uniformity. Also, by reducing the radiation received by infrared sensor assembly 128, possible errors in estimating contributions of out-of-field radiation may be correspondingly reduced. As a result, infrared sensor assembly 128 may be operated with improved thermographic accuracy and uniformity.

Metal layer 920 may be used to improve the thermal conductivity of infrared imaging module 100 and thus reduce additional problems associated with conventional infrared imaging systems. In this regard, conventional systems may experience non-uniform heating (e.g., hot spots) from various components (e.g., mounted inside or outside a housing) and/or various external heat sources. As a result, the temperature distribution across such systems may vary significantly, especially as various components are selectively switched on and off. If left uncorrected, non-uniform heating of a housing may result in low spatial frequency non-uniformities exhibited at the sensors.

Such non-uniform heating effects may be substantially reduced in infrared imaging module 100 by the high thermal conductivity of metal layer 920. Cover 910 may be implemented with a material (e.g., comprised substantially of plastic and/or other material) having relatively low thermal conductivity (e.g., also a relatively slow thermal time constant). However, by providing metal layer 920 with a higher thermal conductivity (e.g., also a faster thermal time constant) than cover 910, heat may be more uniformly distributed around infrared sensor assembly 128 and thus reduce the detrimental effects of non-uniform heating, especially where infrared imaging module 100 is used in close proximity to other components, such as in personal electronic devices.

In addition, the high thermal conductivity of metal layer 920 may permit components of infrared imaging module 100 to be more effectively cooled by convection. In this regard, heat generated by infrared sensor assembly 128 and processing module 160 may be received by the various surfaces of metal layer 920 and passed to housing 120 which provides a large surface area for convection cooling. As a result, temperature variations in housing 120 may be reduced to allow for more accurate temperature measurements of housing 120 (e.g., by temperature measurement component 980). In some embodiments, the increased heat flow in housing 120 permits infrared imaging module 100 to achieve a lower steady state operating temperature which improves the dynamic range of infrared sensors 132 and the reliability of infrared imaging module 100.

Metal layer 920 may also be used to provide an electromagnetic interference (EMI) shield in a manner that overcomes several problems associated with conventional approaches. In this regard, conventional systems may utilize EMI shields implemented as separate structures that must be positioned over various components for shielding. Such structures occupy valuable space, reduce convective cooling, and involve additional assembly costs, all of which make them poorly suited to small form factor applications.

These drawbacks may be substantially reduced by metal layer 920. In some embodiments, metal layer 920 may be grounded (e.g., at areas 950 as discussed) and operate as an EMI shield. In particular, metal layer 920 may operate as a shield to substantially attenuate EMI emitted by infrared sensor assembly 128, processing module 160, and/or various components enclosed by housing 120 to thus shield components of host device 102 and/or an external environment from the EMI and reduce possible interference. Metal layer 920 may also operate as a shield to substantially attenuate external EMI (e.g., EMI incident on cover 910) to shield infrared sensor assembly 128 and/or various components enclosed by housing 120.

Thus, in contrast to conventional EMI shields, metal layer 920 effectively provides a compact EMI shield integrated with housing 120 that does not occupy additional external space and does not require the fitting of additional external components (e.g., thus reducing materials and assembly costs). In addition, as discussed herein in some embodiments, metal layer 920 may actually improve the cooling of infrared imaging module 100.

Figure 14:
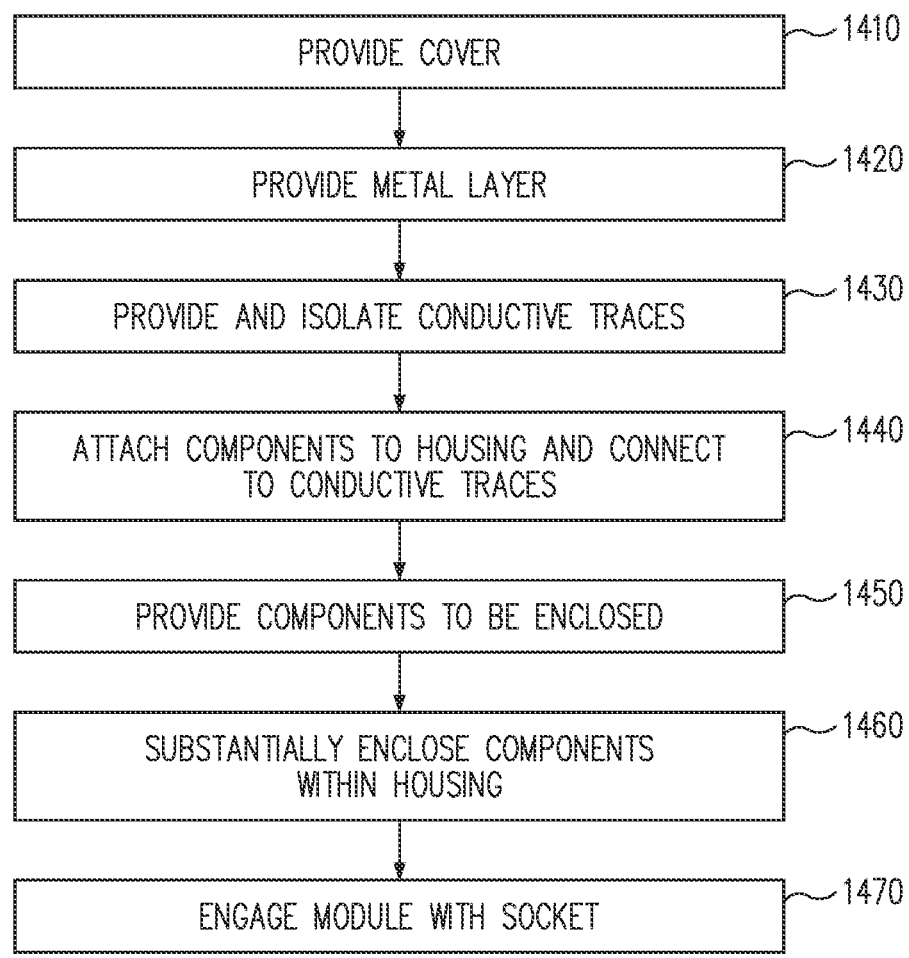
FIG. 14 illustrates a process for manufacturing the infrared imaging module of FIG. 9A in accordance with an embodiment of the disclosure.

FIG. 14 illustrates a process for manufacturing infrared imaging module 100 in accordance with an embodiment of the disclosure. Although particular operations are identified in FIG. 14, fewer or greater numbers of operations may be performed as desired in accordance with appropriate manufacturing techniques.

At operation 1410, cover 910 is provided. In some embodiments, operation 1410 may include forming cover 910 using MID techniques to partially or fully embed various electrical connections 126 and/or components (e.g., temperature measurement component 980 or others) within cover 910. In addition to and/or in the alternative, components may be attached and/or connected in operation 1440 further described herein.

At operation 1420, metal layer 920 is provided. In some embodiments, operation 1420 may be performed by metalizing surfaces of cover 910 as part of a MID manufacturing process (e.g., as part of operation 1410), thus saving cost and time. In some embodiments, metal layer 920 may be formed as a single layer and/or several sublayers (e.g., sublayers 922, 924, 926, and/or others) in accordance with appropriate metalization techniques. In some embodiments, cover 910 may be appropriately masked during operation 1420 to define conductive traces 930 and/or areas 940. In this regard, conductive traces 930 may be formed as portions of metal layer 920 during operation 1420. In other embodiments, conductive traces 930 and/or areas 940 may be provided in other operations.

At operation 1430, conductive traces 930 are provided (e.g., if not already provided in operation 1420). In some embodiments, operation 1430 may include etching and/or otherwise removing portions of metal layer 920 to expose areas 940 and thus define conductive traces 930 from metal layer 920. In other embodiments, conductive traces 930 may be metal that is separately provided in operation 1430. For example, portions of metal layer 920 may be removed in areas 940 and also in areas designated to receive conductive traces 930. One or more metal layers for conductive traces 930 may then be provided in appropriate removed areas between existing portions of metal layer 920.

In some embodiments, operation 1430 may also include insulating (e.g., electrically isolating) conductive traces 930 from metal layer 920 (e.g., if not already performed in operation 1420). This may include, for example, maintaining voids in areas 940, providing insulating material in areas 940, substantially or completely surrounding conductive traces 930 with insulating material, and/or other appropriate insulating techniques.

At operation 1440, one or more components are attached to housing 120 and/or connected to conductive traces 930. For example, in one embodiment, temperature measurement component 980 may be connected to conductive traces 930 and mounted on an interior surface of housing 120.

At operation 1450, components of infrared imaging module 100 intended to reside within cavity 912 are provided. For example, in some embodiments, operation 1450 may include manufacturing or otherwise providing infrared sensor assembly 128 and/or other components of infrared imaging module 100.

At operation 1460, the components provided in operation 1450 are substantially or completely enclosed within cavity 912. In some embodiments, operation 1460 may include positioning infrared sensor assembly 128 and housing 120 relative to each other such that housing 120 at least substantially encloses infrared sensor assembly 128 and such that metal layer 920 is disposed on various interior surfaces of cover 910 facing infrared sensor assembly 128. For example, cover 910 may be lowered over infrared sensor assembly 128. As another example, infrared sensor assembly 128 may be inserted into cavity 912.

In some embodiments, operation 1460 may include various operations to assemble infrared imaging module 100, such as by mounting housing 120 on base 150 or circuit board 170. In other embodiments, operation 1460 may include assembling various portions of housing 120 together to enclose components. In other embodiments, housing 120 may be formed around components during its manufacture.

At operation 1470, infrared imaging module 100 is engaged with socket 104, for example, in accordance with various techniques described herein. In some embodiments, operation 1470 may include inserting infrared imaging module 100 into socket 104 of host device 102 such that housing 120 engages with socket 104.

Other embodiments are also contemplated. For example, although metal layer 920 has been primarily described as being on one or more interior surfaces of cover 910, metal layer 920 may be provided on various interior and/or exterior surfaces of cover 910 as may be desired to further realize the various emissivity, conductivity, shielding, and other advantages provided by metal layer 920.

Figure 15A:
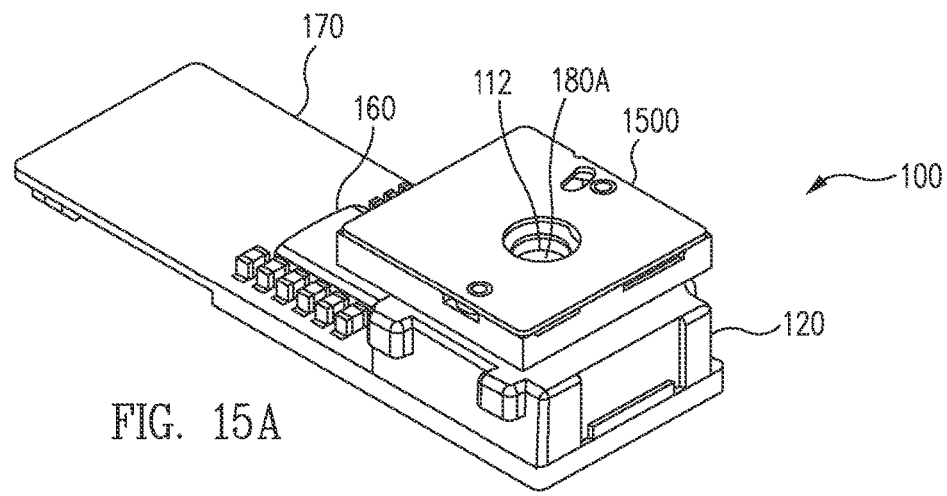
FIGS. 15A-15C illustrate various views of an infrared imaging module having a shutter assembly in accordance with an embodiment of the disclosure.
Figure 15B:
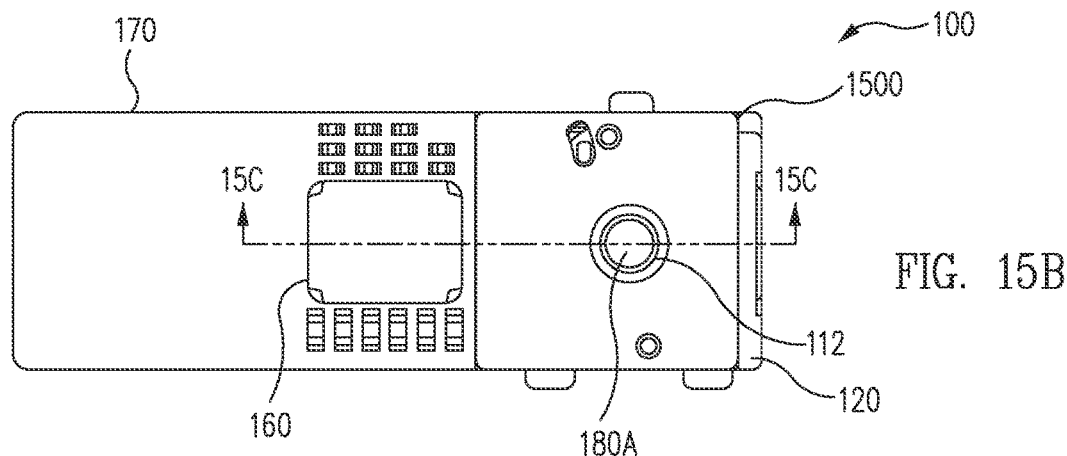
Figure 15C:
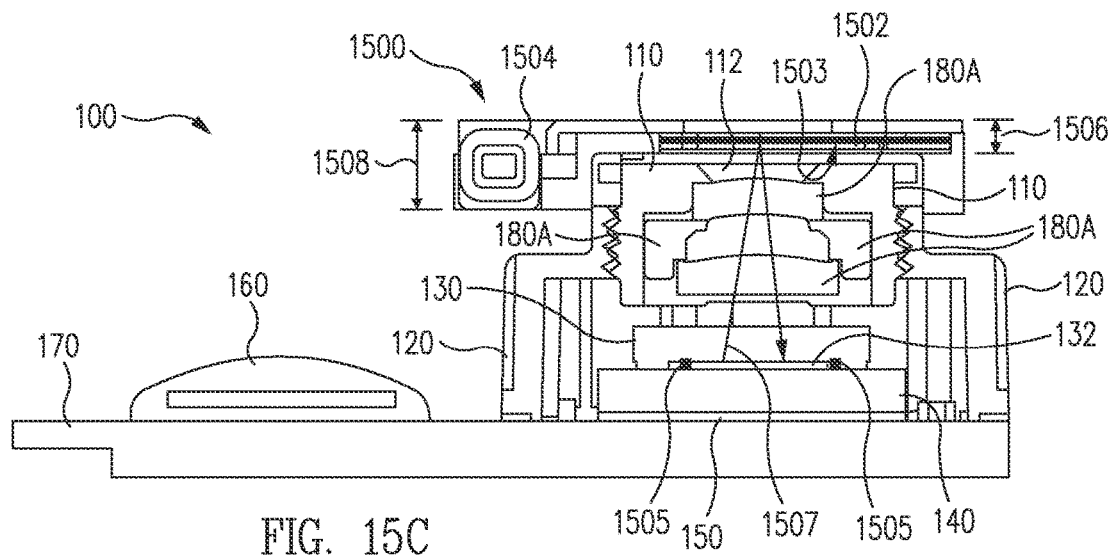

FIGS. 15A-15C illustrate various views of infrared imaging module 100 having a shutter assembly 1500 in accordance with an embodiment of the disclosure. Specifically, FIG. 15A illustrates a top perspective view of infrared imaging module 100 with shutter assembly 1500 stacked on top of housing 120 and/or lens barrel 110 and with processing module 160 mounted on circuit board 170 and external to housing 120, FIG. 15B illustrates a top plan view of infrared imaging module 100 of FIG. 15A, and FIG. 15C illustrates a cross-sectional view along line 15C-15C of infrared imaging module 100 of FIGS. 15A-15B.

In accordance with additional embodiments of the disclosure, shutter assembly 1500 may be adapted to substantially block external infrared radiation from entering optical elements 180A (e.g., including multiple elements defining a multi-element lens) and/or aperture 112 selectively in response to a control signal (e.g., a drive voltage/current). In this regard, according to various embodiments, shutter assembly 1500 may include a paddle 1502 that may be selectively moved by an actuator 1504 to instead provide infrared radiation from paddle 1502 to infrared sensors 132 through aperture 112 and/or optical elements 180A, to the exclusion of external infrared radiation from a scene.

Thus, for example, shutter assembly 1500 may be utilized as an approximate black body for performing NUC process or other calibration processes as would be understood by one skilled in the art. For example, shutter assembly 1500 may be utilized to perform a shutter-based flat field correction (FFC) process appropriately modified from shutter-based FFC techniques set forth in U.S. patent application Ser. No. 12/391,156 filed Feb. 23, 2009, which is incorporated herein by reference in its entirety.

As shown in the illustrated embodiment of FIGS. 15A-15C, according to some embodiments shutter assembly 1500 may be adapted to be stacked relative to housing 120 and/or lens barrel 110 in a manner that allows an added height 1506 attributable to shutter assembly 1500 in the overall profile to be only a portion of a height 1508 of shutter assembly. As such, shutter assembly 1500 may be included in infrared imaging module 100 to provide benefits of having a shutter situated external to optical elements 180/180A as further discussed herein, while still maintaining compact overall dimensions of infrared imaging module 100. Moreover, because shutter assembly 1500 may be provided separately from housing 120, shutter assembly 1500 may be integrated with infrared imaging module 100 in various form factors and topologies described above with respect to various embodiments of FIGS. 5A-14 with few modifications or design changes, for example.

By providing a shutter (e.g., paddle 1502) external to optical elements 180/180A rather than in between infrared sensor 132 and optical elements 180/180A, a more accurate calibration may be achieved, for example, when performing various shutter-based calibration processes described above. That is, paddle 1502 external to optical elements 180/180A may not block out-of-field radiation emitted from housing 120 and/or lens barrel 110 from reaching infrared sensors 132, thereby allowing calibration processes to more accurately correct for such out-of-field radiation when obtaining calibration data. For example, by allowing such out-of-field radiation to reach infrared sensors 132, a non-uniformity correction process may be able to correct low spatial frequency non-uniformity attributable to such out-of-field radiation.

In another example, a radiometric calibration process may be able to determine outputs of infrared sensor assembly 128 attributable to such out-of-field radiation, and compensate for the contribution of such out-of-field radiation to provide a more accurate radiometric measurement of temperatures associated with a scene or object. More specifically, with paddle 1202 in a closed position to block external radiation from reaching optical elements 180/180A, infrared radiant flux received by infrared sensors 132 may be the sum of infrared radiant flux emitted from out-of-field sources (e.g., housing 120 and/or lens barrel 110) and infrared radiant flux emitted from paddle 1202. Thus, an output of infrared sensor assembly 128 with paddle 1202 in a closed position may be expressed as, for example:

$$\text{Output} = (\text{IR\_flux}_{Paddle} + \text{IR\_flux}_{Out\text{-}of\text{-}field})\text{Resp} + \text{Offset} \quad \text{(Equation 1)}$$

wherein Resp represents a responsivity of infrared sensors 132 and Offset represents offsets in the output of infrared sensor assembly 128, in accordance with an embodiment.

If a temperature of paddle 1202 and optical characteristics (e.g., transmission and f-number) of optical elements 180A/180 are known, infrared flux emitted from paddle 1202 reaching infrared sensors 132 ($\text{IR\_Flux}_{Paddle}$) may be calculated as would be understood by one skilled in the art. Then the output attributable to out-of-field sources may be derived as follows:

$$\text{Output}_{Out\text{-}of\text{-}field} = \text{Output} - (\text{IR\_Flux}_{Paddle} \times \text{ResP} + \text{Offset}) \quad \text{(Equation 2)}$$

The output of infrared sensor assembly 128 attributable to infrared radiation from housing 120 and/or barrel 110 (Output$_{Out\text{-}of\text{-}field}$) may then be subtracted during or after image capturing so that the resulting output may be representative of infrared flux levels associated with a scene, thereby producing radiometrically calibrated images. Thus, for example, infrared imaging module 100 having shutter assembly 1500 according to one or more embodiments may advantageously permit more accurate NUC, radiometric, and/or other calibration of infrared imaging module 100.

Figure 16A:
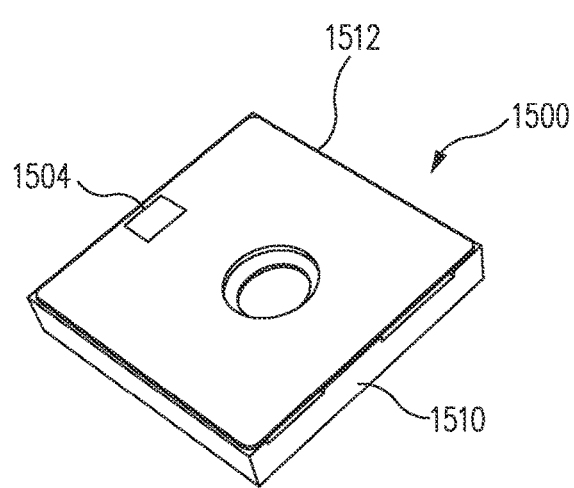
FIGS. 16A-16D illustrate various views of the shutter assembly of FIGS. 15A-15C in accordance with an embodiment of the disclosure.

Shutter assembly 1500, as well as methods of manufacturing infrared imaging module 100 having shutter assembly 1500, will now be described in further detail with reference to FIGS. 16A-16D, which illustrate various views of shutter assembly 1500 in accordance with an embodiment of the disclosure. FIG. 16A illustrates a top perspective view of shutter assembly 1500. As shown in FIG. 16A in contrasting shades for easier understanding, shutter assembly 1500 may include a body 1510 adapted to carry or otherwise support various components of shutter assembly 1500, and a cover 1512 coupled to body 1510 to at least partially enclose some components of shutter assembly 1500.

Figure 16B:
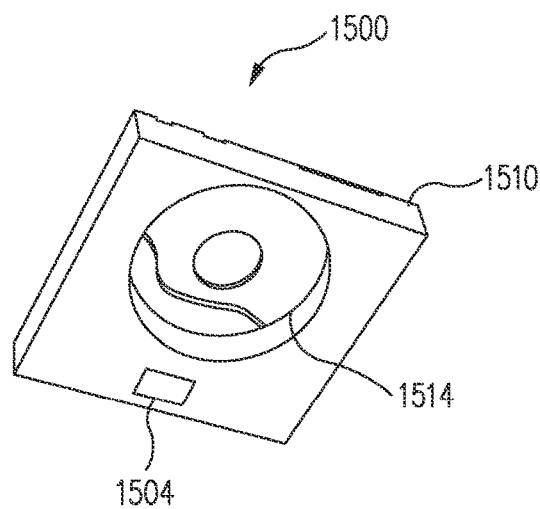

In the illustrated embodiment and others, shutter assembly 1500 may include a recess 1514 formed (e.g., molded, stamped, machined, or otherwise fabricated) on a surface of body 1510, as shown in FIG. 16B illustrating a bottom perspective view of shutter assembly 1500. In various embodiments, recess 1514 may be shaped to receive at least a portion of housing 120 and/or lens barrel 110, such that added height 1506 may be reduced when shutter assembly 1500 is stacked relative to housing 120 as described above with respect to FIG. 15C. Depending on particular implementations, housing 120 and lens barrel 110 may have various shapes and/or configurations at their interface. For example, as shown herein, in some implementations lens barrel 110 may have a portion protruding from housing 120 and/or in some implementations housing 120 may have a protruding lip encircling a portion of lens barrel 110. Thus, depending on particular implementations, recess 1514 may be shaped to receive a portion (e.g., a protruding portion) of lens barrel 110, a portion (e.g., a protruding lip) of housing 120, or portions of both barrel 120 and housing 110. In the illustrated embodiment of FIG. 15C, for example, recess 1514 may be shaped to receive a protruding portion of lens barrel 110 and a protruding lip portion of housing 120, such that shutter assembly 1500 may be nested on top of lens barrel 110 to position paddle 1502 external to optical elements 180A/180 while still maintaining a thin profile.

Embodiments without recess 1514 or having a differently shaped recess are also contemplated. For example, body 1510 may be substantially L-shaped or otherwise shaped to locate large components (e.g., actuator 1504) off to a side to reduce overall profile without nesting substantially all of shutter assembly 1500 over lens barrel 110 and/or housing 120. In other embodiments, shutter assembly 1500 may not need recess 1514 formed on body 1510 if, for example, adding an entire height of shutter assembly 1500 does not affect particular applications of infrared imaging module 100. It is also contemplated that for implementations of infrared imaging module 100 without a separate lens barrel, such as for example if optical elements 180A/180 are provided on a housing or if the housing implements a lens barrel, recess 1514 may be shaped to receive a portion of such a housing.

In some embodiments, shutter assembly 1500 may be secured in position relative to housing 120 and/or lens barrel 100 by recess 1514 receivingly engaging (e.g., holding using friction and/or tension) a corresponding portion of housing 120 and/or lens barrel 110. In some embodiments, shutter assembly 1500 may be secured in position using adhesives, tabs, arms, pins, fasteners, screws, or any other appropriate engagement members, in addition to or instead of recess 1514 receivingly engaging a corresponding portion of housing 120 and/or lens barrel 110.

Various components of shutter assembly 1500 may be described in further detail with reference to FIG. 16C, which illustrates a top perspective view of shutter assembly 1500 with cover 1512 removed to reveal various components. In the illustrated embodiment and others, body 1510 may be adapted to carry, support, and/or provide appropriate mounting locations for various components including paddle 1502, actuator 1504, cover 1512, and/or a base plate 1516. In some embodiments, shutter assembly 1500 may include base plate 1516 mounted on body 1510, for example, via support pins 1518A-1518B extending from body 1510 or otherwise mounted on body. In some embodiments, base plate 1516 may have an aperture 1517 formed thereon and suitably positioned to allow infrared radiation to pass through to aperture 112 and/or optical elements 180A/180 when paddle 1502 is in an open position as shown in FIG. 16C.

Figure 16C:
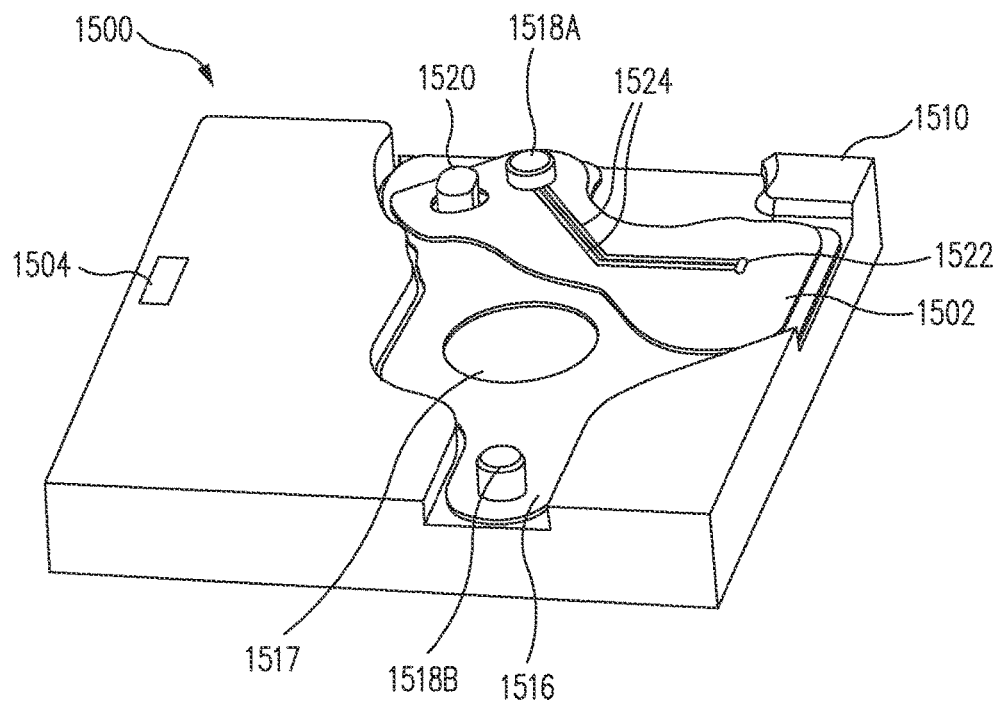

Actuator 1504 may be adapted to selectively move paddle 1502 between an open position (as shown in FIG. 16C) and a closed position in response to a control signal (e.g., a drive voltage or current) received from an appropriate component of infrared imaging module 100 (e.g., processing module 160, or other components) or from an external source (e.g., via components and/or connections on circuit board 170). In some embodiments, actuator 1504 may be implemented using a magnetic rotor, electric motor, or other similar electromechanical actuator adapted to produce motion and/or force in response to receiving an electric current and/or voltage. Other implementations of actuator 1504 are also contemplated for other embodiments. For example, actuator 1504 may be implemented using a thermal actuator adapted to generate motion by thermal expansion amplification, piezoelectric actuator adapted to generate motion by piezoelectric effect, or other types of micro-electro-mechanical system (MEMS) actuators.

Figure 16D:
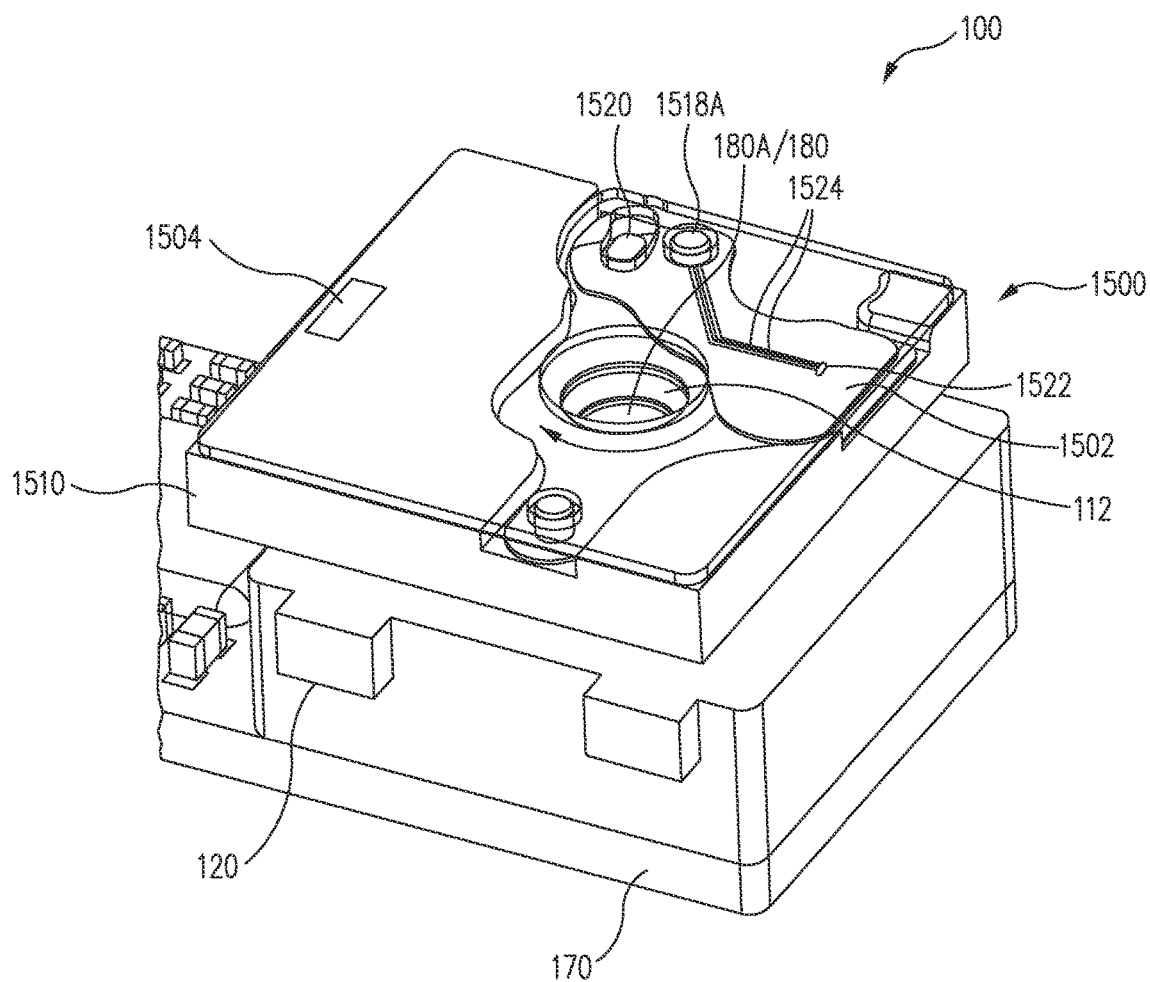

In the illustrated embodiment and others, actuator 1504 may be adapted to selectively move a drive pin 1520, which in turn pivotingly moves paddle 1502 around support pin 1518A between an open position and a closed position. As indicated by the arrow in FIG. 16D illustrating shutter assembly 1500 stacked relative to housing 120 and/or lens barrel 110 with cover 1512 of shutter assembly 1500 shown in semi-transparent form for ease of understanding, paddle 1502 may be pivotingly moved by drive pin 1520 from an open position (as shown) to a closed position in response to actuator 1504 receiving a control signal (e.g., drive current/voltage), according to some embodiments. When in the open position, paddle 1502 may allow external infrared radiation to pass to aperture 112 and/or optical elements 180A/180, whereas when in the closed position, paddle 1502 may substantially block external infrared radiation from reaching aperture 112 and/or optical elements 180A/180. Other drive mechanisms appropriate for selectively moving paddle 1502 or any other appropriate shutter member (e.g., a focal plane shutter, leaf shutter, or others) between open and closed positions may be provided for other embodiments.

As discussed above, more accurate calibration of infrared sensor assembly 128 may be achieved using paddle 1202 if a temperature of paddle 1502 can be determined. In this regard, shutter assembly 128 may include, according to various embodiments, a temperature sensor 1522 adapted to detect a temperature associated with paddle 1502. In the illustrated embodiment and others, temperature sensor 1522 may be implemented using a discrete component disposed on and/or at least partially embedded in paddle 1502. The discrete temperature sensor 1522 may be implemented using a thermistor, thermocouple, temperature-sensing diode, or other appropriate low mass temperature sensor device that may be disposed on paddle 1502 without significantly adding mass to paddle 1502. In some embodiments, shutter assembly 1500 may include one or more electrical wires 1524 routed on and/or at least partially embedded within paddle 1502, and adapted to electrically connect to the discrete temperature sensor 1522 for obtaining a temperature reading (e.g., represented as resistance, voltage, current, or other electrical characteristic produced by temperature sensor 1522).

In some embodiments, paddle 1502 may be a molded interconnect device (MID) formed using an appropriate MID method, which may allow embedded conductive traces to be formed on paddle 1502. Thus, in some embodiments, one or more electrical wires 1524 may be implemented using such conductive traces embedded (e.g., fully or partially embedded, formed, implanted, or otherwise provided) in a MID paddle 1502.

In some embodiments, paddle 1502 may be made from a silicon substrate, with temperature sensor 1522 and electrical wires 1524 fabricated on the silicon substrate as integrated circuits using an appropriate semiconductor fabrication process. In this regard, a silicon paddle 1502 may be doped with appropriate dopant on at least one surface to reduce infrared transmissivity of silicon paddle 1502, so that silicon paddle 1502 may substantially block external infrared radiation when in the closed position. In some embodiments, a temperature-sensing diode may be fabricated as an integrated component on silicon paddle 1502 to implement temperature sensor 1522. In one specific example, the temperature-sensing diode implementing temperature sensor 1522 may be modeled after (e.g., appropriately modified from) the 2N2222 transistor appropriate for temperature measurements.

According to various semiconductor fabrication processes utilized for various embodiments, a large number of silicon paddles 1502 with integrated temperature sensors 1522 and electrical wires 1524 may be fabricated on a single wafer (e.g., up to several hundreds of silicon paddles 1502 on a wafer depending on wafer size and paddle size). In a specific example, close to one thousand silicon paddles 1502 having an approximate size of 3 mm by 7 mm may be fabricated on a typical 0.35 μm process wafer, thereby reducing the cost to manufacture each paddle 1502. In some embodiments, silicon paddles 1502 fabricated on a wafer may be singulated using laser cutting or other appropriate singulation technique suitable for dicing irregular shaped dies.

Figure 17A:
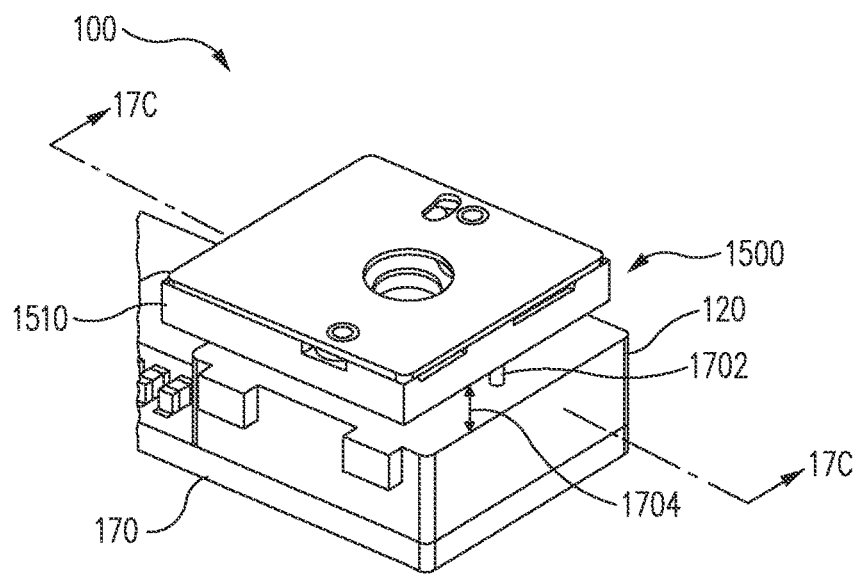
FIGS. 17A-17C illustrate various views of an infrared imaging module having a shutter assembly in accordance with another embodiment of the disclosure.
Figure 17B:
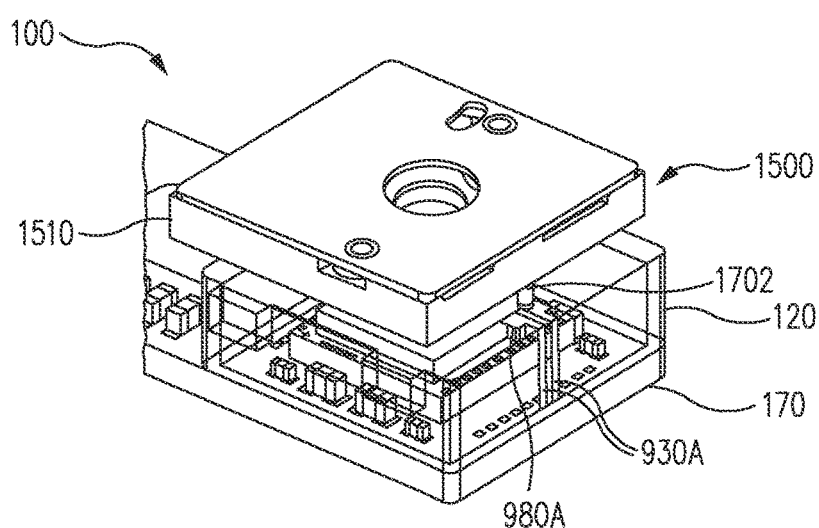
Figure 17C:
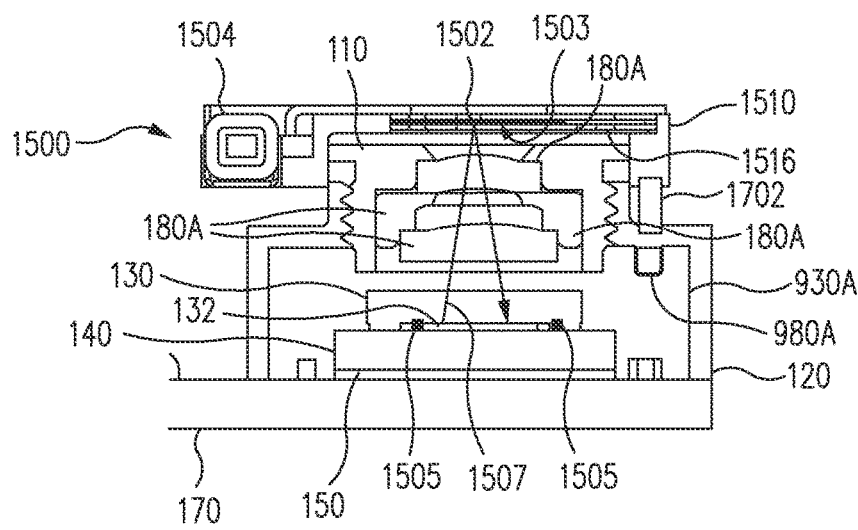

In other embodiments, a temperature sensor to detect a paddle temperature may be provided at other parts or components of infrared imaging module 100. For example, in one embodiment, a temperature sensor (e.g., a thermistor, thermocouple, temperature-sensing diode, thermopile, pyroelectric sensor, or other suitable sensor) may be disposed on or in shutter assembly body 1510 at a location appropriate for detecting a temperature associated with paddle 1502 through convective and/or radiative transfer of heat to/from paddle 1502. As another example, FIGS. 17A-17C illustrate various views of infrared imaging module 100 having a temperature sensor 980A provided on an interior surface of housing 120 and a thermal conductor 1702 adapted to communicate thermal energy between body 1510 of shutter assembly 1500 and temperature sensor 980A, in accordance with an embodiment of the disclosure. More specifically, FIG. 17A illustrates a top perspective view of infrared imaging module 100 having temperature sensor 980A and thermal conductor 1702, FIG. 17B illustrates the infrared imaging module 100 of FIG. 17A with housing 120 shown in semi-transparent form to reveal temperature sensor 980A provided on an interior surface of housing 120, and FIG. 17C illustrates a cross-sectional view along line 17C-17C of the infrared imaging module 100 of FIGS. 17A-17B.

In one or more embodiments, temperature sensor 980A may be implemented in a same or similar manner as temperature measurement component 980 of FIGS. 12A-12C and 12E. In the illustrated embodiment, temperature sensor 980A partially or fully embedded (e.g., implanted, formed, or otherwise provided) in, or mounted on an interior surface of housing 120. In other embodiments, temperature sensor 980A may be partially or fully embedded in, or mounted on an exterior surface of housing 120. In various embodiments, temperature sensor 980A may be electrically connected to one or more conductive traces 930A formed on or at least partially embedded in a surface of housing 120 in a similar manner as conductive traces 930 of FIGS. 12A-12E or in other appropriate manner.

In one or more embodiments, thermal conductor 1702 may be provided in a gap 1704 between shutter assembly body 1510 and housing 120 to thermally couple shutter assembly body 1510 to at least a portion (e.g., a portion near temperature sensor 980A) of housing 120. In this regard, housing 120 and/or shutter assembly body 1510 may have one or more surfaces raised, lowered, or otherwise shaped to reduce gap 1704, so as to achieve, for example, a better thermal coupling using smaller thermal conductor 1702. Thermal conductor 1702 may be made of any suitable material having high thermal conductivity. For example, in one or more embodiments, thermal conductor 1702 may be implemented by applying or otherwise providing thermally conductive epoxy, solder, a thermal pad, a copper shim, or other suitable thermal conductor material between gap 1704 to thermally couple housing 120 and shutter assembly body 1510. Thus, thermal conductor 1702 may facilitate communication of thermal energy between at least a portion (e.g., a portion near temperature sensor 980A) of housing 120 and shutter assembly body 1510, so that an approximate temperature ambient to paddle 1502 may be detected by temperature sensor 980A.

As discussed above, in various embodiments, actuator 1504 may be adapted to receive a control signal (e.g., a drive voltage or current) from an appropriate component. According to some embodiments, the control signal may be received from or via an appropriate component on substrate 140 and/or circuit board 170. Also according to some embodiments, a temperature reading (e.g., represented as resistance, voltage, current, or other electrical characteristic produced by a temperature sensor) from temperature sensor 1522 or a temperature sensor on shutter assembly body 1510 may be transmitted to an appropriate component (e.g., processing module 160) on substrate 140 and/or circuit board 170, to be utilized by and/or transmitted further to an appropriate external component (e.g., processor 195) via the component on substrate 140 and/or circuit board 170. In this regard, for some embodiments, one or more conductive traces may be provided on one or more surfaces of housing 120, and may be adapted to transmit the control signal and/or the temperature reading between shutter assembly body 1510 and substrate 140/circuit board 170.

Figure 18A:
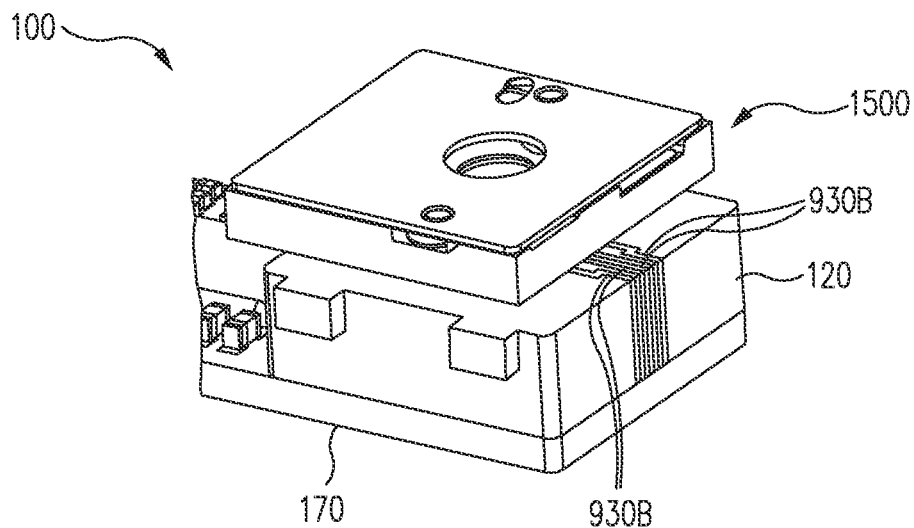
FIGS. 18A-18C illustrate various views of an infrared imaging module having a shutter assembly and a housing with conductive traces provided on one or more exterior surfaces in accordance with an embodiment of the disclosure.
Figure 18B:
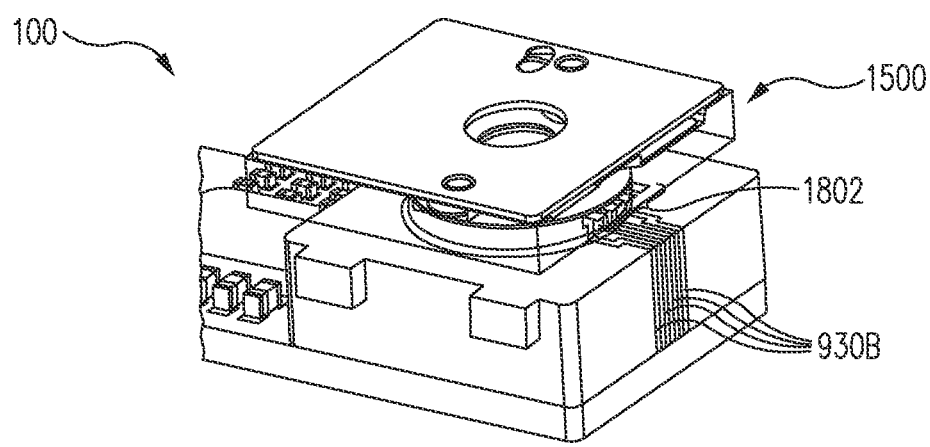

For example, FIG. 18A illustrates a top perspective view of infrared imaging module 100 having conductive traces 930B provided on one or more exterior surfaces of housing 120, and FIG. 18B illustrates the infrared imaging module 100 of FIG. 18A with shutter assembly body 1510 shown in semi-transparent form to reveal electrical pads 1802 adapted to interface with conductive traces 930B, in accordance with an embodiment of the disclosure. In the illustrated embodiment, conductive traces 930B may be formed on one or more exterior surfaces of housing 120 to transmit the control signal and the temperature reading, but otherwise formed or provided in a similar manner as conductive traces 930 described above with respect to FIGS. 12A-13. For embodiments in which temperature sensor 980A may be provided within housing 120 (e.g., embodiments described above with respect to FIGS. 17A-17C), conductive traces 930B may not be needed for transmitting a temperature reading, but rather conductive 930A may be utilized to transmit the temperature reading as described above.

Figure 19:
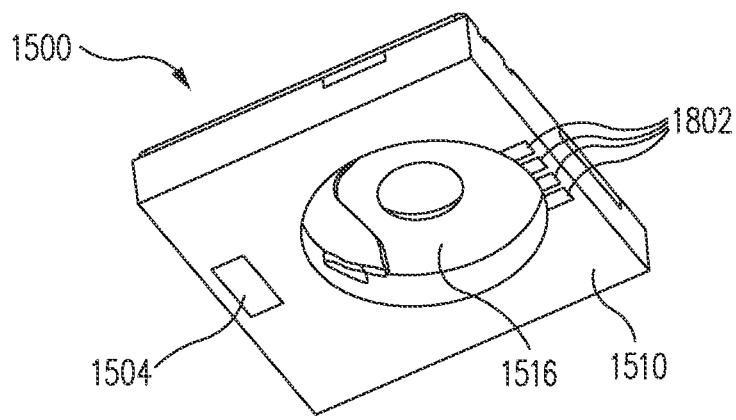
FIG. 19 illustrates a bottom perspective view of the shutter assembly of FIGS. 18A-18C in accordance with an embodiment of the disclosure.
Figure 18C:
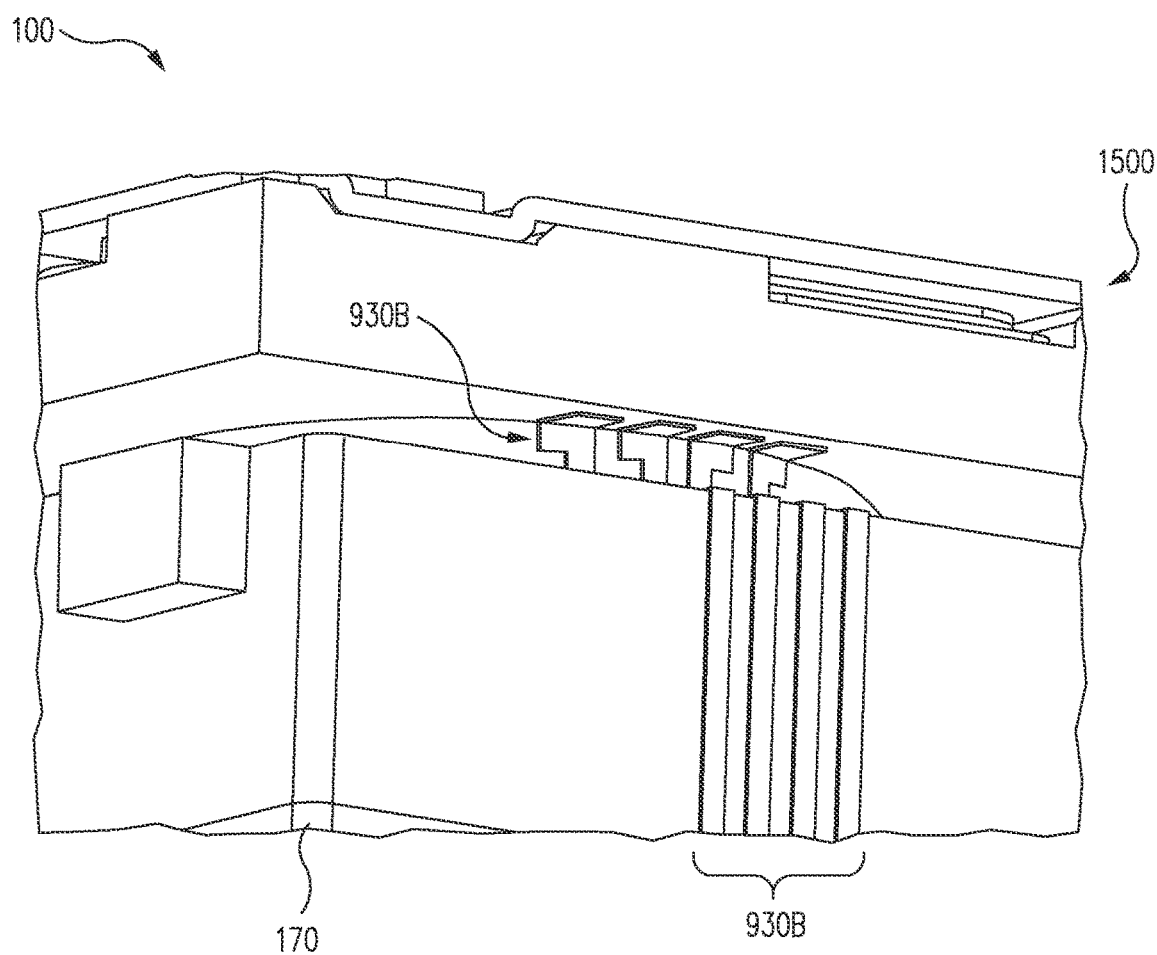

Conductive traces 930B may be routed or otherwise patterned to run between appropriate electrical contacts on circuit board 170 and electrical pads 1802 on shutter assembly body 1510. As shown in FIGS. 18B and 18C, conductive traces 930B may contact or at least reach close proximity to corresponding electrical pads 1802 on shutter assembly body 1510. In some embodiments, solder, conductive epoxy, or other suitable material may be applied at the interface of conductive traces 930B and corresponding electrical pads 1802 so as to provide and/or enhance electrical connections between conductive traces 930B and corresponding electrical pads 1802. Electrical pads 1802 are more clearly shown in FIG. 19, which illustrates a bottom perspective view of shutter assembly 1502 having electrical pads 1802 provided on body 1510 in accordance with an embodiment of the disclosure. In various embodiments, electrical pads 1802 may be electrically connected to corresponding contacts of actuator 1504 and/or electrical wires 1524 via electrical traces and/or electrical wires provided on body 1510 and/or base plate 1516.

Figure 20A:
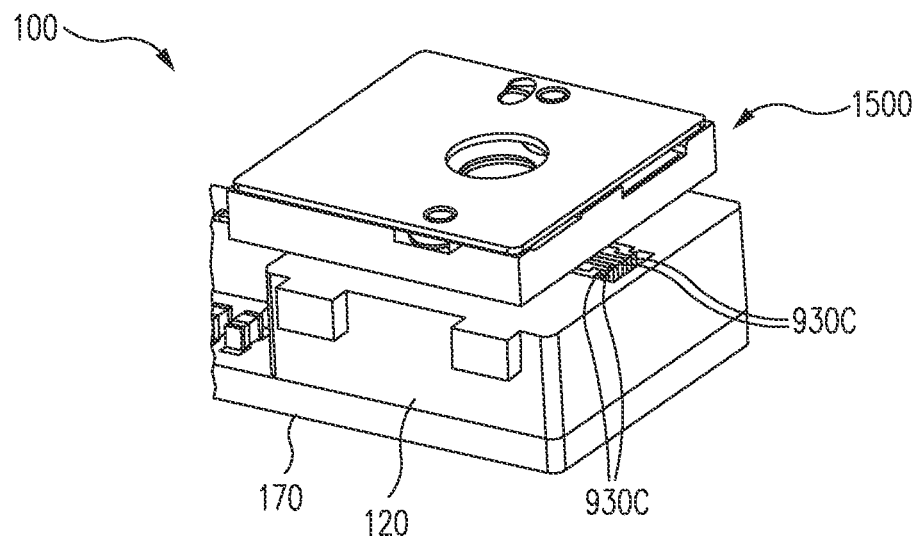
FIGS. 20A-20B illustrate various views of an infrared imaging module having a shutter assembly and a housing with conductive traces provided on exterior and interior surfaces in accordance with an embodiment of the disclosure.
Figure 20B:
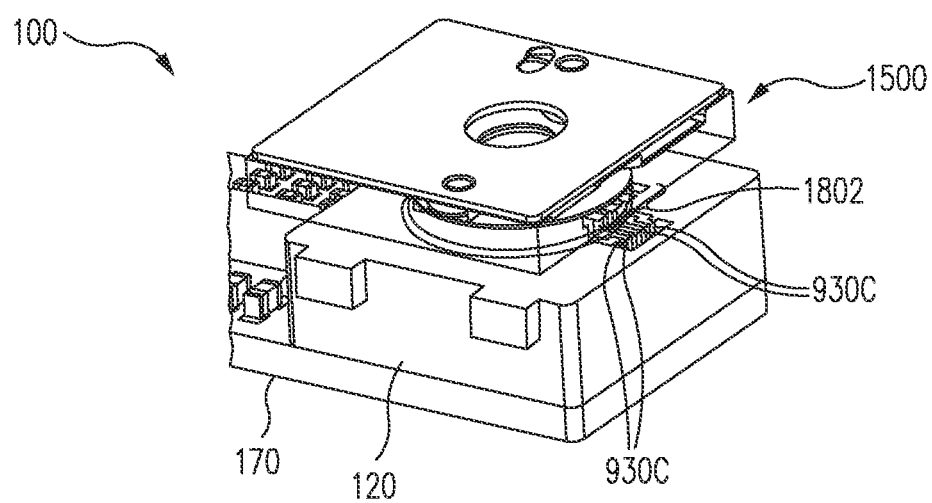

FIG. 20A illustrates a top perspective view of infrared imaging module 100 having conductive traces 930C formed on one or more exterior and interior surfaces of housing 120, and FIG. 20B illustrates a top perspective view of the infrared imaging module 100 of FIG. 20A with shutter assembly body 1510 shown in semi-transparent form to reveal electrical pads 1802, in accordance with an embodiment of the disclosure. As shown, in other embodiments, conductive traces 930C may additionally or alternatively be routed on one or more interior surfaces of housing 120 as desired for particular designs and/or requirements. Similar to conductive traces 930B, conductive traces 930C may interface with corresponding electrical pads 1802 provided on shutter assembly body 1510.

Therefore, according to one or more embodiments of infrared imaging module 100 having shutter assembly 1500, control signals for actuator 1504 and/or temperature readings from temperature sensor 1522 may be communicated without a need for additional cables and/or connectors external to infrared imaging module 100, thereby saving the cost of additional cables and/or connectors, reducing total space requirements, and/or otherwise removing complexities of having additional cables and/or connectors. Moreover, as discussed above, various embodiments of infrared imaging module 100 having shutter assembly 1500 may beneficially provide a calibration target external to optical elements 180A/180 to permit a more accurate calibration, using paddle 1502 adapted to selectively block external infrared radiation from entering optical elements 180A/180. Advantageously, paddle 1502 may be provided external to optical elements 180A/180 without excessively increasing the overall profile of infrared imaging module 100, according to one or more embodiments. Various embodiments of infrared imaging module 100 having shutter assembly 1500 may also advantageously allow an accurate measurement of a temperature associated with paddle 1502 by providing temperature sensor 1522/980A positioned and adapted to obtain an accurate temperature reading associated with paddle 1502, thereby permitting a more accurate calibration to be achieved.

Figure 21:
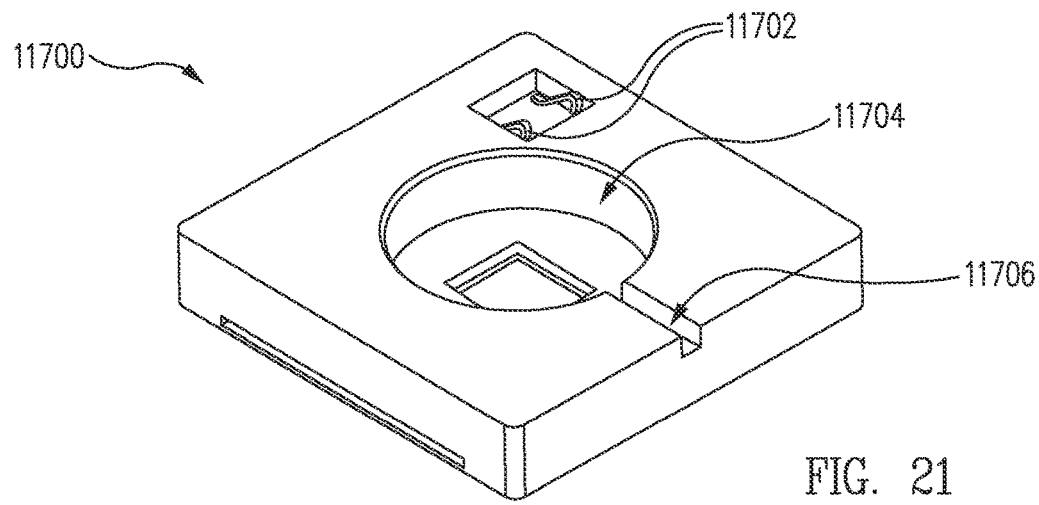
FIG. 21 illustrates a shutter assembly in accordance with an embodiment of the disclosure.
Figure 22:
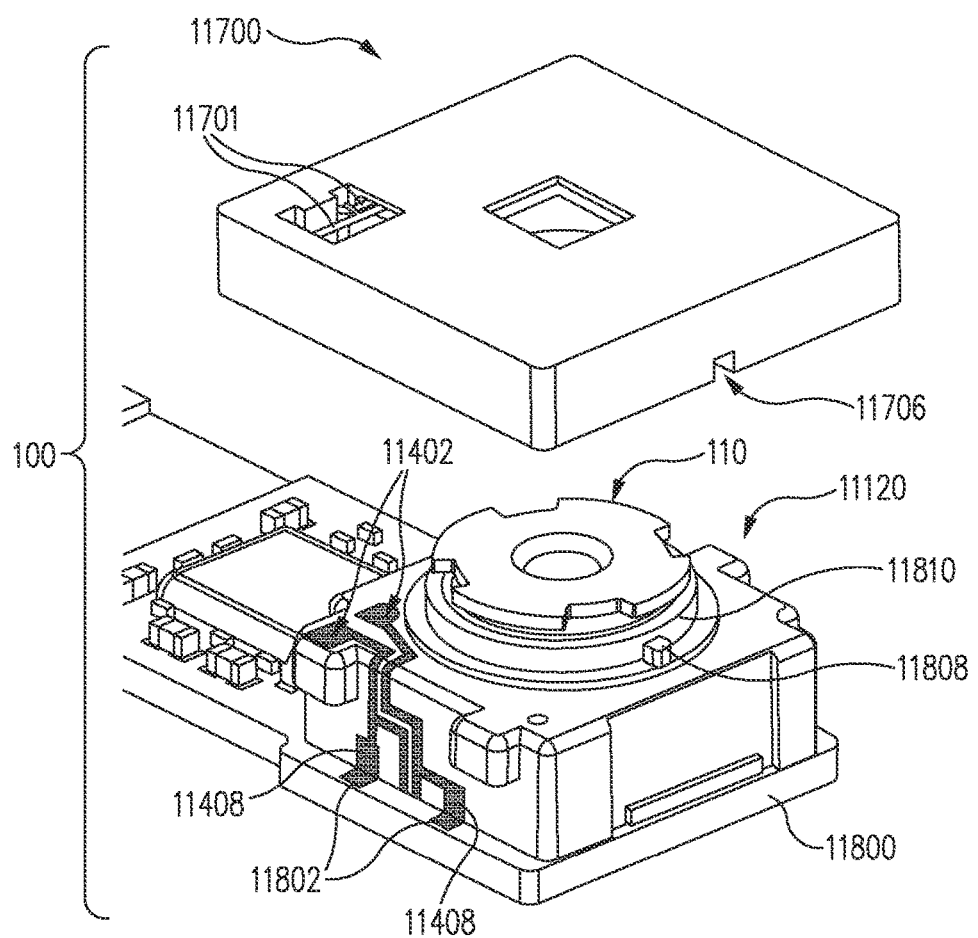
FIG. 22 illustrates the shutter assembly of FIG. 21 positioned for assembly as part of infrared imaging module in accordance with an embodiment of the disclosure.
Figure 23A:
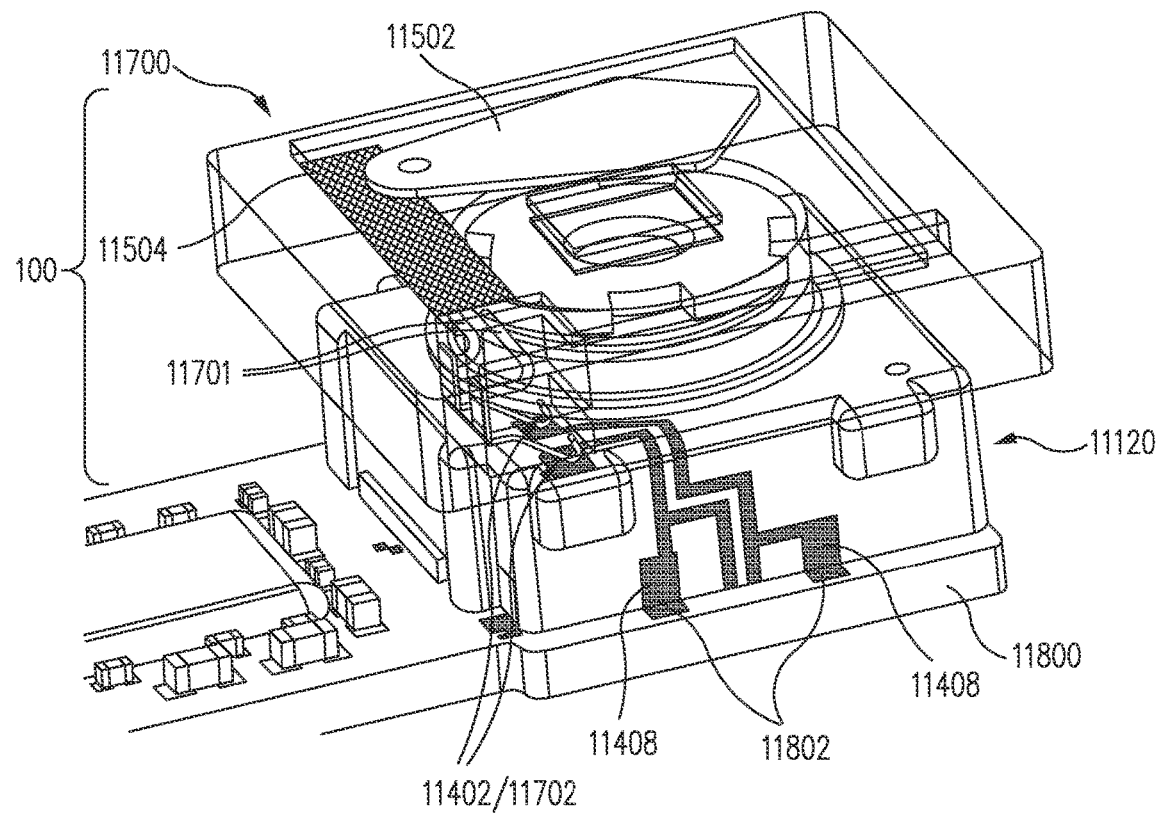
FIGS. 23A-B illustrate various views of an infrared imaging module with the shutter of FIG. 21 installed and shown in semi-transparent form to illustrate contacts of the shutter engaged with pads on an external surface of a housing in accordance with various embodiments of the disclosure.
Figure 23B:
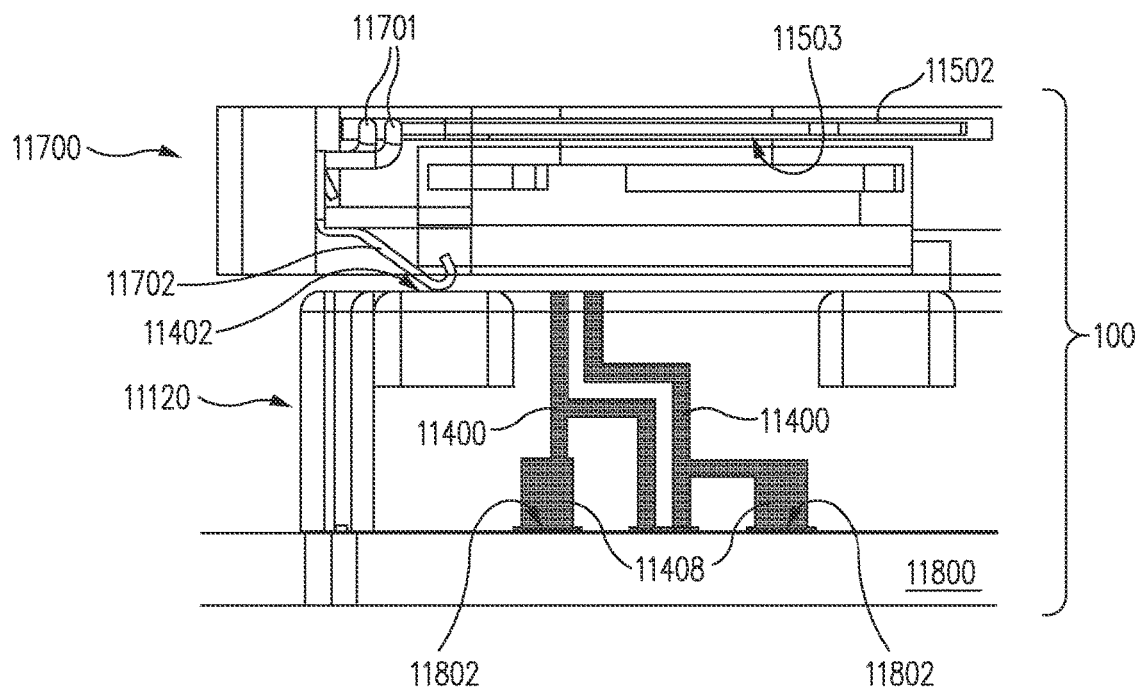

FIG. 21 illustrates another shutter assembly 11700 that may be installed as part of infrared imaging module 100, FIG. 22 illustrates shutter assembly 11700 positioned for assembly as part of infrared imaging module 100, and FIGS. 23A-B illustrate various views of infrared imaging module 100 with shutter assembly 11700 shown in semi-transparent form to illustrate contacts 11702 engaged with pads 11402 on an external surface of another housing 11120 in accordance with various embodiments of the disclosure. Where appropriate, any components of FIGS. 21-23B may be used in place of and/or in addition to any of the components of the present disclosure. For example, shutter assembly 11700 and/or housing 11120 may be used in place of shutter assembly 1500 and/or housing 120 in appropriate embodiments.

Conductive traces 11400 may be provided on housing 11120 and used to provide electrical connections. Conductive traces 11400 include pads 11402 and 11408, and various intermediate portions as shown. In some embodiments, pads 11402 may be positioned substantially on a top surface of housing 11120, and pads 11408 may be positioned on a lower side and/or may wrap around under a bottom surface of housing 11120. When housing 11120 is installed on base 11800 (see base 11800 provided by a circuit board in FIGS. 22 and 23A-B), conductive traces 11400 may pass electrical signals (e.g., control signals, data signals, power, and/or other types as appropriate) between electrical connections 11802 (e.g., pads) of base 11800 and components electrically connected to pads 11402 (e.g., various electrical components such as those of infrared imaging module 100 and/or appropriate portions of the various shutter assemblies discussed herein). Conductive traces 11400 may connect to electrical connections of base 150, circuit board 170, socket 104, and/or other components where appropriate in various installations.

Shutter assembly 11700 includes contacts 11702 that may engage with pads 11402 of housing 11120 when shutter assembly 11700 is installed as part of infrared imaging module 100. In some embodiments, contacts 11702 may be compression contacts (e.g., spring contacts) configured to be biased against pads 11402 when shutter assembly 11700 is installed on housing 11120 (see FIGS. 19A-B). In other embodiments, contacts 11702 may be implemented in other appropriate forms and/or may be soldered or otherwise connected to pads 11402.

Shutter assembly 11700 includes a paddle 11502, an actuator 11504, and may further include any of the various components as discussed herein with regard to shutter assembly 1500. Electrical signals to operate actuator 11504

(e.g., to move paddle 11502) may be passed between base 11180 and actuator 11504 through electrical connections 11802, pads 11408, intermediate portions of conductive traces 11400, pads 11402, contacts 11702, and wires 11701.

Shutter assembly 11700 also includes a recess 11704 configured to receive lens barrel 110 and an external ring 11810 of housing 11120 as shutter assembly 11700 is installed onto housing 11120. Shutter assembly 11700 also includes an orientation groove 11706 configured to receive an orientation tab 11808 of housing 11120 to align shutter assembly 11700 relative to housing 11120.

Figure 24:
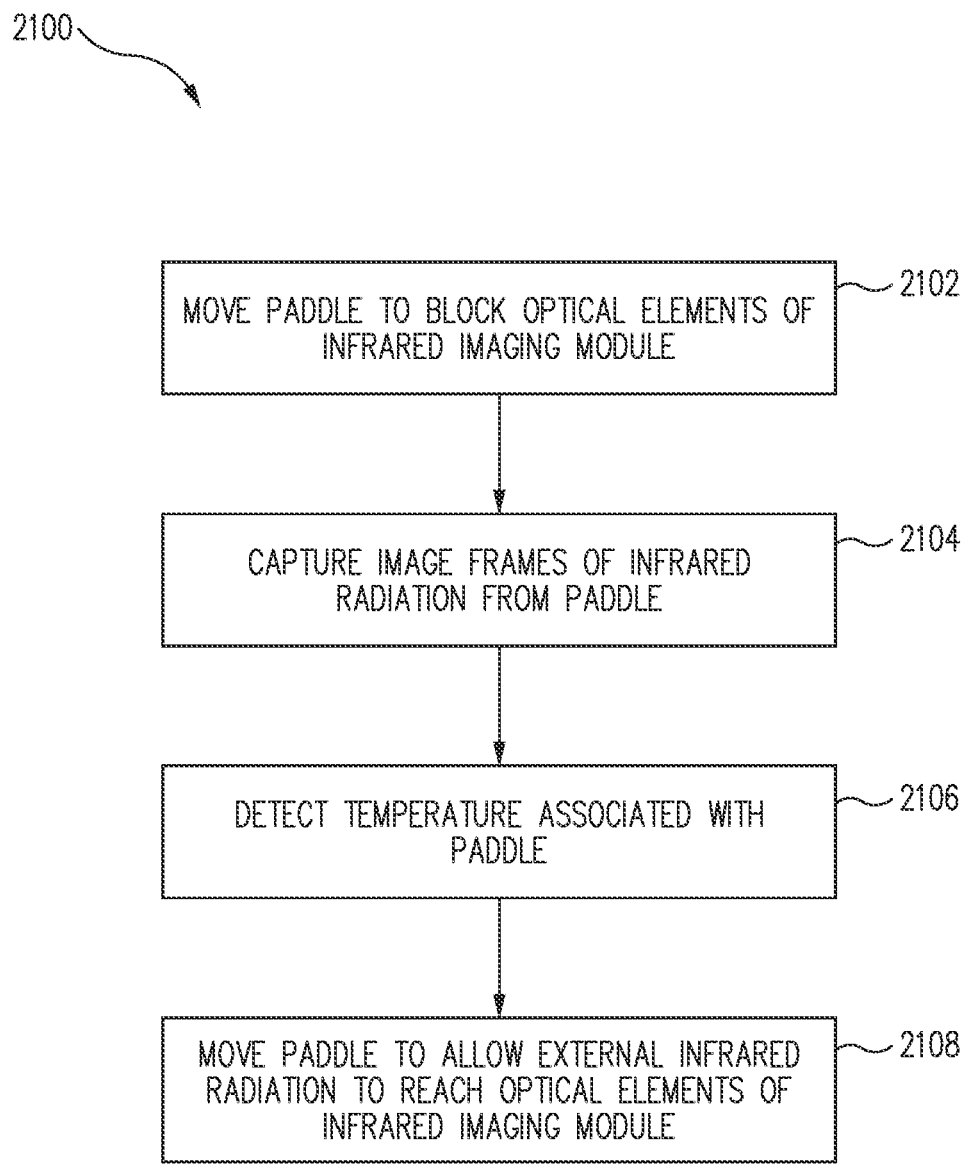
FIG. 24 illustrates a flowchart a process to capture image data of a uniform irradiance scene using an infrared imaging module having a shutter assembly in accordance with an embodiment of the disclosure.

Referring now to FIG. 24, a flowchart is illustrated of a process 2100 to capture image data of a uniform irradiance scene using infrared imaging module 100 having shutter assembly 1500 (e.g., or shutter assembly 11700) in accordance with an embodiment of the disclosure. For example, process 2100 may be performed as part of various NUC and/or radiometric calibration process to obtain calibrated infrared imaging module 100 as would be understood by one skilled in the art.

At block 2102, paddle 1502 may be pivotingly rotated, slid, or otherwise moved to substantially block external infrared radiation from entering aperture 112 and/or optical elements 180A/180. For example, in one or more embodiments, a control signal (e.g., a drive voltage and/or current) may be generated by an appropriate component (e.g., processing module 160, processor 195, other appropriate external component and/or other component of infrared imaging module 100) and transmitted via conductive traces 930B/930C to actuator 1504 to pivotingly rotate, slide, or otherwise move paddle 1502 to a position (e.g., a closed position) for substantially blocking aperture 112 and/or optical elements 180A/180.

At block 2104, infrared image data of a scene (e.g., a uniform irradiance scene) provided by paddle 1502 may be captured at infrared sensor assembly 128. For example, infrared radiation emitted from paddle 1502 may be passed through optical elements 180A/180 and received at infrared sensors 132 of infrared sensor assembly 128. ROIC of infrared sensor assembly 128 may generate infrared image frames corresponding to the received infrared radiation, and provided such image frames at various rates, as described herein. In some embodiments, the captured infrared image frames of the scene provided by paddle 1502 may be processed by processing module 160 of infrared imaging module 100, and in some embodiments, the processed image frames may be provided to processor 195 of host device 102 for further processing.

At block 2106, a temperature associated with paddle 1502 may be detected. In various embodiments, a temperature of paddle 1502 or a temperature ambient to paddle 1502 may be detected using temperature sensor 1522 or 980A. As described above for various embodiments, from temperature sensor 1522 or 980A, a resistance, voltage, current, or other electrical property indicative of the temperature may be transmitted via electrical wires 1524, conductive traces 930A, and/or conductive traces 930B/930C. For example, the temperature reading, along with the infrared image data captured at block 2104, may be received and processed by processing element 160, processor 195, and/or other appropriate component of infrared imaging module 100 or host device 102 to perform various radiometric calibration processes, NUC processes, or other calibration processes. Operations of block 2106 may be performed prior to block 2104 or block 2102 without departing from the scope and spirit of the disclosure. For example, a temperature associated with paddle 1502 may be detected during or prior to capturing infrared image data of the scene provided by paddle 1502.

At block 2108, paddle 1502 may be pivotingly rotated, slid, or otherwise moved back to an open position to allow external infrared radiation enter aperture 112 and/or optical elements 180A/180. For example, in some embodiments, the control signal that was asserted to cause actuator 1504 to move paddle 1502 to the closed position may be lowered, withdrawn, or otherwise removed to allow paddle 1502 to return to the open position. In other embodiments, another control signal may be generated by an appropriate component (e.g., processing module 160, processor 195, other appropriate external component and/or other component of infrared imaging module 100) and transmitted via conductive traces 930B/930C to actuator 1504 to pivotingly rotate, slide, or otherwise move paddle 1502 back to the open position. With paddle 1502 in the open position to permit capture of image data of external infrared radiation, infrared imaging module 100 and/or host device 102 may perform normal image capture operations or perform calibration operations using an external scene.

In some embodiments, shutter assembly 1500/11700 may be implemented with various minimum and maximum specifications. However, it will be appreciated that the specifications set forth herein are merely examples and that other specifications may be used where appropriate.

In some embodiments, shutter assembly 1500/11170 may be implemented to add approximately 0.6 mm or less to the overall height (e.g., Z dimension) of infrared imaging module 100. In some embodiments, shutter assembly 1500/11170 may be implemented with length and width (e.g., X and Y dimensions) less than approximately 9.0 mm by approximately 11 mm. In some embodiments, the length and width may be approximately 8.5 mm by approximately 8.5 mm. In some embodiments, the length, width, and height may be no greater than approximately 10.5 mm by approximately 10.5 mm by approximately 2.0 mm. In some embodiments, the length, width, and height may be no greater than approximately 8.5 mm by approximately 8.5 mm by approximately 2.0 mm.

In some embodiments, paddle 1502/11502 (e.g., shutter blades) may have approximately a 1.9 mm diameter viewable by infrared imaging module 100. In some embodiments, paddle 1502/11502 may exhibit open and close times less than approximately 30 milliseconds. In some embodiments, such open and close times may be less than approximately 10 milliseconds.

In some embodiments, actuator 1504/11504 may utilize a drive voltage approximately 2.0 volts or less, and exhibit drive power consumption of approximately 400 milliwatts or less. In some embodiments, such drive voltage may be approximately 1.8 volts. In some embodiments, no power is required to maintain paddle 1502/11502 in the open position.

In some embodiments, paddle 1502/11502 may provide high and/or low emissivity surfaces. In some embodiments, paddle 1502/11502 may exhibit high thermal conductivity. In some embodiments, paddle 1502/11502 and actuator 1504/11504 may be rated for a lifetime reliability of greater than 100,000 cycles. In some embodiments, such lifetime reliability may be greater than 1,000,000 cycles. In some embodiments, shutter assembly 1500/11700 may be implemented to operate over a temperature range of approximately −10 degrees C. to approximately +65 degrees C. In some embodiments, shutter assembly 1500/11700 may be implemented to withstand at least 10,000 g 0.2 ms shocks.

In certain infrared imaging devices, signals detected by an FPA correspond to the sum of infrared radiation from a scene that is focused onto infrared sensors by the lens, the lens self-emission, the out-of-field of view signal (e.g., emitted by the housing, lens barrel, and/or other components), and any uncompensated output drift associated with FPA temperature changes or FPA 1/f noise. In such cases, in order to accurately measure the temperature of objects in the scene, the signal contribution from the scene typically must be known independently from the signal contributions from the above-mentioned sources, which may require that the signal contributions from all of the sources be calculated.

In some conventional implementations, the signal contribution from the scene is replaced with the infrared signal contribution from a highly emissive shutter (e.g., paddle) when the shutter is closed. If the shutter's temperature is also known, then the signal contribution from the shutter can be calculated and used to determine other signal contributions in accordance with the following relationship: (lens self emission signal contribution+out-of-field signal contribution+uncompensated drift signal contribution)=FPA total output signal−calculated output signal contribution due to the shutter based on shutter temperature. Unfortunately, where a shutter is placed in front of a lens in a thermal imaging device, it is difficult to know the shutter temperature and thus calculate the signal contribution from the shutter (e.g., temperature sensors may be required on or proximate to the paddle which add weight, cost, and complexity, and may require increased dimensions). Moreover, even if the shutter is maintained at a known and substantially uniform temperature (e.g., by heating or cooling using appropriate components), such techniques exhibit similar drawbacks.

In contrast to conventional implementations, in some embodiments, a reflective shutter may be provided. Referring to FIGS. 15C, 17C, and 23B, in some embodiments, paddle 1502/11502 may be configured with a substantially reflective low emissivity interior surface 1503/11503 that faces the FPA (e.g., infrared sensor assembly 128 including infrared sensors 132) when paddle 1502/11502 is in a closed position. Surface 1503/11503 may reflect infrared (e.g., thermal) radiation originating from the FPA back to the FPA. For example, as shown by ray trace 1507, infrared radiation may pass from infrared sensors 132, continue up through various components of infrared imaging module 100, reflect off of surface 1503, travel back through various components of infrared imaging module 100, and be received by infrared sensors 132. Surface 11503 may similarly reflect such ray traces.

Infrared imaging module 100 may include one or more temperature sensors (e.g., one or more temperature sensors 1505 may be embedded in the FPA and/or provided elsewhere) which permit infrared imaging module 100 to know one or more temperatures associated with one or more regions of the FPA. By imaging the infrared radiation reflected back by interior surface 1503/11503, infrared imaging module 100 and/or various appropriate processors may calibrate infrared sensors 132 of the FPA (e.g., perform thermographic calibration thereof) using the one or more known temperatures associated with the FPA, and without requiring knowledge of the actual temperature of paddle 1502/11502 itself. As a result, in some embodiments, paddle 1502/11502 and/or shutter assembly 1500/11500 may be implemented without temperature sensors, and further without associated heating or cooling components (e.g., to maintain a substantially uniform temperature), thus saving weight and cost, and reducing thickness and complexity. In some embodiments, such calibration may further account for attenuation of the infrared radiation caused by, for example, passing through various components of infrared imaging module 100 twice (e.g., over various ray traces 1507 which may include passing from infrared sensors 132 up through optical elements 180A to surface 1503/11503, and returning from surface 1503/11503 back through optical elements 180A to infrared sensors 132).

In some embodiments, surface 1503/11503 may be gold coated or aluminum coated. These and/or other coatings or surfaces may be used as desired such that paddle 1502/11502 exhibits negligible self emission with regard to signals detected by infrared sensors 132 while paddle 1502/11502 is closed. Although interior surface 1503/11503 is illustrated as substantially flat, other surface shapes (e.g., curved surfaces) may be used in other embodiments, for example, to reflect additional infrared radiation back to the FPA, provide desired spot sizes for the area imaged by individual infrared sensors 132, and/or fine tune appropriate characteristics of surface 1503/11503.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
an infrared imaging module comprising:
    an infrared sensor assembly having infrared sensors and adapted to capture image frames;
    a housing substantially enclosing the infrared sensor assembly and having at least one conductive trace providing an electrical connection disposed on and extending along at least a portion of an exterior surface of the housing; and
    a shutter assembly external to and coupled to the housing, the shutter assembly comprising:
        a paddle adapted to selectively block external infrared radiation from reaching the infrared sensors,
        an actuator adapted to selectively move the paddle in response to a control signal to block external infrared radiation from reaching the infrared sensors, and an electrical contact adapted to interface with the conductive trace on the exterior surface of the housing to receive the control signal while the shutter assembly is coupled to the housing.

2. The system of claim 1, wherein:
the infrared sensor assembly further comprises a temperature sensor adapted to detect a temperature associated with the infrared sensor assembly;
the infrared imaging module further comprises an optical element adapted to pass infrared radiation through to the infrared sensors;
the paddle is disposed external to the optical element and adapted to selectively block external infrared radiation from reaching the optical element; and
the paddle comprises a substantially reflective surface adapted to reflect infrared radiation originating from the infrared sensor assembly back to the infrared sensor assembly while the paddle is in a closed position to calibrate the infrared sensors using the reflected infrared radiation and the detected temperature.

3. The system of claim 1, wherein the infrared imaging module further comprises a temperature sensor adapted to detect a temperature associated with the paddle.

4. The system of claim 3, wherein the temperature sensor is provided in or on the paddle.

5. The system of claim 4, wherein the shutter assembly comprises an electrical wire disposed on the paddle and electrically connected to the temperature sensor.

6. The system of claim 4, wherein the paddle is a molded interconnect device (MID) and comprises a conductive trace formed on a surface of the paddle and electrically connected to the temperature sensor.

7. The system of claim 4, wherein:
the paddle is made from a silicon substrate and comprises:
at least one surface that is doped to decrease transmissivity of infrared radiation therethrough, and
an electrical wire fabricated using a semiconductor fabrication process and electrically connected to the temperature sensor; and
the temperature sensor is a semiconductor device fabricated on the paddle.

8. The system of claim 1, wherein the shutter assembly comprises a body carrying the paddle.

9. The system of claim 8, wherein:
the housing is a molded interconnect device (MID) and the conductive trace extends from the exterior surface of the housing to an interior surface of the housing and/or to a location embedded in the housing; and
the conductive trace is adapted to transmit the control signal to the actuator.

10. The system of claim 9, wherein the electrical contact comprises a spring contact adapted to bias against the conductive trace to interface therewith.

11. The system of claim 8, wherein the infrared imaging module further comprises:
a temperature sensor disposed on an interior surface of the housing;
a thermal conductor adapted to thermally couple at least a portion of the shutter assembly body and at least a portion of the housing so as to communicate thermal energy between the shutter assembly body and the temperature sensor; and
a processor configured to generate a combined image comprising:
a radiometric component of at least one of the infrared image frames encoded into a chrominance component of the combined image, and
luminance and/or chrominance component of at least one non-thermal image encoded into a luminance component of the combined image.

12. The system of claim 8, wherein the infrared imaging module further comprises a temperature sensor disposed in or on the shutter assembly body and adapted to detect a temperature associated with the paddle.

13. The system of claim 8, wherein:
the infrared imaging module further comprises a lens barrel coupled to and at least partially within the housing;
the lens barrel substantially encloses an optical element adapted to pass infrared radiation through to the infrared sensors;
the shutter assembly body comprises a recess shaped to receive at least a portion of the lens barrel and/or the housing; and
the shutter assembly body is stacked relative to the housing by receiving at least a portion of the housing and/or the lens barrel in the recess.

14. A method comprising:
selectively moving a paddle to block external infrared radiation from reaching infrared sensors of an infrared sensor assembly substantially enclosed in a housing having at least one conductive trace providing an electrical connection disposed on and extending along at least a portion of an exterior surface of the housing;
capturing, using the infrared sensor assembly, image frames of infrared radiation;
wherein the paddle is selectively moved by an actuator in response to a control signal;
wherein the paddle and the actuator are part of a shutter assembly external to and coupled to the housing, the shutter assembly having an electrical contact adapted to interface with the conductive trace on the exterior surface of the housing to receive the control signal while the shutter assembly is coupled to the housing;
wherein the shutter assembly and the housing are part of an infrared imaging module.

15. The method of claim 14, further comprising:
prior to the capturing, reflecting infrared radiation originating from the infrared sensor assembly back to the infrared sensor assembly by a substantially reflective surface of the paddle while the paddle is in a closed position, wherein the captured infrared radiation is the reflected infrared radiation;
detecting a temperature associated with the infrared sensor assembly; and
calibrating the infrared sensors using the captured infrared radiation and the detected temperature.

16. The method of claim 14, further comprising detecting a temperature associated with the paddle using a temperature sensor of the infrared imaging module.

17. The method of claim 16, wherein the temperature sensor is provided in or on the paddle to detect the temperature.

18. The method of claim 17, wherein the detecting the temperature comprises transmitting an electrical signal indicative of the temperature via an electrical wire disposed on the paddle and electrically connected to the temperature sensor.

19. The method of claim 17, wherein:
the paddle is a molded interconnect device (MID); and
the detecting the temperature comprises transmitting an electrical signal indicative of the temperature via a conductive trace formed on a surface of the paddle and electrically connected to the temperature sensor.

20. The method of claim 17, wherein:
the paddle is made from a silicon substrate and comprises at least one surface that is doped to decrease transmissivity of infrared radiation therethrough;
the temperature sensor is a semiconductor device fabricated on the paddle; and
the detecting the temperature comprises transmitting an electrical signal indicative of the temperature via an electrical wire fabricated on the paddle using a semiconductor fabrication process and electrically connected to the temperature sensor.

21. The method of claim 14, wherein:
the housing is a molded interconnect device (MID) and the conductive trace extends from the exterior surface of the housing to an interior surface of the housing and/or to a location embedded in the housing; and
the method further comprises transmitting the control signal to the actuator via the conductive trace.

22. The method of claim 21, wherein:
the shutter assembly comprises:
  a body carrying the actuator, and
  the electrical contact comprising a spring contact adapted to bias against the conductive trace to interface therewith.

23. The method of claim 14, wherein the shutter assembly comprises a body carrying the paddle,
the method further comprises:
  transferring, via a thermal conductor thermally coupling at least a portion of the shutter assembly body and at least a portion of the housing, thermal energy between the shutter assembly body and the housing,
  detecting a temperature associated with the paddle using a temperature sensor disposed on an interior surface of the housing, and
  generating a combined image comprising:
    a radiometric component of at least one of the infrared image frames encoded into a chrominance component of the combined image, and
    a luminance and/or chrominance component of at least one non-thermal image encoded into a luminance component of the combined image.

24. The method of claim 14, wherein the shutter assembly comprises a body carrying the paddle, the method further comprising detecting a temperature associated with the paddle using a temperature sensor disposed in or on the shutter assembly body.

* * * * *

UNITED STATES PATENT AND TRADEMARK OFFICE
CERTIFICATE OF CORRECTION

PATENT NO. : 10,389,953 B2
APPLICATION NO. : 14/747865
DATED : August 20, 2019
INVENTOR(S) : Theodore R. Hoelter et al.

Page 1 of 1

It is certified that error appears in the above-identified patent and that said Letters Patent is hereby corrected as shown below:

In the Specification

At Column 32, Lines 20 and 21, change "device 102 may perforin normal image capture" to --device 102 may perform normal image capture--

Signed and Sealed this
Fifth Day of November, 2019

Andrei Iancu
*Director of the United States Patent and Trademark Office*